United States Patent
Kemball et al.

(10) Patent No.: US 12,545,731 B2
(45) Date of Patent: Feb. 10, 2026

(54) SINGLE-AND MULTI-CHAIN POLYPEPTIDES THAT BIND SPECIFICALLY TO CD3 EPSILON

(71) Applicant: CYTOMX THERAPEUTICS, INC., South San Francisco, CA (US)

(72) Inventors: Christopher Kemball, South San Francisco, CA (US); Pia Challita-Eid, South San Francisco, CA (US); Rene Hubert, South San Francisco, CA (US)

(73) Assignee: CYTOMX THERAPEUTICS, INC., South San Francisco, CA (US)

( * ) Notice: Subject to any disclaimer, the term of this patent is extended or adjusted under 35 U.S.C. 154(b) by 746 days.

(21) Appl. No.: 17/790,825

(22) PCT Filed: Jan. 6, 2021

(86) PCT No.: PCT/US2021/012320
§ 371 (c)(1),
(2) Date: Jul. 5, 2022

(87) PCT Pub. No.: WO2021/141996
PCT Pub. Date: Jul. 15, 2021

(65) Prior Publication Data
US 2023/0057263 A1    Feb. 23, 2023

Related U.S. Application Data

(60) Provisional application No. 62/957,735, filed on Jan. 6, 2020.

(51) Int. Cl.
*C07K 16/28* (2006.01)
*C07K 16/42* (2006.01)

(52) U.S. Cl.
CPC ...... *C07K 16/2809* (2013.01); *C07K 16/4208* (2013.01); *C07K 2317/33* (2013.01); *C07K 2317/565* (2013.01); *C07K 2317/74* (2013.01)

(58) Field of Classification Search
CPC .......... C07K 16/2809; C07K 2317/565; C07K 16/4208; C07K 16/4241
See application file for complete search history.

(56) References Cited

FOREIGN PATENT DOCUMENTS

| EP | 1 400 534 A1 | 3/2004 |
|---|---|---|
| WO | 2013/186613 A1 | 12/2013 |
| WO | 2014/191113 A1 | 12/2014 |
| WO | 2015/001085 A1 | 1/2015 |
| WO | 2019/034580 A1 | 2/2019 |

OTHER PUBLICATIONS

Liu et al, Frontiers in Immunology, 2017, vol. 8, article 38, 15 pages (Year: 2017).*
Hurwitz et al (Cancer Chemother Pharmacol, 2012, vol. 69, pp. 577-590) (Year: 2012).*
Spiees et al Molecular Immunology, 2015, vol. 67, pp. 95-106 (Year: 2015).*
Yanakieva et al, Mabs, 2022, vol. 14,e2018960, 13 pages, (Year: 2022).*
Acheampong, Protein & Peptide Letters, 2019, vol. 26, pp. 1-14 (Year: 2019).*
Nachon et al, Biochem J, 2011, vol. 434, pp. 73-82 (Year: 2011).*
Silva H M et al., "Novel humanized anti-CD3 antibodies induce a predominantly immunoregulatory profile in human peripheral blood mononuclear cells", Immunology Letters, Elsevier BV, NL, vol. 125, No. 2, Aug. 15, 2009, pp. 129-136.
Chantal Kuhn et al., "Therapeutic anti-CD3 monoclonal antibodies: from bench to bedside", Immunotherapy, vol. 8, No. 8, Jul. 1, 2016, pp. 889-906.
J. S. Bridgeman et al., "CD3[zeta]-based chimeric antigen receptors mediate T cell activation via cis- and trans-signalling mechanisms: implications for optimization of receptor structure for adoptive cell therapy", Clinical and Experimental Immunology, vol. 175, No. 2, Jan. 3, 2014, pp. 258-267.
International Search Report issued in PCT/US2021/012320, dated Apr. 21, 2021, 6 pages.
Anonymous: "Anti-Teplizumab (Anti-Idiotype) Antibody", R&D Systems, Dec. 26, 2019, XP055794516, Retrieved from the Internet: URL:https://resources.rndsystems.com/pdfs/datasheets/mab10245.pdf?v=20210412&ga=2.1 24407754.1383685783.1618286999-1682234979, 1 page.

* cited by examiner

*Primary Examiner* — Karen A. Canella
(74) *Attorney, Agent, or Firm* — Rothwell, Figg, Ernst & Manbeck, P.C.

(57) ABSTRACT

Provided herein are single-chain polypeptides and multi-chain polypeptides that bind specifically to CD3 epsilon (CD3ε). Also provided herein are anti-idiotypic antibodies that bind specifically to any of the antigen-binding domains described herein.

26 Claims, 12 Drawing Sheets
Specification includes a Sequence Listing.

| | | | | | | | | | | | | | | | | | | | | | | | |
|---|---|---|---|---|---|---|---|---|---|---|---|---|---|---|---|---|---|---|---|---|---|---|---|
| B | X | Q | D | G | N | E | E | M | G | G | I | T | Q | T | P | Y | K | V | S | I | S | G | T |
| B | X | Q | D | G | N | E | E | M | G | G | I | T | Q | T | P | Y | | | | | | | |
| B | X | | D | G | N | E | E | M | G | G | I | T | Q | T | P | Y | K | | | | | | |
| B | X | | | G | N | E | E | M | G | G | I | T | Q | T | P | Y | K | V | | | | | |
| B | X | | | | N | E | E | M | G | G | I | T | Q | T | P | Y | K | V | S | | | | |
| B | X | | | | | E | E | M | G | G | I | T | Q | T | P | Y | K | V | S | I | | | |
| B | X | | | | | | E | M | G | G | I | T | Q | T | P | Y | K | V | S | I | S | | |
| B | X | | | | | | | M | G | G | I | T | Q | T | P | Y | K | V | S | I | S | G | |
| B | X | | | | | | | | G | G | I | T | Q | T | P | Y | K | V | S | I | S | G | T |
| B | X | | | | | | | | | G | I | T | Q | T | P | Y | K | V | S | I | S | G | T |
| B | X | | | | | | | | | | I | T | Q | T | P | Y | K | V | S | I | S | G | T |
| B | X | | | | | | | | | | | T | Q | T | P | Y | K | V | S | I | S | G | T |
| B | X | | | | | | | | | | | | Q | T | P | Y | K | V | S | I | S | G | T |
| B | X | | | | | | | | | | | | | T | P | Y | K | V | S | I | S | G | T |
| B | X | A | D | G | N | E | E | M | G | G | I | T | Q | T | P | Y | | | | | | | |
| B | X | Q | A | G | N | E | E | M | G | G | I | T | Q | T | P | | | | | | | | |
| B | X | Q | D | A | N | E | E | M | G | G | I | T | Q | T | P | | | | | | | | |
| B | X | Q | D | G | A | E | E | M | G | G | I | T | Q | T | P | | | | | | | | |
| B | X | Q | D | G | N | A | E | M | G | G | I | T | Q | T | P | | | | | | | | |
| B | X | Q | D | G | N | E | A | M | G | G | I | T | Q | T | P | | | | | | | | |
| B | X | Q | D | G | N | E | E | A | G | G | I | T | Q | T | P | | | | | | | | |
| B | X | Q | D | G | N | E | E | M | A | G | I | T | Q | T | P | | | | | | | | |
| B | X | Q | D | G | N | E | E | M | G | A | I | T | Q | T | P | | | | | | | | |
| B | X | Q | D | G | N | E | E | M | G | G | A | T | Q | T | P | | | | | | | | |
| B | X | Q | D | G | N | E | E | M | G | G | I | A | Q | T | P | | | | | | | | |

| |
|---|
| No Peptide Blank |
| (H2N-QDGNEEMGGITQTPYKVSISGTTVILTC-OH) vCD3e #p1-BSA |
| (H2N-CPQYPGSEILWQHNDK-OH) vCD3e #p2-BSA |
| (H2N-KEFSELEQSGYYVCYPRGSNPEDA-OH) vCD3e #p3-BSA |
| BSA alone |
| huCD3d/eCHO-E DT1331 |
| cyno CD3 (sinobiologicals) |

Figure 9

| T | V | I | L | T | SP34 BD551916 | VCD3-6d11.1#3 | VCD3-6d11.1#5 | cCD3-dil2k-VH5VL2.mG1k | VCD3-6d59.1#4 | VCD3-6d59.1 | amLys-1c3.mG1k | Buffer (2nd alone) |
|---|---|---|---|---|---|---|---|---|---|---|---|---|
|   |   |   |   |   | 6.5 | 1293.5 | 143.5 | 6 | 3164 | 4 | 8.5 | 5.5 |
|   |   |   |   |   | 6 | 164.5 | 44 | 5 | 403.5 | 4 | 7 | 3 |
|   |   |   |   |   | 6 | 21 | 119 | 5 | 44.5 | 5 | 6 | 4.5 |
|   |   |   |   |   | 5.5 | 25 | 9 | 5 | 40.5 | 5 | 6 | 5 |
|   |   |   |   |   | 6 | 20.5 | 12 | 6 | 43 | 6 | 6 | 5 |
|   |   |   |   |   | 5 | 20 | 20 | 7.5 | 44.5 | 5 | 8 | 4 |
|   |   |   |   |   | 6 | 15 | 9 | 6 | 26.5 | 4 | 7 | 4 |
|   |   |   |   |   | 7 | 27 | 10 | 7 | 29.5 | 5 | 7 | 4 |
| T |   |   |   |   | 5 | 19 | 11 | 5.5 | 43 | 3 | 8 | 3 |
| T | V |   |   |   | 5.5 | 26 | 11 | 4 | 29.5 | 6 | 7 | 4 |
| T | V | I |   |   | 6 | 19.5 | 13 | 7 | 47.5 | 4 | 6 | 5 |
| T | V | I | L |   | 5 | 25 | 17 | 7 | 31.5 | 4.5 | 7 | 5 |
| T | V | I | L | T | 6 | 21 | 11 | 9 | 31 | 4 | 5.5 | 6 |
|   |   |   |   |   | 8 | 7925.5 | 3910.5 | 6 | 11332.5 | 5.5 | 18 | 4.5 |
|   |   |   |   |   | 7 | 21 | 12.5 | 7 | 45 | 4 | 8 | 4 |
|   |   |   |   |   | 7 | 34.5 | 17.5 | 5 | 32.5 | 5 | 7 | 4 |
|   |   |   |   |   | 7 | 19.5 | 12 | 7 | 48 | 5 | 7 | 3 |
|   |   |   |   |   | 5 | 190 | 45.5 | 5 | 483 | 5 | 8 | 4 |
|   |   |   |   |   | 5 | 607.5 | 88 | 7.5 | 1484 | 5 | 8 | 4 |
|   |   |   |   |   | 5.5 | 1226.5 | 150.5 | 6 | 2584 | 5 | 8 | 4 |
|   |   |   |   |   | 8 | 1336 | 158.5 | 5 | 2511 | 5 | 6 | 5 |
|   |   |   |   |   | 8 | 1277.5 | 155.5 | 13 | 2663.5 | 5 | 6.5 | 4 |
|   |   |   |   |   | 8 | 1057 | 125.5 | 6.5 | 2634 | 4 | 7 | 5 |
|   |   |   |   |   | 8.5 | 1271.5 | 179.5 | 7 | 2914.5 | 5 | 7 | 3 |
|   |   |   |   |   | 14 | 72 | 22 | 6 | 57.5 | 5 | 6.5 | 5 |
|   |   |   |   |   | 17859 | 19383 | 20097 | 428 | 20256 | 17985.5 | 1997 | 410 |
|   |   |   |   |   | 184.5 | 170 | 172 | 131.5 | 238 | 180 | 150 | 136 |
|   |   |   |   |   | 439 | 442 | 484.5 | 380 | 473 | 453 | 442.5 | 409 |
|   |   |   |   |   | 397.5 | 421 | 414 | 381.5 | 420.5 | 423 | 416 | 365.5 |
|   |   |   |   |   | 22061 | 23192.5 | 23230 | 15880 | 23163 | 23049.5 | 1469 | 102 |
|   |   |   |   |   | 17245 | 18388 | 19228 | 2318 | 18777.5 | 16748 | 3192 | 2266 |

Figure 9 (Cont.)

MVCD3-6d59.id Blocking AGS73.15 Binding to human T Cells
AGS73@200ng/ml, 2Ab: J.I gxhIgG-Fc-PE

- MVCD3-6d59.id.1b18.1
- MVCD3-6d59.id.1b54.1
- MVCD3-6d59.id.1b61.1
- MVCD3-6d59.id.1b67.1
- MVCD3-6d59.id.1b73.1
- MVCD3-6d59.id.1b76.1
- MVCD3-6d59.id.1b71.1

MVCD3-6d59.id Ab conc. ug/ml

Figure 10

MVCD3-6d59.id Block AGS73.15 Binding to Human T Cells

| 6d59.id | 1b18.1 | 1b54.1 | 1b61.1 | 1b67.1 | | 1b73.1 | 1b76.1 | 1b71.1 |
|---|---|---|---|---|---|---|---|---|
| EC50 | 0.4426 | 0.4135 | 0.3681 | 0.5604 | | 0.3351 | 0.2434 | 0.3273 |

Figure 11

SINGLE-AND MULTI-CHAIN POLYPEPTIDES THAT BIND SPECIFICALLY TO CD3 EPSILON

CROSS-REFERENCE TO RELATED APPLICATIONS

This application is a 35 U.S.C. National Phase Entry Application from PCT/US2021/012320 filed Jan. 6, 2021, which claims the benefit of U.S. Provisional Application No. 62/957,735, filed on Jan. 6, 2020, pursuant to 35 U.S.C. § 119(e), each of which are incorporated herein by reference in their entireties.

TECHNICAL FIELD

The present disclosure relates to the field of biotechnology, and more specifically, to antigen-binding molecules.

REFERENCE TO SEQUENCE LISTING

The Sequence Listing submitted electronically concurrently herewith pursuant 37 C.F.R. § 1.821 in computer readable form (ASCII format) via EFS-Web as file name CYTX-067-PCT_ST25.txt is incorporated herein by reference. The ASCII copy of the Sequence Listing was created on Jan. 5, 2021 and is 62 kilobytes in size.

BACKGROUND

Anti-CD3 epsilon (CD3ε) antibodies have been in use for several years and have been designed to function in a variety of roles and combat a number of diseases. Many of these anti-CD3ε antibodies are derived from only a few variants, including SP-34. In order to further develop the efficacy, safety, and manufacturability of anti-CD3ε antibodies, additional anti-CD3ε antibodies are desired. There is a need for anti-CD3ε antibodies with different binding affinities to SP-34, in order to develop therapeutics with tailored binding affinities to treat specific diseases. These desired CD3ε antibodies improvements for therapeutic development need to have human and cynomolgus monkey cross-reactivity.

SUMMARY

Provided herein are polypeptides that include a light chain variable domain and a heavy chain variable domain that form an antigen-binding domain that binds specifically to CD3 epsilson (CD3ε). Provided herein are multi-chain polypeptides that include a light chain variable domain and a heavy chain variable domain that form an antigen-binding domain that binds specifically to CD3ε. Also provided are single-chain polypeptides that include a light chain variable domain and a heavy chain variable domain that form an antigen-binding domain that binds specifically to CD3ε. Also provided herein are anti-idiotypic antibodies that bind specifically to any of the antigen-binding domains described herein. Also provided are nucleic acid(s) that encode any of the polypeptides described herein (e.g., any of the single- or multi-chain polypeptides described herein) or any of the anti-idiotypic antibodies described herein, cells containing any of these nucleic acid(s), and methods of making any of the polypeptides described herein (e.g., any of the single- and multi-chain polypeptides described herein) using these cells. Also provided herein are methods of treating a subject in need thereof that include administering any of the polypeptides described herein (e.g., any of the single- or multi-chain polypeptides described herein).

Provided herein are polypeptides that include: (a) a light chain variable domain comprising a sequence of SEQ ID NO: 1, and a heavy chain variable domain comprising a sequence of SEQ ID NO: 3; (b) a light chain variable domain comprising a sequence of SEQ ID NO: 8, and a heavy chain variable domain comprising a sequence of SEQ ID NO: 10; (c) a light chain variable domain comprising a sequence of SEQ ID NO: 12, and a heavy chain variable domain comprising a sequence of SEQ ID NO: 14; (d) a light chain variable domain comprising a sequence of SEQ ID NO: 26, and a heavy chain variable domain comprising a sequence of SEQ ID NO: 115; (e) a light chain variable domain comprising a sequence of SEQ ID NO: 1, and a heavy chain variable domain comprising a sequence of SEQ ID NO: 5; (f) a light chain variable domain comprising a sequence of SEQ ID NO: 1, and a heavy chain variable domain comprising a sequence of SEQ ID NO: 6; (g) a light chain variable domain comprising a sequence of SEQ ID NO: 1, and a heavy chain variable domain comprising a sequence of SEQ ID NO: 7, or (h) a light chain variable domain comprising a sequence of SEQ ID NO: 16, and a heavy chain variable domain comprising a sequence of SEQ ID NO: 18, where the light chain variable domain and the heavy chain variable domain form an antigen-binding domain that binds specifically to CD3ε.

Provided herein are multi-chain polypeptides that include: (a) a first polypeptide including a light chain variable domain including a sequence of SEQ ID NO: 1, and a second polypeptide including a heavy chain variable domain including a sequence of SEQ ID NO: 3; (b) a first polypeptide including a light chain variable domain including a sequence of SEQ ID NO: 8, and a second polypeptide including a heavy chain variable domain including a sequence of SEQ ID NO: 10; (c) a first polypeptide including a light chain variable domain including a sequence of SEQ ID NO: 12, and a second polypeptide including a heavy chain variable domain including a sequence of SEQ ID NO: 14; (d) a first polypeptide including a light chain variable domain including a sequence of SEQ ID NO: 26, and a second polypeptide including a heavy chain variable domain including a sequence of SEQ ID NO: 115; (e) a light chain variable domain comprising a sequence of SEQ ID NO: 1, and a heavy chain variable domain comprising a sequence of SEQ ID NO: 5; (f) a light chain variable domain comprising a sequence of SEQ ID NO: 1, and a heavy chain variable domain comprising a sequence of SEQ ID NO: 6; (g) a light chain variable domain comprising a sequence of SEQ ID NO: 1, and a heavy chain variable domain comprising a sequence of SEQ ID NO: 7, or (h) a light chain variable domain comprising a sequence of SEQ ID NO: 16, and a heavy chain variable domain comprising a sequence of SEQ ID NO: 18, where the light chain variable domain and the heavy chain variable domain form an antigen-binding domain that binds specifically to CD3δ.

In some embodiments, the multi-chain polypeptide includes a first polypeptide including a light chain variable domain including a sequence of SEQ ID NO: 1, and a second polypeptide including a heavy chain variable domain including a sequence of SEQ ID NO: 3.

In some embodiments, the multi-chain polypeptide includes a first polypeptide including a light chain variable domain including a sequence of SEQ ID NO: 8, and a second polypeptide including a heavy chain variable domain including a sequence of SEQ ID NO: 10.

In some embodiments, the multi-chain polypeptide includes a first polypeptide including a light chain variable domain including a sequence of SEQ ID NO: 12, and a second polypeptide including a heavy chain variable domain including a sequence of SEQ ID NO: 14.

In some embodiments, the multi-chain polypeptide includes a first polypeptide including a light chain variable domain including a sequence of SEQ ID NO: 26, and a second polypeptide including a heavy chain variable domain including a sequence of SEQ ID NO: 115.

In some embodiments, the multi-chain polypeptide includes a first polypeptide including a light chain variable domain including a sequence of SEQ ID NO: 1, and a second polypeptide including a heavy chain variable domain including a sequence of SEQ ID NO: 5.

In some embodiments, the multi-chain polypeptide includes a first polypeptide including a light chain variable domain including a sequence of SEQ ID NO: 1, and a second polypeptide including a heavy chain variable domain including a sequence of SEQ ID NO: 6.

In some embodiments, the multi-chain polypeptide includes a first polypeptide including a light chain variable domain including a sequence of SEQ ID NO: 1, and a second polypeptide including a heavy chain variable domain including a sequence of SEQ ID NO: 7.

In some embodiments, the multi-chain polypeptide includes a first polypeptide including a light chain variable domain including a sequence of SEQ ID NO: 16, and a second polypeptide including a heavy chain variable domain including a sequence of SEQ ID NO: 18.

In some embodiments, the multi-chain polypeptide is selected from the group consisting of: a VHH-scAb, a VHH-Fab, a Dual scFab, a F(ab')2, a diabody, a crossMab, a DAF (two-in-one), a DAF (four-in-one), a DutaMab, a DT-IgG, a knobs-in-holes common light chain, a knobs-in-holes assembly, a charge pair, a Fab-arm exchange, a SEED-body, a LUZ-Y, a FcAb, a κλ-body, an orthogonal Fab, a DVD-IgG, a IgG(H)-scFv, a scFv-(H)IgG, IgG(L)-scFv, scFv-(L)IgG, IgG(L,H)-Fv, IgG(H)-V, V(H)—IgG, IgG(L)-V, V(L)-IgG, KIH IgG-scFab, 2scFv-IgG, IgG-2scFv, scFv4-Ig, Zybody, DVI-IgG, Diabody-CH3, a triple body, a miniantibody, a minibody, a TriBi minibody, scFv-CH3 KIH, Fab-scFv, a F(ab')2-scFv2, a scFv-KIH, a Fab-scFv-Fc, a tetravalent HCAb, a scDiabody-Fc, a Diabody-Fc, a tandem scFv-Fc, a VHH-Fc, a tandem VHH-Fc, a VHH-Fc KiH, a Fab-VHH-Fc, an Intrabody, a dock and lock, an ImmTAC, an IgG-IgG conjugate, a Cov-X-Body, a scFv1-PEG-scFv2, an Adnectin, a DARPin, a fibronectin, and a DEP conjugate.

In some embodiments, the multi-chain polypeptide is an antibody that binds specifically to CD3 epsilon or an antigen-binding fragment thereof. In some embodiments, the antibody is an IgG. In some embodiments, the antibody is an IgG1, IgG2, IgG3, or an IgG4. In some embodiments, the antibody is an IgG2a. In some embodiments, the antibody is an IgM, IgA, or IgE. In some embodiments, the antigen-binding fragment is a Fab, F(ab')2, Fab', or Fv.

In some embodiments, the multi-chain polypeptide includes an additional light chain variable domain and an additional heavy chain variable domain. In some embodiments, the multi-chain polypeptide is humanized. In some embodiments of the multi-chain polypeptide, at least one polypeptide of the multi-chain polypeptide is conjugated to a toxin, a radioisotope, a drug, or a small molecule via a cleavable linker. In some embodiments of the multi-chain polypeptide, at least one polypeptide of the multi-chain polypeptide is conjugated to a toxin, a radioisotope, a drug, or a small molecule via a non-cleavable linker.

Also provided herein are pharmaceutical compositions including any of the multi-chain polypeptides described herein.

Also provided herein are methods of treating a subject in need thereof including administering to the subject any of the multi-chain polypeptides described herein or any of the pharmaceutical compositions described herein.

Also provided herein are sets nucleic acids that together encode polypeptides that together make up any of the multi-chain polypeptides described herein. In some embodiments, the set of nucleic acids is a pair of expression vectors. In some embodiments, the set of nucleic acids are present in a single expression vector.

Also provided herein are nucleic acids that encode polypeptides that together make up any of the multi-chain polypeptides described herein. In some embodiments, the nucleic acid is an expression vector.

Also provided herein are host cells that include any of the sets nucleic acids described herein. Also provided herein are host cells that include any of the nucleic acids described herein.

Also provided herein are methods of producing a multi-chain polypeptide including: (a) culturing any of cells described herein in a liquid culture medium under conditions that allow for the production of the multi-chain polypeptide; and (b) recovering the multi-chain polypeptide from the cell or the liquid culture medium. In some embodiments, the method further includes: (c) purifying the multi-chain polypeptide. In some embodiments, the method further includes: (d) formulating the multi-chain polypeptide into a pharmaceutical composition.

Also provided herein are pharmaceutical compositions produced by any of the methods described herein. Also provided herein are kits including any of the multi-chain polypeptides described herein or any of the pharmaceutical compositions described herein.

Also provided herein are single-chain polypeptides that include: (a) a light chain variable domain including a sequence of SEQ ID NO: 1, and a heavy chain variable domain including a sequence of SEQ ID NO: 3; (b) a light chain variable domain including a sequence of SEQ ID NO: 8, and a heavy chain variable domain including a sequence of SEQ ID NO: 10; (c) a light chain variable domain including a sequence of SEQ ID NO: 12, and a heavy chain variable domain including a sequence of SEQ ID NO: 14, or (d) a light chain variable domain including a sequence of SEQ ID NO: 26, and a heavy chain variable domain including a sequence of SEQ ID NO: 115; (e) a light chain variable domain comprising a sequence of SEQ ID NO: 1, and a heavy chain variable domain comprising a sequence of SEQ ID NO: 5; (f) a light chain variable domain comprising a sequence of SEQ ID NO: 1, and a heavy chain variable domain comprising a sequence of SEQ ID NO: 6; (g) a light chain variable domain comprising a sequence of SEQ ID NO: 1, and a heavy chain variable domain comprising a sequence of SEQ ID NO: 7, or (h) a light chain variable domain comprising a sequence of SEQ ID NO: 16, and a heavy chain variable domain comprising a sequence of SEQ ID NO: 18, where the light chain variable domain and the heavy chain variable domain form an antigen-binding domain that binds specifically to CD3ε.

In some embodiments, the single-chain polypeptide includes a light chain variable domain including a sequence of SEQ ID NO: 1, and a heavy chain variable domain including a sequence of SEQ ID NO: 3.

In some embodiments, the single-chain polypeptide includes a light chain variable domain including a sequence of SEQ ID NO: 8, and a heavy chain variable domain including a sequence of SEQ ID NO: 10.

In some embodiments, the single-chain polypeptide includes a light chain variable domain including a sequence of SEQ ID NO: 12, and a heavy chain variable domain including a sequence of SEQ ID NO: 14.

In some embodiments, the single-chain polypeptide includes a light chain variable domain including a sequence of SEQ ID NO: 26, and a heavy chain variable domain including a sequence of SEQ ID NO: 115.

In some embodiments, the single-chain polypeptide includes a light chain variable domain including a sequence of SEQ ID NO: 1, and a heavy chain variable domain including a sequence of SEQ ID NO: 5.

In some embodiments, the single-chain polypeptide includes a light chain variable domain including a sequence of SEQ ID NO: 1, and a heavy chain variable domain including a sequence of SEQ ID NO: 6.

In some embodiments, the single-chain polypeptide includes a light chain variable domain including a sequence of SEQ ID NO: 1, and a heavy chain variable domain including a sequence of SEQ ID NO: 7.

In some embodiments, the single-chain polypeptide includes a light chain variable domain including a sequence of SEQ ID NO: 16, and a heavy chain variable domain including a sequence of SEQ ID NO: 18.

In some embodiments, the antigen-binding domain is a scFv.

In some embodiments, the single-chain polypeptide is a BiTE, a (scFv)2, a nanobody, a nanobody-HSA, a DART, a TandAb, a scDiabody, a scDiabody-CH3, scFv-CH-CL-scFv, a HSAbody, scDiabody-HSA, or a tandem-scFv.

In some embodiments, the single-chain polypeptide includes an additional light chain variable domain and an additional heavy chain variable domain.

In some embodiments, the single-chain polypeptide is a chimeric antigen receptor (CAR).

In some embodiments, the single-chain polypeptide is humanized.

In some embodiments, the single-chain polypeptide is conjugated to a toxin, a radioisotope, a drug, or a small molecule via a cleavable linker. In some embodiments, the single-chain polypeptide is conjugated to a toxin, a radioisotope, a drug, or a small molecule via a non-cleavable linker.

Also provided herein are pharmaceutical compositions that include any of the single-chain polypeptides described herein.

Also provided herein are methods of treating a subject in need thereof including administering to the subject any of the single-chain polypeptides described herein or any of the pharmaceutical compositions described herein.

Also provided herein a are nucleic acids that encode any of the single-chain polypeptides described herein. In some embodiments, the nucleic acid is an expression vector.

Also provided herein are host cells described herein that include any of the nucleic acids that encode any of the single-chain polypeptides.

Also provided herein are methods of producing a single-chain polypeptide including: (a) culturing any of the host cells described herein in a liquid culture medium under conditions that allow for the production of the single-chain polypeptide; and (b) recovering the single-chain polypeptide from the cell or the liquid culture medium. In some embodiments, the method further includes (c) purifying the single-chain polypeptide. In some embodiments, the method further includes: (d) formulating the single-chain polypeptide into a pharmaceutical composition.

Also provided herein are pharmaceutical compositions produced by any of the methods described herein. Also provided herein are kits including any of the single-chain polypeptides described herein or any of the pharmaceutical compositions described herein.

An "antigen-binding domain" is one or more protein domain(s) (e.g., formed from amino acids from a single polypeptide or formed from amino acids from two or more polypeptides (e.g., the same or different polypeptides)) that is capable of specifically binding to an antigen. In some examples, an antigen-binding domain can bind to an antigen or epitope with specificity and affinity similar to that of naturally-occurring antibodies. In some embodiments, the antigen-binding domain can be an antibody or a fragment thereof. In some embodiments, an antigen-binding domain can include an alternative scaffold. Non-limiting examples of antigen-binding domains are described herein. Additional examples of antigen-binding domains are known in the art.

The term "antibody" is used herein in its broadest sense and includes certain types of immunoglobulin molecules that include one or more antigen-binding domains that specifically bind to an antigen or epitope. An antibody specifically includes, e.g., intact antibodies (e.g., intact immunoglobulins, e.g., human IgG (e.g., human IgG1, human IgG2, human IgG3, human IgG4, IgG2a (e.g., human IgG2a))), antibody fragments, and multi-specific antibodies. One example of an antigen-binding domain is an antigen-binding domain formed by a VH-VL dimer. For example, an antigen-binding domain can be an scFv (e.g., an scFv having a heavy chain variable domain (VH) separated from a light chain variable domain (VL) by a peptide linker, or having a VL separated from a VH by a peptide linker). One example of an antibody is an anti-idiotypic (anti-ID) antibody or an anti-idiotypic scFv. Additional examples of an antibody are described herein. Additional examples of an antibody are known in the art.

"Affinity" refers to the strength of the sum total of non-covalent interactions between an antigen-binding domain and its binding partner (e.g., an antigen or epitope). Unless indicated otherwise, as used herein, "affinity" refers to intrinsic binding affinity, which reflects a 1:1 interaction between members of an antigen-binding domain and an antigen or epitope. The affinity of a molecule X for its partner Y can be represented by the dissociation equilibrium constant (KD). Affinity can be measured by common methods known in the art, including those described herein. Affinity can be determined, for example, using surface plasmon resonance (SPR) technology (e.g., BIACORE®) or biolayer interferometry (e.g., FORTEBIO®). Additional methods for determining the affinity for an antigen-binding domain and its corresponding antigen or epitope are known in the art.

The term "epitope" means a portion of an antigen that is specifically bound by an antigen-binding domain through a set of physical interactions between: (i) all monomers (e.g. individual amino acid residues, sugar side chains, and post-translationally modified amino acid residues) on the portion of the antigen-binding domain that specifically binds the antigen and (ii) all monomers (e.g. individual amino acid residues, sugar side chains, post-translationally modified amino acid residues) on the portion of the antigen that is specifically bound by the antigen-binding domain. Epitopes can, e.g., consist of surface-accessible amino acid residues, sugar side chains, phosphorylated amino acid residues, methylated amino acid residues, and/or acetylated amino acid residues and may have specific three-dimensional structural characteristics, as well as specific charge characteristics. Conformational and non-conformational epitopes are distinguished in that binding to the former, but not the latter, may be lost in the presence of denaturing solvents. In some embodiments, an epitope is defined by a linear amino acid sequence of at least about 3 to 6 amino acids, or about 10 to 15 amino acids. In some embodiments, an epitope refers to a portion of a full-length protein or a portion thereof that is defined by a three-dimensional structure (e.g., protein folding). In some embodiments, an epitope is defined by a discontinuous amino acid sequence that is brought together via protein folding. In some embodiments, an epitope is defined by a discontinuous amino acid sequence that is brought together by quaternary structure (e.g., a cleft formed by the interaction of two different polypeptide chains). The amino acid sequences between the residues that define the epitope may not be critical to three-dimensional structure of the epitope. A conformational epitope may be determined and screened using assays that compare binding of antigen-binding protein construct to a denatured version of the antigen, such that a linear epitope is generated. An epitope may include amino acid residues that are directly involved in the binding, and other amino acid residues, which are not directly involved in the binding.

Methods for identifying an epitope to which an antigen-binding domain specifically binds are known in the art, e.g., structure-based analysis (e.g. X-ray crystallography, NMR, and/or electron microscopy) (e.g. on the antigen and/or the antigen-antigen binding domain complex) and/or mutagenesis-based analysis (e.g. alanine scanning mutagenesis, glycine scanning mutagenesis, and homology scanning mutagenesis) wherein mutants are measured in a binding assay with a binding partner, many of which are known in the art.

The term "paratope" means a portion of an antigen-binding domain that specifically binds to an antigen through a set of physical interactions between: (i) all monomers (e.g. individual amino acid residues, sugar side chains, posttranslationally modified amino acid residues) on the portion of the antigen-binding domain that specifically binds the antigen and (ii) all monomers (e.g. individual amino acid residues, sugar side chains, posttranslationally modified amino acid residues) on the portion of the antigen that is specifically bound by the antigen-binding domain. Paratopes can, e.g. consist of surface-accessible amino acid residues and may have specific three-dimensional structural characteristics, as well as specific charge characteristics. In some embodiments, a paratope refers to a portion of a full-length antigen-binding domain or a portion thereof that is defined by a three-dimensional structure (e.g., protein folding). In some embodiments, a paratope is defined by a discontinuous amino acid sequence that is brought together via protein folding. In some embodiments, an epitope is defined by a discontinuous amino acid sequence that is brought together by quaternary structure (e.g., a cleft formed by the interaction of two different polypeptide chains). The amino acid sequences between the residues that define the paratope may not be critical to three-dimensional structure of the paratope. A paratope may comprise amino acid residues that are directly involved in the binding, and other amino acid residues, which are not directly involved in the binding.

Methods for identifying a paratope to which an antigen-binding domain specifically binds are known in the art, e.g., structure-based analysis (e.g., X-ray crystallography, NMR, and/or electron microscopy) (e.g. on the antigen-binding domain, and/or the antigen binding domain-antigen complex), and/or mutagenesis-based analysis (e.g., alanine scanning mutagenesis, glycine scanning mutagenesis, and homology scanning mutagenesis) wherein mutants are measured in a binding assay with a binding partner, many of which are known in the art.

The phrase "present on the surface of a mammalian cell" means an antigen that physically attached to or at least partially embedded in the plasma membrane of a mammalian cell (e.g., a transmembrane protein, a peripheral membrane protein, a lipid-anchored protein (e.g., a GPI-anchor), an N-myristolyated protein, or a S-palmitoylated protein). Non-limiting methods for determining the presence of antigen on the surface of a mammalian cell include fluorescence-activated cell sorting (FACS), immunohistochemistry, cell-fractionation assays and Western blotting.

The term "anti-idiotypic antibody" can mean or refer to antibodies which bind specifically to at least part of the paratope of any of the antigen-binding domains described herein. An anti-idiotypic antibody can be referred to with the acronyms "Id" or "ID" or "id" herein.

The phrase "target cell" or "target mammalian cell" or "mammalian target cell" means a mammalian cell that has at least one CD3ε present on its surface.

The term "exogenous" refers to any material introduced from or originating from outside a cell, a tissue, or an organism that is not produced by or does not originate from the same cell, tissue, or organism in which it is being introduced.

The term "transduced", "transfected", or "transformed" refers to a process by which an exogenous nucleic acid is introduced or transferred into a cell. A "transduced", "transfected," or "transformed" cell (e.g., mammalian cell) is one that has been transduced, transfected, or transformed with exogenous nucleic acid (e.g., a vector) that includes an exogenous nucleic acid encoding any of the single-chain polypeptides or multi-chain polypeptides described herein.

The term "nucleic acid" refers to a deoxyribonucleic acid (DNA) or ribonucleic acid (RNA), or a combination thereof, in either a single- or double-stranded form. Unless specifically limited, the term encompasses nucleic acids containing known analogues of natural nucleotides that have similar binding properties as the reference nucleotides. Unless otherwise indicated, a particular nucleic acid sequence also implicitly encompasses complementary sequences as well as the sequence explicitly indicated. In some embodiments of any of the nucleic acids described herein, the nucleic acid is DNA. In some embodiments of any of the nucleic acids described herein, the nucleic acid is RNA.

Modifications can be introduced into a nucleotide sequence by standard techniques known in the art, such as site-directed mutagenesis and polymerase chain reaction (PCR)-mediated mutagenesis. Conservative amino acid substitutions are ones in which the amino acid residue is replaced with an amino acid residue having a similar side chain. Families of amino acid residues having similar side chains have been defined in the art. These families include: amino acids with acidic side chains (e.g., aspartate and glutamate), amino acids with basic side chains (e.g., lysine, arginine, and histidine), non-polar amino acids (e.g., alanine, valine, leucine, isoleucine, proline, phenylalanine, methionine, and tryptophan), uncharged polar amino acids (e.g., glycine, asparagine, glutamine, cysteine, serine, threonine and tyrosine), hydrophilic amino acids (e.g., arginine, asparagine, aspartate, glutamine, glutamate, histidine, lysine, serine, and threonine), hydrophobic amino acids (e.g., alanine, cysteine, isoleucine, leucine, methionine, phenylalanine, proline, tryptophan, tyrosine, and valine). Other families of amino acids include: aliphatic-hydroxy amino acids (e.g., serine and threonine), amide family (e.g., asparagine and glutamine), alphatic family (e.g., alanine, valine, leucine and isoleucine), aromatic family (e.g., phenylalanine, tryptophan, and tyrosine).

As used herein the phrase "specifically binds" or "binds specifically" means that the antigen-binding domain binds one or more antigenic determinants of the desired target antigen and does not react with other polypeptides, or binds at much lower affinity, e.g., about or greater than $10^{-6}$ M.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

BRIEF DESCRIPTION OF DRAWINGS

FIG. 9 is a chart showing the relative ability of different antibodies to bind to the different sequences shown (sequences from top to bottom are SEQ ID NOs: 86-113). Higher numbers indicate higher level of binding than lower numbers.

FIG. 10 is a graph showing the relative ability of 6d59 antibody to bind to human T cells in the presence of different concentrations of different anti-idiotypic antibodies. Binding is indicated by mean fluorescent intensity (MFI).

FIG. 11 is a graph showing the relative ability of 6d59 antibody to human T cells following treatment different concentrations of different anti-idiotypic antibodies. Binding is indicated by % binding.

DETAILED DESCRIPTION

Figure 1:
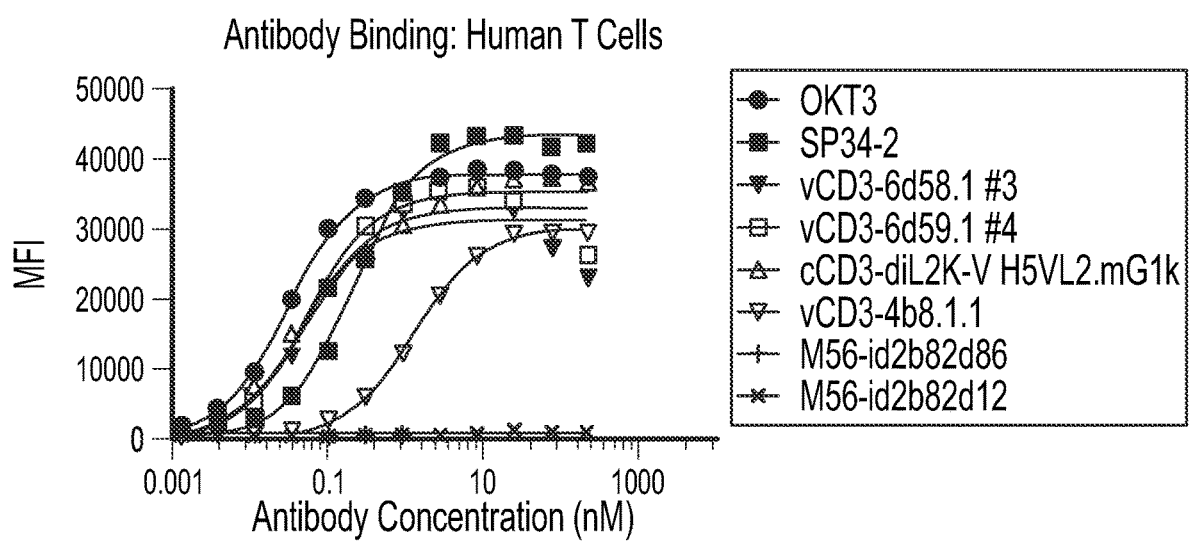
FIG. 1 is a graph showing the binding of different antibodies to human T cells.

Provided herein are polypeptides that include: (a) a light chain variable domain comprising a sequence of SEQ ID NO: 1, and a heavy chain variable domain comprising a sequence of SEQ ID NO: 3; (b) a light chain variable domain comprising a sequence of SEQ ID NO: 8, and a heavy chain variable domain comprising a sequence of SEQ ID NO: 10; (c) a light chain variable domain comprising a sequence of SEQ ID NO: 12, and a heavy chain variable domain comprising a sequence of SEQ ID NO: 14; (d) a light chain variable domain comprising a sequence of SEQ ID NO: 26, and a heavy chain variable domain comprising a sequence of SEQ ID NO: 115, (e) a light chain variable domain comprising a sequence of SEQ ID NO: 1, and a heavy chain variable domain comprising a sequence of SEQ ID NO: 5, (f) a light chain variable domain comprising a sequence of SEQ ID NO: 1, and a heavy chain variable domain comprising a sequence of SEQ ID NO: 6, (g) a light chain variable domain comprising a sequence of SEQ ID NO: 1, and a heavy chain variable domain comprising a sequence of SEQ ID NO: 7, or (h) a light chain variable domain comprising a sequence of SEQ ID NO: 16, and a heavy chain variable domain comprising a sequence of SEQ ID NO: 18, where the light chain variable domain and the heavy chain variable domain form an antigen-binding domain that binds specifically to CD3ε.

Provided herein are multi-chain polypeptides including: (a) a first polypeptide including a light chain variable domain including a sequence that is at least 80% identical to SEQ ID NO: 1, and a second polypeptide including a heavy chain variable domain including a sequence that is at least 80% identical to SEQ ID NO: 3; (b) a first polypeptide including a light chain variable domain including a sequence that is at least 80% identical to SEQ ID NO: 8, and a second polypeptide including a heavy chain variable domain including a sequence that is at least 80% identical to SEQ ID NO: 10; (c) a first polypeptide including a light chain variable domain including a sequence that is at least 80% identical to SEQ ID NO: 12, and a second polypeptide including a heavy chain variable domain including a sequence that is at least 80% identical to SEQ ID NO: 14; or (d) a first polypeptide including a light chain variable domain including a sequence that is at least 80% identical to SEQ ID NO: 26, and a second polypeptide including a heavy chain variable domain including a sequence that is at least 80% identical to SEQ ID NO: 115; wherein the light chain variable domain and the heavy chain variable domain form an antigen-binding domain that binds specifically to CD3ε.

Also provided herein are single-chain polypeptides that include: (a) a first polypeptide including a light chain variable domain including a sequence that is at least 80% identical to SEQ ID NO: 1, and a second polypeptide including a heavy chain variable domain including a sequence that is at least 80% identical to SEQ ID NO: 3; (b) a first polypeptide including a light chain variable domain including a sequence that is at least 80% identical to SEQ ID NO: 8, and a second polypeptide including a heavy chain variable domain including a sequence that is at least 80% identical to SEQ ID NO: 10; (c) a first polypeptide including a light chain variable domain including a sequence that is at least 80% identical to SEQ ID NO: 12, and a second polypeptide including a heavy chain variable domain including a sequence that is at least 80% identical to SEQ ID NO: 14; or (d) a first polypeptide including a light chain variable domain including a sequence that is at least 80% identical to SEQ ID NO: 26, and a second polypeptide including a heavy chain variable domain including a sequence that is at least 80% identical to SEQ ID NO: 115; where the light chain variable domain and the heavy chain variable domain form an antigen-binding domain that binds specifically to CD3ε.

In some embodiments of any of the single-chain polypeptides described herein, the antigen-binding domain is an scFv (e.g., where the light chain variable domain is N-terminal to the heavy chain variable domain, and the light chain variable domain is separated from the heavy chain variable domain by a peptide linker (e.g., a peptide linker of 1 amino acid to about 25 amino acids, 1 amino acid to about 20 amino acids, 1 amino acid to about 15 amino acids, 1 amino acid to about 10 amino acids, 1 amino acid to about 5 amino acids), or the heavy chain variable domain is N-terminal to the light chain variable domain, and the heavy chain variable domain is separated from the light chain variable domain by a peptide linker).

In some embodiments of any of the single-chain or multi-chain polypeptides described herein, the single-chain or multi-chain polypeptide includes an antigen-binding domain that binds specifically to CD3ε that includes a light chain variable domain that includes a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 1, 8, 12, 16, 20, 24, or 26. In some embodiment of any of the single-chain or multi-chain polypeptides described herein, the single-chain or multi-chain polypeptide includes an antigen-binding domain that binds specifically to CD3ε that includes a heavy chain variable domain that includes a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 3, 5, 6, 7, 10, 14, 18, 22 or 115.

In some embodiments of any of the single-chain or multi-chain polypeptides described herein, the single-chain or multi-chain polypeptide includes an antigen-binding domain that binds specifically to CD3ε that includes: (a) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 3, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 1; (b) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 10, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 8; (c) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 14, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 12; or (d) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 115, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 26.

In some embodiments of any of the single-chain or multi-chain polypeptides described herein, the single-chain or multi-chain polypeptide includes a heavy chain variable domain comprising CDRs of SYGMH (SEQ ID NO: 54), IIWYDGSKRYYADSVKG (SEQ ID NO: 55), and DLITGTTDY (SEQ ID NO: 56), and a light chain variable domain comprising CDRs of RSSRSLVYSDGNTHLI (SEQ ID NO: 51), RVSNRVS (SEQ ID NO: 52), and LQGAHWPYT (SEQ ID NO: 53).

In some embodiments of any of the single-chain or multi-chain polypeptides described herein, the single-chain or multi-chain polypeptide includes a light chain variable domain comprising the three CDRs within a light chain variable domain of SEQ ID NO: 1, and a heavy chain variable domain comprising the three CDRs within a heavy chain variable domain of SEQ ID NO: 3.

In some embodiments of any of the single-chain or multi-chain polypeptides described herein, the single-chain or multi-chain polypeptide includes a light chain variable domain comprising the three CDRs within a light chain variable domain of SEQ ID NO: 1, and a heavy chain variable domain comprising the three CDRs within a heavy chain variable domain of SEQ ID NO: 5.

In some embodiments of any of the single-chain or multi-chain polypeptides described herein, the single-chain or multi-chain polypeptide includes a light chain variable domain comprising the three CDRs within a light chain variable domain of SEQ ID NO: 1, and a heavy chain variable domain comprising the three CDRs within a heavy chain variable domain of SEQ ID NO: 6.

In some embodiments of any of the single-chain or multi-chain polypeptides described herein, the single-chain or multi-chain polypeptide includes a light chain variable domain comprising the three CDRs within a light chain variable domain of SEQ ID NO: 1, and a heavy chain variable domain comprising the three CDRs within a heavy chain variable domain of SEQ ID NO: 7.

In some embodiments of any of the single-chain or multi-chain polypeptides described herein, the single-chain or multi-chain polypeptide includes a light chain variable domain comprising the three CDRs within a light chain variable domain of SEQ ID NO: 8, and a heavy chain variable domain comprising the three CDRs within a heavy chain variable domain of SEQ ID NO: 10.

In some embodiments of any of the single-chain or multi-chain polypeptides described herein, the single-chain or multi-chain polypeptide includes a light chain variable domain comprising the three CDRs within a light chain variable domain of SEQ ID NO: 12, and a heavy chain variable domain comprising the three CDRs within a heavy chain variable domain of SEQ ID NO: 14.

In some embodiments of any of the single-chain or multi-chain polypeptides described herein, the single-chain or multi-chain polypeptide includes a light chain variable domain comprising the three CDRs within a light chain variable domain of SEQ ID NO: 26, and a heavy chain variable domain comprising the three CDRs within a heavy chain variable domain of SEQ ID NO: 115.

In some embodiments of any of the single-chain or multi-chain polypeptides described herein, the single-chain or multi-chain polypeptide includes a light chain variable domain comprising the three CDRs within a light chain variable domain of SEQ ID NO: 16, and a heavy chain variable domain comprising the three CDRs within a heavy chain variable domain of SEQ ID NO: 18.

In some embodiments of any of the single-chain or multi-chain polypeptides described herein, the single-chain or multi-chain polypeptide includes a light chain variable domain comprising the three CDRs within a light chain variable domain of SEQ ID NO: 20, and a heavy chain variable domain comprising the three CDRs within a heavy chain variable domain of SEQ ID NO: 22.

In some embodiments of any of the single-chain or multi-chain polypeptides described herein, the single-chain or multi-chain polypeptide includes a light chain variable domain comprising the three CDRs within a light chain variable domain of SEQ ID NO: 24, and a heavy chain variable domain comprising the three CDRs within a heavy chain variable domain of SEQ ID NO: 22.

In some embodiments of any of the single-chain or multi-chain polypeptides described herein, the single-chain or multi-chain polypeptide includes an additional light chain variable domain and an additional heavy chain variable domain. In some embodiments of any of the single-chain or multi-chain polypeptides described herein, a polypeptide of the multi-chain polypeptide is conjugated to a toxin, a radioisotope, a drug, or a small molecule via a cleavable linker or a non-cleavable linker.

Also provided herein are pharmaceutical compositions including any of the single-chain polypeptides or multi-chain polypeptides described herein. Also provided herein are methods of treating a subject in need thereof that include administering a therapeutically effective amount of any of the single-chain polypeptides or multi-chain polypeptides described herein, or any of the pharmaceutical compositions described herein, to the subject.

CD3ε or Epitope of CD3ε

The cluster of differentiation 3-epsilon (CD3ε) gene encodes the CD3-epsilon (CD3ε or CDe) polypeptide. Together with CD3-gamma, CD3-delta, CD3-zeta, and the T-cell receptor alpha/beta and gamma/delta heterodimers, CD3ε forms the T-cell receptor-CD3 complex. The human CD3ε gene is located on chromosome 11q23.3. It contains 9 exons (NCBI Accession No. NG_007383.1). SEQ ID NO: 50 is an exemplary wild type human CD3ε protein.

```
Human Wild type CD3ε (NCBI Accession No.
NP_000724.1)
                                        (SEQ ID NO: 50)
DGNEEMGGITQTPYKVSISGTTVILTCPQYPGSEILWQHNDKNIGGDED

DKNIGSDEDHLSLKEFSELEQSGYYVCYPRGSKPEDANFYLYLRARVCE

NCMEMDVMSVATIVIVDICITGGLLLLVYYWSKNRKAKAKPVTRGAGAG

GRQRGQNKERPPPVPNPDYEPIRKGQRDLYSGLNQRRI
```

In some embodiments, an antigen-binding domain that binds specifically to CD3ε can include a light chain variable domain that includes the following set of CDR sequences: (a) a CDR1 including RSSRSLVYSDGNTHLI (SEQ ID NO: 51), a CDR2 including RVSNRVS (SEQ ID NO: 52), and a CDR3 including LQGAHWPYT (SEQ ID NO: 53). The CDR sequences disclosed herein were identified in accordance with the definitions of Kabat, Sequences of Proteins of Immunological Interest (National Institutes of Health, Bethesda, Md. (1987 and 1991).

Non-limiting examples of antigen-binding domains that bind specifically to CD3ε can include a light chain variable domain that includes a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 1, 8, 12, 16, 20, 24, or 26.

In some embodiments, an antigen-binding domain that binds specifically to CD3ε can include a heavy chain variable domain that includes the following set of CDR sequences: a CDR1 including SYGMH (SEQ ID NO: 54), a CDR2 including IIWYDGSKRYYADSVKG (SEQ ID NO: 55), and a CDR3 including DLITGTTDY (SEQ ID NO: 56). The CDR sequences disclosed herein were identified in accordance with the definitions of Kabat, Sequences of Proteins of Immunological Interest (National Institutes of Health, Bethesda, Md. (1987 and 1991).

Non-limiting examples of antigen-binding domains that bind specifically to CD3ε can include a heavy chain variable domain that includes a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 3, 5, 6, 7, 10, 14, 18, 22, or 115.

In some embodiments, an antigen-binding domain that binds specifically to CD3ε can include the three heavy chain CDRs of SYGMH (SEQ ID NO: 54), IIWYDGSKRYYADSVKG (SEQ ID NO: 55), and DLITGTTDY (SEQ ID NO: 56), and three light chain CDRs of RSSRSLVYSDGNTHLI (SEQ ID NO: 51), RVSNRVS (SEQ ID NO: 52), and the LQGAHWPYT (SEQ ID NO: 53).

Non-limiting examples of antigen-binding domains that bind specifically to CD3ε can include:
(a) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 3, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 1;
(b) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 10, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 8;
(c) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100°/c identical) to SEQ ID NO: 14, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 12;

(d) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 5, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 1;

(e) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 6, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 1;

(f) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 7, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 1;

(g) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 18, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 16;

(h) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 22, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 20;

(i) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 22, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 24; or (j) a heavy chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 26, and a light chain variable domain including a sequence that is at least 80% identical (e.g., at least 82%, at least 84%, at least 85%, at least 86%, at least 88%, at least 90%, at least 92%, at least 94%, at least 95%, at least 96%, at least 97%, at least 98%, at least 99%, or 100% identical) to SEQ ID NO: 115.

In some embodiments of any of the single-chain polypeptides or multi-chain polypeptides described herein, the single-chain polypeptide or multi-chain polypeptide include an antigen-binding domain (e.g., one, two, three, or four antigen-binding domain) that binds to CD3ε with a binding constant (KD) of about 0.01 nM to about 500 nM (e.g., about 0.01 nM to about 450 nM, about 0.01 nM to about 400 nM, about 0.01 nM to about 350 nM, about 0.01 nM to about 300, about 0.01 nM to about 250 nM, about 0.01 nM to about 200 nM, about 0.01 nM to about 150 nM, about 0.01 nM to about 100 nM, about 0.01 nM to about 80 nM, about 0.01 nM to about 60 nM, about 0.01 nM to about 50 nM, about 0.01 nM to about 40 nM, about 0.01 nM to about 25 nm, about 0.01 nM to about 20 nM, about 0.01 nM to about 15 nM, about 0.01 nM to about 10 nM, about 0.01 nM to about 8 nM, about 0.01 nM to about 6 nM, about 0.01 nM to about 5 nM, about 0.01 nM to about 4 nM, about 0.01 nM to about 3 nM, about 0.01 nM to about 2 nM, about 0.01 nM to about 1 nM, about 0.01 nM to about 0.8 nM, about 0.01 nM to about 0.6 nM, about 0.01 nM to about 0.4 nM, about 0.01 nM to about 0.2 nM, about 0.01 nM to about 0.1 nM, about 0.01 nM to about 0.05 nM, about 0.05 nM to about 500 nM, about 0.05 nM to about 450 nM, about 0.05 nM to about 400 nM, about 0.05 nM to about 350 nM, about 0.05 nM to about 300, about 0.05 nM to about 250 nM, about 0.05 nM to about 200 nM, about 0.05 nM to about 150 nM, about 0.05 nM to about 100 nM, about 0.05 nM to about 80 nM, about 0.05 nM to about 60 nM, about 0.05 nM to about 50 nM, about 0.05 nM to about 40 nM, about 0.05 nM to about 25 nm, about 0.05 nM to about 20 nM, about 0.05 nM to about 15 nM, about 0.05 nM to about 10 nM, about 0.05 nM to about 8 nM, about 0.05 nM to about 6 nM, about 0.05 nM to about 5 nM, about 0.05 nM to about 4 nM, about 0.05 nM to about 3 nM, about 0.05 nM to about 2 nM, about 0.05 nM to about 1 nM, about 0.05 nM to about 0.8 nM, about 0.05 nM to about 0.6 nM, about 0.05 nM to about 0.4 nM, about 0.05 nM to about 0.2 nM, about 0.05 nM to about 0.1 nM, about 0.1 nM to about 500 nM, about 0.1 nM to about 450 nM, about 0.1 nM to about 400 nM, about 0.1 nM to about 350 nM, about 0.1 nM to about 300, about 0.1 nM to about 250 nM, about 0.1 nM to about 200 nM, about 0.1 nM to about 150 nM, about 0.1 nM to about 100 nM, about 0.1 nM to about 80 nM, about 0.1 nM to about 60 nM, about 0.1 nM to about 50 nM, about 0.1 nM to about 40 nM, about 0.1 nM to about 25 nm, about 0.1 nM to about 20 nM, about 0.1 nM to about 15 nM, about 0.1 nM to about 10 nM, about 0.1 nM to about 8 nM, about 0.1 nM to about 6 nM, about 0.1 nM to about 5 nM, about 0.1 nM to about 4 nM, about 0.1 nM to about 3 nM, about 0.1 nM to about 2 nM, about 0.1 nM to about 1 nM, about 0.1 nM to about 0.8 nM, about 0.1 nM to about 0.6 nM, about 0.1 nM to about 0.4 nM, about 0.1 nM to about 0.2 nM, about 0.2 nM to about 500 nM, about 0.2 nM to about 450 nM, about 0.2 nM to about 400 nM, about 0.2 nM to about 350 nM, about 0.2 nM to about 300, about 0.2 nM to about 250 nM, about 0.2 nM to about 200 nM, about 0.2 nM to about 150 nM, about 0.2 nM to about 100 nM, about 0.2 nM to about 80 nM, about 0.2 nM to about 60 nM, about 0.2 nM to about 50 nM, about 0.2 nM to about 40 nM, about 0.2 nM to about 25 nm, about 0.2 nM to about 20 nM, about 0.2 nM to about 15 nM, about 0.2 nM to about 10 nM, about 0.2 nM to about 8 nM, about 0.2 nM to about 6 nM, about 0.2 nM to about 5 nM, about 0.2 nM to about 4 nM, about 0.2 nM to about 3 nM, about 0.2 nM to about 2 nM, about 0.2 nM to about 1 nM, about 0.2 nM to about 0.8 nM, about 0.2 nM to about 0.6 nM, about 0.2 nM to about 0.4 nM, about 0.4 nM to about 500 nM, about 0.4 nM to about 450 nM, about 0.4 nM to about 400 nM, about 0.4 nM to about 350 nM, about 0.4 nM to about 300, about 0.4 nM to about 250 nM, about 0.4 nM to about 200 nM, about 0.4 nM to about 150 nM, about 0.4 nM to about 100 nM, about 0.4 nM to about 80 nM, about 0.4 nM to about 60 nM, about 0.4 nM to about 50 nM, about 0.4 nM to about 40 nM, about 0.4 nM to about 25 nm, about 0.4 nM to about 20 nM, about 0.4 nM to about 15 nM, about 0.4 nM to about 10 nM, about 0.4 nM to about 8 nM, about 0.4 nM to about 6 nM, about 0.4 nM to about 5 nM, about 0.4 nM to about 4 nM, about 0.4 nM to about 3 nM, about 0.4 nM to about 2 nM, about 0.4 nM to about 1 nM, about 0.4 nM to about 0.8 nM, about 0.4 nM to about 0.6 nM, about 0.5 nM to about 500 nM, about 0.5 nM to about 450 nM, about 0.5 nM to about 400 nM, about 0.5 nM to about 350 nM, about 0.5 nM to about 300, about 0.5 nM to about 250 nM, about 0.5 nM to about 200 nM, about 0.5 nM to about 150 nM, about 0.5 nM to about 100 nM, about 0.5 nM to about 80 nM, about 0.5 nM to about 60 nM, about 0.5 nM to about 50 nM, about 0.5 nM to about 40 nM, about 0.5 nM to about 25 nm, about 0.5 nM to about 20 nM, about 0.5 nM to about 15 nM, about 0.5 nM to about 10 nM, about 0.5 nM to about 8 nM, about 0.5 nM to about 6 nM, about 0.5 nM to about 5 nM, about 0.5 nM to about 4 nM, about 0.5 nM to about 3 nM, about 0.5 nM to about 2 nM, about 0.5 nM to about 1 nM, about 0.5 nM to about 0.8 nM, about 0.5 nM to about 0.6 nM, about 0.6 nM to about 500 nM, about 0.6 nM to about 450 nM, about 0.6 nM to about 400 nM, about 0.6 nM to about 350 nM, about 0.6 nM to about 300, about 0.6 nM to about 250 nM, about 0.6 nM to about 200 nM, about 0.6 nM to about 150 nM, about 0.6 nM to about 100 nM, about 0.6 nM to about 80 nM, about 0.6 nM to about 60 nM, about 0.6 nM to about 50 nM, about 0.6 nM to about 40 nM, about 0.6 nM to about 25 nm, about 0.6 nM to about 20 nM, about 0.6 nM to about 15 nM, about 0.6 nM to about 10 nM, about 0.6 nM to about 8 nM, about 0.6 nM to about 6 nM, about 0.6 nM to about 5 nM, about 0.6 nM to about 4 nM, about 0.6 nM to about 3 nM, about 0.6 nM to about 2 nM, about 0.6 nM to about 1 nM, about 0.6 nM to about 0.8 nM, about 1 nM to about 500 nM, about 1 nM to about 450 nM, about 1 nM to about 400 nM, about 1 nM to about 350 nM, about 1 nM to about 300, about 1 nM to about 250 nM, about 1 nM to about 200 nM, about 1 nM to about 150 nM, about 1 nM to about 100 nM, about 1 nM to about 80 nM, about 1 nM to about 60 nM, about 1 nM to about 50 nM, about 1 nM to about 40 nM, about 1 nM to about 25 nm, about 1 nM to about 20 nM, about 1 nM to about 15 nM, about 1 nM to about 10 nM, about 1 nM to about 8 nM, about 1 nM to about 6 nM, about 1 nM to about 5 nM, about 1 nM to about 4 nM, about 1 nM to about 3 nM, about 1 nM to about 2 nM, about 2 nM to about 500 nM, about 2 nM to about 450 nM, about 2 nM to about 400 nM, about 2 nM to about 350 nM, about 2 nM to about 300, about 2 nM to about 250 nM, about 2 nM to about 200 nM, about 2 nM to about 150 nM, about 2 nM to about 100 nM, about 2 nM to about 80 nM, about 2 nM to about 60 nM, about 2 nM to about 50 nM, about 2 nM to about 40 nM, about 2 nM to about 25 nm, about 2 nM to about 20 nM, about 2 nM to about 15 nM, about 2 nM to about 10 nM, about 2 nM to about 8 nM, about 2 nM to about 6 nM, about 2 nM to about 5 nM, about 2 nM to about 4 nM, about 2 nM to about 3 nM, about 5 nM to about 500 nM, about 5 nM to about 450 nM, about 5 nM to about 400 nM, about 5 nM to about 350 nM, about 5 nM to about 300, about 5 nM to about 250 nM, about 5 nM to about 200 nM, about 5 nM to about 150 nM, about 5 nM to about 100 nM, about 5 nM to about 80 nM, about 5 nM to about 60 nM, about 5 nM to about 50 nM, about 5 nM to about 40 nM, about 5 nM to about 25 nm, about 5 nM to about 20 nM, about 5 nM to about 15 nM, about 5 nM to about 10 nM, about 5 nM to about 8 nM, about 5 nM to about 6 nM, about 10 nM to about 500 nM, about 10 nM to about 450 nM, about 10 nM to about 400 nM, about 10 nM to about 350 nM, about 10 nM to about 300, about 10 nM to about 250 nM, about 10 nM to about 200 nM, about 10 nM to about 150 nM, about 10 nM to about 100 nM, about 10 nM to about 80 nM, about 10 nM to about 60 nM, about 10 nM to about 50 nM, about 10 nM to about 40 nM, about 10 nM to about 25 nm, about 10 nM to about 20 nM, about 10 nM to about 15 nM, about 20 nM to about 500 nM, about 20 nM to about 450 nM, about 20 nM to about 400 nM, about 20 nM to about 350 nM, about 20 nM to about 300, about 20 nM to about 250 nM, about 20 nM to about 200 nM, about 20 nM to about 150 nM, about 20 nM to about 100 nM, about 20 nM to about 80 nM, about 20 nM to about 60 nM, about 20 nM to about 50 nM, about 20 nM to about 40 nM, about 50 nM to about 500 nM, about 50 nM to about 450 nM, about 50 nM to about 400 nM, about 50 nM to about 350 nM, about 50 nM to about 300, about 50 nM to about 250 nM, about 50 nM to about 200 nM, about 50 nM to about 150 nM, about 50 nM to about 100 nM, about 50 nM to about 80 nM, about 100 nM to about 500 nM, about 100 nM to about 450 nM, about 100 nM to about 400 nM, about 100 nM to about 350 nM, about 100 nM to about 300, about 100 nM to about 250 nM, about 100 nM to about 200 nM, about 100 nM to about 150 nM, about 250 nM to about 500 nM, about 250 nM to about 450 nM, about 250 nM to about 400 nM, about 250 nM to about 350 nM, about 250 nM to about 300, about 400 nM to about 500 nM, or about 400 nM to about 450 nM).

Multi-Chain Polypeptides

Provided herein are multi-chain polypeptides that include a first polypeptide that includes a light chain variable domain (e.g., any of the light chain variable domains described herein) and a second polypeptide that includes a heavy chain variable domain (e.g., any of the heavy chain variable domains described herein), where the light chain variable domain and the heavy chain variable domain form an antigen-binding domain that binds specifically to CD3ε. In some embodiments, the multi-chain polypeptide includes:

(a) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 1, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 3;

(b) a first polypeptide including a light chain variable domain including a sequence that is at least 80% (e.g., at least 82%, at least 84%, at least 86%, at least 88%, at least 90%, at least 92%, at least 94%, at least 96%, at least 98%, at least 99%, or 100% identical) to SEQ ID NO: 8, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 10;

(c) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 12, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 14;

(d) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 1, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100%/c identical) to SEQ ID NO: 5;

(e) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 1, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 6;

(f) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 1, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 7;

(g) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 16, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 18;

(h) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99/o, or 100% identical) to SEQ ID NO: 20, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 22;

(i) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 24, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 22; where the light chain variable domain and the heavy chain variable domain form an antigen-binding domain that binds specifically to CD3ε; or (j) a first polypeptide including a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 26, and a second polypeptide including a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 115; where the light chain variable domain and the heavy chain variable domain form an antigen-binding domain that binds specifically to CD3ε.

In some embodiments, the multi-chain polypeptide includes:

(a) a first polypeptide including a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 2, and a second polypeptide including a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 4;

(b) a first polypeptide including a light chain variable domain encoded by a sequence that is at least 80% (e.g., at least 82%, at least 84%, at least 86%, at least 88%, at least 90°, at least 92%, at least 94%, at least 96%, at least 98%, at least 99%, or 100% identical) to SEQ ID NO: 9, and a second polypeptide including a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 11;

(c) a first polypeptide including a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 13, and a second polypeptide including a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 15;

(d) a first polypeptide including a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 17, and a second polypeptide including a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 19;

(e) a first polypeptide including a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 21, and a second polypeptide including a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 23;

(f) a first polypeptide including a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 25, and a second polypeptide including a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 23, where the light chain variable domain and the heavy chain variable domain form an antigen-binding domain that binds specifically to CD3ε; or (g) a first polypeptide including a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 35, and a second polypeptide including a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 116; where the light chain variable domain and the heavy chain variable domain form an antigen-binding domain that binds specifically to CD3ε.

In some embodiments, the multi-chain polypeptide is selected from a VHH-scAb, a VHH-Fab, a Dual scFab, a F(ab')2, a diabody, a crossMab®, a DAF (two-in-one), a DAF (four-in-one), a DutaMab®, a DT-IgG, a knobs-in-holes common light chain, a knobs-in-holes assembly, a charge pair, a Fab-arm exchange, a SEEDbody, a LUZ-Y, a FcAb, a κλ-body, an orthogonal Fab, a DVD-IgG, a IgG (H)-scFv, a scFv-(H)IgG, IgG(L)-scFv, scFv-(L)IgG, IgG (L,H)-Fv, IgG(H)-V, V(H)—IgG, IgG(L)-V, V(L)-IgG, KIH IgG-scFab, 2scFv-IgG, IgG-2scFv, scFv4-Ig, Zybody, DVI-IgG, Diabody-CH3, a triple body, a miniantibody, a minibody, a TriBi minibody, scFv-CH3 KIH, Fab-scFv, a F(ab') 2-scFv2, a scFv-KIH, a Fab-scFv-Fc, a tetravalent HCAb, a scDiabody-Fc, a Diabody-Fc, a tandem scFv-Fc, a VHH-Fc, a tandem VHH-Fc, a VHH-Fc KiH, a Fab-VHH-Fc, an Intrabody, a dock and lock, an ImmTAC, an IgG-IgG conjugate, a Cov-X-Body, a scFv1-PEG-scFv2, an Adnectin, a DARPin®, a fibronectin, and a DEP conjugate. See, e.g., Spiess et al., Mol. Immunol. 67:95-106, 2015, incorporated in its entirety herewith, for a description of these elements.

In some embodiments, the multi-chain polypeptide is an antibody (e.g., any of the exemplary antibodies described herein) or an antigen-binding fragment (e.g., any of the exemplary antigen-binding fragments described herein). In some embodiments, the multi-chain polypeptide is a humanized antibody (e.g., any of the exemplary antibodies described herein) or an antigen-binding fragment (e.g., any of the exemplary antigen-binding fragments described herein). In some embodiments, the multi-chain polypeptide is an IgG. In some embodiments, the multi-chain polypeptide is an antibody where the antibody is IgG1, IgG2, IgG3, or an IgG4 (e.g., human IgG1, human IgG2, human IgG3, or human IgG4). In some embodiments, the multi-chain polypeptide is an antibody where the antibody is IgG2a (e.g., human IgG2a). In some embodiments, the multi-chain polypeptide is an IgM, IgA, or IgE (e.g., a human IgM, human IgGA, or human IgGE). Non-limiting examples of an antigen-binding fragment of an antibody include an Fv fragment, a Fab fragment, a F(ab')2 fragment, and a Fab' fragment. Additional examples of an antigen-binding fragment of an antibody is an antigen-binding fragment of an IgG (e.g., an antigen-binding fragment of IgG1, IgG2, IgG3, or IgG4) (e.g., an antigen-binding fragment of a human or humanized IgG, e.g., human or humanized IgG1, IgG2, IgG3, or IgG4); an antigen-binding fragment of an IgA (e.g., an antigen-binding fragment of IgA1 or IgA2) (e.g., an antigen-binding fragment of a human or humanized IgA, e.g., a human or humanized IgA1 or IgA2); an antigen-binding fragment of an IgD (e.g., an antigen-binding fragment of a human or humanized IgD); an antigen-binding fragment of an IgE (e.g., an antigen-binding fragment of a human or humanized IgE); or an antigen-binding fragment of an IgM (e.g., an antigen-binding fragment of a human or humanized IgM).

A "Fv" fragment includes a non-covalently-linked dimer of one heavy chain variable domain and one light chain variable domain.

A "Fab" fragment includes the constant domain of the light chain and the first constant domain (CH1) of the heavy chain, in addition to the heavy and light chain variable domains of the Fv fragment.

A "F(ab')2" fragment includes two Fab fragments joined, near the hinge region, by disulfide bonds.

A "dual variable domain immunoglobulin" or "DVD-Ig" refers to multivalent and multispecific binding proteins as described, e.g., in DiGiammarino et al., Methods Mol. Biol. 899:145-156, 2012; Jakob et al., MABs 5:358-363, 2013; and U.S. Pat. Nos. 7,612,181; 8,258,268; 8,586,714; 8,716,450; 8,722,855; 8,735,546; and 8,822,645, each of which is incorporated by reference in its entirety.

DARTs are described in, e.g., Garber, Nature Reviews Drug Discovery 13:799-801, 2014.

In some embodiments of any of the multi-chain polypeptides, the multi-chain polypeptides includes an additional light chain variable domain and an additional heavy chain variable domain (e.g., wherein the additional light chain variable domain and the additional heavy chain variable domain form an additional antigen-binding domain that can specifically bind to CD3ε or a different antigen (e.g., a tumor antigen)). In some embodiments where the multi-chain polypeptide includes an additional light chain variable domain, the additional light chain variable domain is identical to the first light chain variable domain. In some embodiments where the multi-chain polypeptide includes an additional heavy chain variable domain, the additional heavy chain variable domain is identical to the first heavy chain variable domain.

In some embodiments where the multi-chain polypeptide includes an additional light chain variable domain and an additional heavy chain variable domain, the additional light chain variable domain and the additional heavy chain variable domain form an additional antigen-binding domain. In some embodiments where the multi-chain polypeptide, the antigen-binding domain and the additional antigen-binding domain can be identical or different from each other (and can specifically bind to the same or different antigens or epitopes).

In some embodiments where the multi-chain polypeptide includes the antigen-binding domain and an additional antigen-binding domain, the antigen-binding domain and the additional antigen-binding domain can both be an Fv fragment, or at least one can be an Fv fragment. In some embodiments where the multi-chain polypeptide includes the antigen-binding domain and an additional antigen-binding domain, the antigen-binding domain and the additional antigen-binding domain can both be a Fab fragment, or at least one can be a Fab fragment. In some embodiments where the multi-chain polypeptide includes the antigen-binding domain and an additional antigen-binding domain, the antigen-binding domain and an additional antigen-binding domain can be a Fab' fragment, or at least one can be a Fab' fragment.

In some embodiments, the multi-chain polypeptide can include two or more polypeptides (e.g., two, three, four, five, six, seven, eight, nine, or ten polypeptides). In some embodiments where the multi-chain polypeptide includes two or more polypeptides, two, three, four, five or six of the polypeptides of the two or more polypeptides can be identical.

Single-Chain Polypeptides

Also provided herein are single-chain polypeptides that include a light chain variable domain and a heavy chain variable domain, where the light chain variable domain and the heavy chain variable domain form an antigen-binding domain that binds specifically to CD3ε.

In some embodiments, a single chain polypeptide includes:

(a) a light chain variable domain including a sequence that is at least 80% identical (e.g., at least 82%, at least 84%, at least 86%, at least 88%, at least 90%, at least 92%, at least 94%, at least 96%, at least 98%, at least 99/a, or 100% identical) to SEQ ID NO: 1, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 3;

(b) a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 8, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 10;

(c) a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 12, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 14:

(d) a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 1, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 5;

(e) a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 1, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 6;

(f) a light chain variable domain including a sequence that is at least 80% identical (e.g., at least 82%, at least 84%, at least 86%, at least 88%, at least 90%, at least 92%, at least 94%, at least 96%, at least 98%, at least 99/a, or 100% identical) to SEQ ID NO: 1, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 7;

(g) a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 16, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 18;

(h) a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 20, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 22:

(i) a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 24, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 22; where the light chain variable domain and the heavy chain variable domain form an antigen-binding domain that binds specifically to CD3ε; or (j) a light chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 26, and a heavy chain variable domain including a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 115; where the light chain variable domain and the heavy chain variable domain form an antigen-binding domain that binds specifically to CD3ε.

In some embodiments, a single chain polypeptide includes:

(a) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 2, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 4;

(b) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 9, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 11;

(c) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 13, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 15:

(d) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 17, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 19;

(e) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 21, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 23; or (f) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 25, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 23; where the light chain variable domain and the heavy chain variable domain form an antigen-binding domain that binds specifically to CD3ε; or (g) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 35, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 116; where the light chain variable domain and the heavy chain variable domain form an antigen-binding domain that binds specifically to CD3ε.

In some embodiments, the single-chain polypeptide includes an antigen-binding domain that is an scFv (e.g., VL-VH or VH-VL). As one skilled in the art will appreciate, an scFv can include a peptide linker (e.g., 1 amino acids to 25 amino acids) between the light chain variable domain (VL) and the heavy chain variable domain (VH).

In some embodiments, the single-chain polypeptide includes an antigen-binding domain selected from the group of: a VH domain, a VHH domain, a VNAR domain, and a scFv. In some embodiments, the single-chain polypeptide can be a BiTE®, a (scFv)2, a nanobody, a nanobody-HSA, a DART, a TandAb, a scDiabody, a scDiabody-CH3, scFv-CH-CL-scFv, a HSAbody, scDiabody-HAS, a tandem-scFv, an Adnectin, a DARPin, a fibronectin, and a DEP conjugate. In some embodiments, wherein the single-chain polypeptide can be a chimeric antigen receptor (CAR), e.g., a CAR that has one anti-CD3ε antigen-binding domain and an additional antigen-binding domain that binds to a different target antigen (e.g., a tumor antigen).

A VHH domain is a single monomeric variable antibody domain that can be found in camelids. A VNAR domain is a single monomeric variable antibody domain that can be found in cartilaginous fish. Non-limiting aspects of VHH domains and VNAR domains are described in, e.g., Cromie et al., Curr. Top. Med. Chem. 15:2543-2557, 2016; De Genst et al., Dev. Comp. Immunol. 30:187-198, 2006; De Meyer et al., Trends Biotechnol. 32:263-270, 2014; Kijanka et al., Nanomedicine 10:161-174, 2015; Kovaleva et al., Expert. Opin. Biol. Ther. 14:1527-1539, 2014; Krah et al., Immunopharmacol. Immunotoxicol. 38:21-28, 2016; Mujic-Delic et al., Trends Pharmacol. Sci. 35:247-255, 2014; Muyldermans, J. Biotechnol. 74:277-302, 2001; Muyldermans et al., Trends Biochem. Sci. 26:230-235, 2001; Muyldermans, Ann. Rev. Biochem. 82:775-797, 2013; Rahbarizadeh et al., Immunol. Invest. 40:299-338, 2011; Van Audenhove et al., EBioMedicine 8:40-48, 2016; Van Bockstaele et al., Curr. Opin. Investig. Drugs 10:1212-1224, 2009; Vincke et al., Methods Mol. Biol. 911:15-26, 2012; and Wesolowski et al., Med. Microbiol. Immunol. 198:157-174, 2009.

In some embodiments, the single-chain polypeptide can include an additional light chain variable domain and an additional heavy chain variable domain (e.g., an additional light chain variable domain and an additional heavy chain variable domain that forms an additional antigen-binding domains that binds to CD3ε or a different antigen (e.g., a tumor antigen)). In some embodiments, where the antigen-binding domain and the additional antigen-binding domain can be identical or different from each other (e.g., specifically bind to the same or different antigens or epitopes).

In some embodiments where the single-chain polypeptide includes the antigen-binding domain and an additional antigen-binding domain, both can be VHH domains, or at least one can be a VHH domain. In some embodiments where the single-chain polypeptide includes the antigen-binding domain or an additional antigen-binding domain, both can be VNAR domains or at least one can be a VNAR domain. In some embodiments where the single-chain polypeptide includes the antigen-binding domain and the additional antigen-binding domain, both can be a scFv or at least one can be a scFv. In some embodiments of any of the single-chain polypeptides described herein, the antigen-binding domain and/or the additional binding domain can be an scFv (e.g., an scFv where the heavy chain variable domain is N-terminally positioned relative to the light chain variable domain, and optionally, there can be a peptide linker (e.g., 1 amino acid to about 25 amino acids, 1 amino acid to about 20 amino acids, 1 amino acid to about 15 amino acids, 1 amino acid to about 10 amino acids, 1 amino acid to about 5 amino acids) disposed between the heavy chain variable domain and the light chain variable domain; or an scFv where the light chain variable domain is N-terminally positioned relative to the heavy chain variable domain, and optionally, there can be a peptide linker disposed between the light chain variable domain and the heavy chain variable domain).

Anti-Idiotypic Antibodies

Also provided herein are anti-idiotypic antibodies and antigen-binding fragments thereof. In some embodiments, an anti-idiotypic antibody is prepared by immunizing an animal of the same species and genetic type as the source of an anti-CD3ε monoclonal antibody (e.g., any of the exemplary anti-CD3ε antibodies described herein) with the monoclonal antibody to which an anti-idiotypic antibody is being prepared. The immunized animal typically can recognize and respond to the idiotypic determinants of the immunizing antibody by producing an antibody to these idiotypic determinants (the anti-idiotypic antibody). An anti-anti-idiotypic antibody may be epitopically identical to the original monoclonal antibody, which induced the anti-idiotypic antibody. Thus, by using antibodies to the idiotypic determinants of a monoclonal antibody, it is possible to identify other clones expressing antibodies of identical specificity. Anti-idiotypic antibodies may be varied (thereby producing anti-idiotypic antibody variants) and/or derivatized by any suitable technique, such as those described elsewhere herein with respect to anti-CD3ε-specific antibodies of the present disclosure.

In some embodiments, an anti-indiotypic antibody can include: (a) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 27, 31, 38, or 42, and (b) a heavy chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 29, 33, 36, 40, 44, 46 or 48.

In some embodiments, an anti-indiotypic antibody can be a polypeptide expressed by nucleic acid sequences: (a) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 28, 32, 39, or 43, and (b) a heavy chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 30, 34, 37, 41, 45, or 47.

In some embodiments, the multi-chain polypeptide includes:
(a) In some embodiments of any of the single-chain or multi-chain polypeptides described herein, the single-chain or multi-chain polypeptide includes a light chain variable domain comprising the three CDRs within a light chain variable domain of SEQ ID NO: 27, and a heavy chain variable domain comprising the three CDRs within a heavy chain variable domain of SEQ ID NO: 29;
(b) In some embodiments of any of the single-chain or multi-chain polypeptides described herein, the single-chain or multi-chain polypeptide includes a light chain variable domain comprising the three CDRs within a light chain variable domain of SEQ ID NO: 31, and a heavy chain variable domain comprising the three CDRs within a heavy chain variable domain of SEQ ID NO: 33;
(c) In some embodiments of any of the single-chain or multi-chain polypeptides described herein, the single-chain or multi-chain polypeptide includes a light chain variable domain comprising the three CDRs within a light chain variable domain of SEQ ID NO: 31, and a heavy chain variable domain comprising the three CDRs within a heavy chain variable domain of SEQ ID NO: 36;
(d) In some embodiments of any of the single-chain or multi-chain polypeptides described herein, the single-chain or multi-chain polypeptide includes a light chain variable domain comprising the three CDRs within a light chain variable domain of SEQ ID NO: 38, and a heavy chain variable domain comprising the three CDRs within a heavy chain variable domain of SEQ ID NO: 40;
(e) In some embodiments of any of the single-chain or multi-chain polypeptides described herein, the single-chain or multi-chain polypeptide includes a light chain variable domain comprising the three CDRs within a light chain variable domain of SEQ ID NO: 42, and a heavy chain variable domain comprising the three CDRs within a heavy chain variable domain of SEQ ID NO: 44;
(f) In some embodiments of any of the single-chain or multi-chain polypeptides described herein, the single-chain or multi-chain polypeptide includes a light chain variable domain comprising the three CDRs within a light chain variable domain of SEQ ID NO: 42, and a heavy chain variable domain comprising the three CDRs within a heavy chain variable domain of SEQ ID NO: 46;
(g) In some embodiments of any of the single-chain or multi-chain polypeptides described herein, the single-chain or multi-chain polypeptide includes a light chain variable domain comprising the three CDRs within a light chain variable domain of SEQ ID NO: 42, and a heavy chain variable domain comprising the three CDRs within a heavy chain variable domain of SEQ ID NO: 48.

In some embodiments, an anti-idiotypic antibody can include:
(a) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 27, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 29;
(b) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 38, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 40;
(c) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 31, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 33;
(d) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 42, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 44;
(e) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 42, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 48;
(f) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 31, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 36; or
(g) a light chain variable domain comprising a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 42, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 46.

In some embodiments, an anti-indiotypic antibody can include:
(a) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 28, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 30;
(b) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 39, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 41:
(c) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 32, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 34;
(d) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 43, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 45;
(e) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 43, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 49:
(f) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 32, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 37; or
(g) a light chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 43, and a heavy chain variable domain encoded by a sequence that is at least 80% identical (e.g., at least 82%, at least 84%, at least 86%, at least 88%, at least 90%, at least 92%, at least 94%, at least 96%, at least 98%, at least 99%, or 100% identical) to SEQ ID NO: 47.

Conjugation to Agents

This disclosure also provides methods and materials for including additional elements in any of the single-chain polypeptides or multi-chain polypeptides described herein including, for example, a targeting moiety to facilitate delivery to a cell or tissue of interest, an agent (e.g., a therapeutic agent, an antineoplastic agent, a drug, or a small molecule), a toxin, or a fragment thereof.

In some embodiments of any of the single-chain polypeptides or multi-chain polypeptides described herein (e.g., any of the exemplary the single-chain polypeptide or multi-chain polypeptides that include at least an antigen-binding domain that specifically binds to CD3ε), the single-chain polypeptide or multi-chain polypeptide can be conjugated to a cytotoxic agent, including, without limitation, a toxin (e.g., an enzymatically active toxin of bacterial, fungal, plant, or animal origin, or fragments thereof) or a radioactive isotope. In some embodiments of any of the single-chain polypeptides or multi-chain polypeptides described herein, the single-chain polypeptide or multi-chain polypeptide can be conjugated to a cytotoxic agent including, without limitation, a toxin (e.g., an enzymatically active toxin of bacterial, fungal, plant, or animal origin, or fragments thereof), or a radioactive isotope.

Non-limiting exemplary cytotoxic agents that can be conjugated to any of the single-chain polypeptides or multi-chain polypeptides described herein include: dolastatins and derivatives thereof (e.g., auristatin E, AFP, monomethyl auristatin D (MMAD), monomethyl auristatin F (MMAF), monomethyl auristatin E (MMAE), desmethyl auristatin E (DMAE), auristatin F, desmethyl auristatin F (DMAF), dolastatin 16 (DmJ), dolastatin 16 (Dpv), auristatin derivatives (e.g., auristatin tyramine, auristatin quinolone), maytansinoid derivatives, duocarmycin, alpha-amanitin, turbostatin, phenstatin, hydroxyphenstatin, spongistatin 5, spongistatin 7, halistatin 1, halistatin 2, halistatin 3, halocomstatin, pyrrolobenzimidazoles (PBI), cibrostatm6, doxaliform, cemadotin analogue (CemCH2-SH), *Pseudomonas* toxin A (PES8) variant, Pseudomonase toxin A (ZZ-PE38) variant, ZJ-101, anthracycline, doxorubicin, daunorubicin, bryostatin, camptothecin, combretastatins, debromoaplysiatoxin, KahaMide-F, discodermolide, and ecteinascidins.

Non-limiting exemplary enzymatically active toxins that can be conjugated to any of the single-chain polypeptides or multi-chain polypeptides described herein include: diphtheria toxin, exotoxin A chain from *Pseudomonas aeruginosa*, ricin A chain, abrin A chain, modeccin A chain, alpha-sarcin, *Aleuriies fordii* proteins, dianfhin proteins, Phytoiaca Americana proteins (e.g., PAPI, PAPII, and PAP-8), *Momordica charantia* inhibitor, curcin, crotirs, *Sapaonaria officinalis* inhibitor, geionin, mitogeliin, restrictocin, phenomycin, neomycin, and tricothecenes.

Non-limiting exemplary anti-neoplastics that can be conjugated to any of the single-chain polypeptides or multi-chain polypeptides described herein include: adriamycin, cerubidine, bleomycin, alkeran, velban, oncovin, fluorouracil, methotrexate, thiotepa, bisantrene, novantrone, thioguanine, procarabizine, and cytarabine.

Non-limiting exemplary antivirals that can be conjugated to any of the single-chain polypeptides or multi-chain polypeptides described herein include: acyclovir, vira A, and symmetrel.

Non-limiting exemplary antibacterial that can be conjugated to any of the single-chain polypeptides or multi-chain polypeptides described herein include: aminoglycosides, streptomycin, neomycin, kanamycin, amikacin, gentamicin, and tobramycin.

Non-limiting exemplary 3beta,16beta,17alpha-trihydroxycholest-5-en-22-one 16-O-(2-O-4-methoxybenzoyl-beta-D-xylopyranosyl)-(1->3)-(2-O-acetyl-alpha-L-arabinopyranoside) (OSW-1) that can be conjugated to any of the single-chain polypeptides or multi-chain polypeptides described herein include: s-nitrobenzyloxycarbonyl derivatives of 06-benzylguanine, topoisomerase inhibitors, hemiasterlin, cephalotaxine, homoharringtonine, pyrrol obenzodiazepine dimers (PBDs), functionalized pyrrolobenzodiazepenes, calicheamicins, podophylltoxins, taxanes, and vinca alkaloids.

Non-limiting exemplary radiopharmaceuticals that can be conjugated to any of the single-chain polypeptides or multi-chain polypeptides described herein include: 123I, 89Zr, 123I, 131I, 99mTc, 201Tl, 62Cu, 18F, 68Ga, 13N, 15O, 38K, 82Rb, and 99mTc.

Non-limiting exemplary heavy metals that can be conjugated to any of the single-chain polypeptides or multi-chain polypeptides described herein include: barium, gold, and platinum.

Non-limiting exemplary anti-mycoplasmals that can be conjugated to any of the single-chain polypeptides or multi-chain polypeptides described herein include: tylosine, spectinomycin, streptomycin B, ampicillin, sulfanilamide, polymyxin, and chloramphenicol.

Those of ordinary skill in the art will recognize that a large variety of possible moieties can be conjugated to any of the single-chain polypeptides or multi-chain polypeptides described herein (e.g., any of the exemplary single-chain polypeptides or multi-chain polypeptides that include at least an antigen-binding domain that specifically binds to CD3ε). Conjugation can include any chemical reaction that will bind the two molecules so long as the single-chain polypeptide or multi-chain polypeptide and the other moiety retain their respective activities. Conjugation can include many chemical mechanisms, e.g., covalent binding, affinity binding, intercalation, coordinate binding, and complexation. In some embodiments, the preferred binding is covalent binding. Covalent binding can be achieved either by direct condensation of existing side chains or by the incorporation of external bridging molecules. Many bivalent or polyvalent linking agents are useful in conjugating any of the single-chain polypeptides or multi-chain polypeptides described herein. For example, conjugation can include organic compounds, such as thioesters, carbodiimides, succinimide esters, glutaraldehyde, diazobenzenes, and hexamethylene diamines. In some embodiments, the single-chain polypeptide or multi-chain polypeptide can include, or otherwise introduce, one or more non-natural amino acid residues to provide suitable sites for conjugation.

In some embodiments of any of the single-chain polypeptides or multi-chain polypeptides described herein (e.g., any of the exemplary single-chain polypeptides or multi-chain polypeptides that include at least an antigen-binding domain that specifically binds to CD3ε), an agent and/or conjugate is attached by disulfide bonds (e.g., disulfide bonds on a cysteine molecule) to the antigen-binding domain. Since many cancers naturally release high levels of glutathione, a reducing agent, glutathione present in the cancerous tissue microenvironment can reduce the disulfide bonds, and subsequently release the agent and/or the conjugate at the site of delivery.

In some embodiments of any of the single-chain polypeptides or multi-chain polypeptides described herein, when the conjugate binds to its target in the presence of complement within the target site (e.g., diseased tissue (e.g., cancerous tissue)), the amide or ester bond attaching the conjugate and/or agent to the linker is cleaved, resulting in the release of the conjugate and/or agent in its active form. These conjugates and/or agents when administered to a subject, will accomplish delivery and release of the conjugate and/or the agent at the target site (e.g., diseased tissue (e.g., cancerous tissue)). These conjugates and/or agents are particularly effective for the in vivo delivery of any of the conjugates and/or agents described herein.

In some embodiments, the linker is not cleavable by enzymes of the complement system. For example, the conjugate and/or agent is released without complement activation since complement activation ultimately lyses the target cell. In such embodiments, the conjugate and/or agent is to be delivered to the target cell (e.g., hormones, enzymes, corticosteroids, neurotransmitters, or genes). Furthermore, the linker is mildly susceptible to cleavage by serum proteases, and the conjugate and/or agent is released slowly at the target site.

In some embodiments of any of the single-chain polypeptides or multi-chain polypeptides described herein, the conjugate and/or agent is designed such that the conjugate and/or agent is delivered to the target site (e.g., disease tissue (e.g., cancerous tissue)) but the conjugate and/or agent is not released.

In some embodiments of any of the single-chain polypeptides or multi-chain polypeptides described herein, the conjugate and/or agent is attached to an antigen-binding domain either directly or via a non-cleavable linker. Exemplary non-cleavable linkers include amino acids (e.g., D-amino acids), peptides, or other organic compounds that may be modified to include functional groups that can subsequently be utilized in attachment to antigen-binding domains by methods described herein.

In some embodiments of any of the single-chain polypeptides or multi-chain polypeptides described herein, a single-chain polypeptide or multi-chain polypeptide includes at least one point of conjugation for an agent. In some embodiments, all possible points of conjugation are available for conjugation to an agent. In some embodiments, the one or more points of conjugation include, without limitation, sulfur atoms involved in disulfide bonds, sulfur atoms involved in interchain disulfide bonds, sulfur atoms involved in interchain sulfide bonds but not sulfur atoms involved in intrachain disulfide bonds, and/or sulfur atoms of cysteine or other amino acid residues containing a sulfur atom. In such cases, residues may occur naturally in the single-chain or multi-chain polypeptide or may be incorporated into the single- or multi-chain polypeptide using methods including, without limitation, site-directed mutagenesis, chemical conversion, or mis-incorporation of non-natural amino acids.

This disclosure also provides methods and materials for preparing a single-chain polypeptide or a multi-chain polypeptide for conjugation. In some embodiments of any of the single-chain polypeptides or multi-chain polypeptides described herein, a single-chain polypeptide or multi-chain polypeptide is modified to include one or more interchain disulfide bonds in the antigen-binding domain. For example, disulfide bonds in the single-chain polypeptide or multi-chain polypeptide can undergo reduction following exposure to a reducing agent such as, without limitation, TCEP, DTT, or β-mercaptoethanol. In some cases, the reduction of the disulfide bonds is only partial. As used herein, the term partial reduction refers to situations where a single-chain polypeptide or multi-chain polypeptide is contacted with a reducing agent and a fraction of all possible sites of conjugation undergo reduction (e.g., not all disulfide bonds are reduced). In some embodiments, a single-chain polypeptide or multi-chain polypeptide is partially reduced following contact with a reducing agent if less than 99%, (e.g., less than 98%, 97%, 96%, 95%, 90%, 85%, 80%, 75%, 70%, 65%, 60%, 55%, 50%, 45%, 40%, 35%, 30%, 25%, 20%, 15%, 10% or less than 5%) of all possible sites of conjugation are reduced. In some embodiments, the single-chain polypeptides or multi-chain polypeptides having a reduction in one or more interchain disulfide bonds in the antigen-binding domain and/or having a reduction in one or more intrachain disulfide bonds in the MM is conjugated to a drug reactive with free thiols.

This disclosure also provides methods and materials for conjugating a therapeutic agent to a particular location on a single-chain polypeptide or multi-chain polypeptide. In some embodiments of any of the single-chain polypeptides or multi-chain polypeptides described herein, a single-chain polypeptide or multi-chain polypeptide is modified so that the therapeutic agents can be conjugated to the single-chain or multi-chain polypeptide at particular locations. For example, a single-chain polypeptide or multi-chain polypeptide can be partially reduced in a manner that facilitates conjugation to the antigen-binding domain portion of the single-chain polypeptide or multi-chain polypeptide. In some embodiments, the conjugation site(s) on the single-chain polypeptides or multi-chain polypeptides are selected to facilitate conjugation of an agent at a particular location. Various factors can influence the "level of reduction" of the single-chain polypeptide or multi-chain polypeptide upon treatment with a reducing agent. For example, without limitation, the ratio of reducing agent to the single-chain polypeptides or multi-chain polypeptides, length of incubation, incubation temperature, and/or pH of the reducing reaction solution can require optimization in order to achieve partial reduction consistent with the methods and materials described herein. Any appropriate combination of factors (e.g., ratio of reducing agent to single-chain polypeptide or multi-chain polypeptide, the length and temperature of incubation with reducing agent, and/or pH of reducing agent) can be used to achieve partial reduction of the single-chain polypeptides or multi-chain polypeptides (e.g., general reduction of possible conjugation sites or reduction at specific conjugation sites). For example, when a single-chain polypeptide or multi-chain polypeptide is contacted with a reducing agent (e.g., TCEP), a set of factors (e.g., ratio of reducing agent to single-chain polypeptide or multi-chain polypeptide, the length and temperature of incubation with reducing agent, and/or pH of reducing agent) facilitate conjugation at the antigen-binding domain (e.g., limited or no conjugation at non-antigen-binding domains of the single-chain polypeptides or multi-chain polypeptides).

An effective ratio of reducing agent to single-chain polypeptide or multi-chain polypeptide (e.g., any of the exemplary single-chain polypeptides or multi-chain polypeptides that include at least an antigen-binding domain that specifically binds to CD3ε) can be any ratio that at least partially reduces the single-chain polypeptide or multi-chain polypeptide in a manner that allows conjugation to an agent (e.g., general reduction of possible conjugation sites or reduction at specific conjugation sites). In some embodiments, the ratio of reducing agent to single-chain polypeptide or multi-chain polypeptide will be in a range from about 20:1 to 1:1, from about 10:1 to 1:1, from about 9:1 to 1:1, from about 8:1 to 1:1, from about 7:1 to 1:1, from about 6:1 to 1:1, from about 5:1 to 1:1, from about 4:1 to 1:1, from about 3:1 to 1:1, from about 2:1 to 1:1, from about 20:1 to 1:1.5, from about 10:1 to 1:1.5, from about 9:1 to 1:1.5, from about 8:1 to 1:1.5, from about 7:1 to 1:1.5, from about 6:1 to 1:1.5, from about 5:1 to 1:1.5, from about 4:1 to 1:1.5, from about 3:1 to 1:1.5, from about 2:1 to 1:1.5, from about 1.5:1 to 1:1.5, or from about 1:1 to 1:1.5. In some embodiments, the ratio is in a range of from about 5:1 to 1:1. In some embodiments, the ratio is in a range of from about 5:1 to 1.5:1. In some embodiments, the ratio is in a range of from about 4:1 to 1:1. In some embodiments, the ratio is in a range from about 4:1 to 1.5:1. In some embodiments, the ratio is in a range from about 8:1 to about 1:1. In some embodiments, the ratio is in a range of from about 2.5:1 to 1:1.

An effective incubation time and temperature for treating a single-chain polypeptide or multi-chain polypeptide (e.g., any of the exemplary single-chain polypeptides or multi-chain polypeptides that include at least an antigen-binding domain that specifically binds to CD3ε) with a reducing agent can be any time and temperature that at least partially reduces the single-chain polypeptides or multi-chain polypeptides in a manner that allows conjugation of an agent to a single-chain polypeptide or multi-chain polypeptide (e.g., general reduction of possible conjugation sites or reduction at specific conjugation sites). In some embodiments, the incubation time and temperature for treating a single-chain polypeptide or multi-chain polypeptide will be in a range from about 1 hour at 37° C. to about 12 hours at 37° C. (or any subranges therein).

An effective pH for a reduction reaction for treating a single-chain polypeptide or multi-chain polypeptide with a reducing agent can be any pH that at least partially reduces the single-chain polypeptide or multi-chain polypeptide in a manner that allows conjugation of the single-chain polypeptide or multi-chain polypeptide to an agent (e.g., general reduction of possible conjugation sites or reduction at specific conjugation sites).

In some embodiments of any of the multi-chain polypeptides, the multi-chain polypeptide is modified so that at least two interchain disulfide bonds located in an antigen-binding domain are reduced thereby facilitating conjugation of an agent to the antigen-binding domain of the multi-chain polypeptide. A multi-chain polypeptide can be contacted with a reducing agent in a manner that reduces interchain disulfide bonds to interchain thiols located in the antigen-binding domain. In some cases, conjugation of the agent to the antigen-binding domain is facilitated by partially reducing the antigen-binding domain with a reducing agent to form at least two interchain thiols without forming all possible interchain thiols in the single-chain polypeptide or multi-chain polypeptide. When the multi-chain polypeptide is contacted with an agent containing thiols, the agent can conjugate to the interchain thiols in the antigen-binding domain. An agent can be modified in a manner to include thiols using a thiol-containing reagent (e.g., cysteine or N-acetyl cysteine). For example, the antigen-binding domain of the multi-chain polypeptide can be partially reduced following incubation with reducing agent (e.g., TEPC) for about 1 hour at about 37° C. at a desired ratio of reducing agent to multi-chain polypeptide. An effective ratio of reducing agent to multi-chain polypeptide can be any ratio that partially reduces at least two interchain disulfide bonds located in the antigen-binding domain in a manner that allows conjugation of a thiol-containing agent to the free thiol-containing antigen-binding domain (e.g., general reduction of possible conjugation sites or reduction at specific conjugation sites).

In some embodiments of any of the single-chain polypeptides or multi-chain polypeptides described herein, a single-chain polypeptide or multi-chain polypeptide is reduced by a reducing agent in a manner that avoids reducing any intrachain disulfide bonds. In another example, a single-chain polypeptide or a multi-chain polypeptide can be contacted with a reducing agent in a manner that avoids reduction of one or more intrachain disulfide bonds of the antigen-binding domain. In some embodiments of any of the multi-chain polypeptides described herein, a single-chain polypeptide or a multi-chain polypeptide is reduced by a reducing agent in a manner that avoids reducing any intra-chain disulfide bonds and reduces at least one interchain disulfide bond.

In Some Embodiments, the Conjugated Agent is a Therapeutic Agent

In some embodiments, the conjugated agent (e.g., agent conjugated to a single-chain polypeptide or multi-chain polypeptide) is a detectable moiety such as, for example, a linker. In some embodiments, the agent (e.g., cytotoxic agent conjugated to a single-chain polypeptide or multi-chain polypeptide) is conjugated to another residue of the antigen-binding domain via a linker, such as those residues disclosed herein. In some embodiments, the linker is a thiol-containing linker. In some embodiments, the linker is a cleavable linker. In some embodiments, the linker is a non-cleavable linker. In some embodiments, the linker is selected from the group consisting of the linkers shown in Table 1.

TABLE 1

| Types of Cleavable Sequences | Amino Acid Sequence |
|---|---|
| Plasmin cleavable sequences | |
| Pro-urokinase | PRFKIIGG (SEQ ID NO: 57) |
| | PRFRIIGG (SEQ ID NO: 58) |
| TGFβ | SSRHRRALD (SEQ ID NO: 59) |
| Plasminogen | RKSSIIIRMRDVVL (SEQ ID NO: 60) |
| Staphylokinase | SSSFDKGKYKKGDDA (SEQ ID NO: 61) |
| | SSSFDKGKYKRGDDA (SEQ ID NO: 62) |
| Factor Xa cleavable sequences | IEGR (SEQ ID NO: 63) |
| | IDGR (SEQ ID NO: 64) |
| | GGSIDGR (SEQ ID NO: 65) |
| MMP cleavable sequences | |
| Gelatinase A | PLGLWA (SEQ ID NO: 66) |
| Collagenase cleavable sequences | |
| Calf skin collagen (α1(I) chain) | GPQGIAGQ (SEQ ID NO: 67) |
| Calf skin collagen (α2(I) chain) | GPQGLLGA (SEQ ID NO: 68) |
| Bovine cartilage collagen (α1(II) chain) | GIAGQ (SEQ ID NO: 69) |
| Human liver collagen (α1(III) chain) | GPLGIAGI (SEQ ID NO: 70) |
| Human α2M | GPEGLRVG (SEQ ID NO: 71) |
| Human PZP | YGAGLGVV (SEQ ID NO: 72) |
| | AGLGVVER (SEQ ID NO: 73) |
| | AGLGISST (SEQ ID NO: 74) |
| Rat αIM | EPQALAMS (SEQ ID NO: 75) |
| | QALAMSAI (SEQ ID NO: 76) |
| Rat α2M | AAYHLVSQ (SEQ ID NO: 77) |
| | MDAFLESS (SEQ ID NO: 78) |
| Rat α1I3(2J) | ESLPVVAV (SEQ ID NO: 79) |
| Rat α1I3(27J) | SAPAVESE (SEQ ID NO: 80) |
| Human fibroblast collagenase | DVAQFVLT (SEQ ID NO: 81) |
| (autolytic cleavages) | VAQFVLT (SEQ ID NO: 82) |
| | VAQFVLTE (SEQ ID NO 83) |
| | AQFVLTEG (SEQ ID NO: 84) |
| | PVQPIGPQ (SEQ ID NO: 85) | label or other marker. For example, the agent is or includes a radiolabeled amino acid, one or more biotinyl moieties that can be detected by marked avidin (e.g., streptavidin containing a fluorescent marker or enzymatic activity that can be detected by optical or calorimetric methods), one or more radioisotopes or radionuclides, one or more fluorescent labels, one or more enzymatic labels, and/or one or more chemiluminescent agents. In some embodiments, detectable moieties are attached by spacer molecules.

In some embodiments, the conjugated agent (e.g., cytotoxic agent conjugated to a single-chain polypeptide or multi-chain polypeptide) is linked to the antigen-binding domain using a carbohydrate moiety, sulfhydryl group, amino group, or carboxylate group.

In some embodiments of any of the single-chain polypeptides or multi-chain polypeptides described herein conjugated to an agent, the agent (e.g., cytotoxic agent) is conjugated to the antigen-binding domain of a single- or multi-chain polypeptide via a linker. In some embodiments, the agent (e.g., cytotoxic agent conjugated to a single-chain polypeptide or multi-chain polypeptide) is conjugated to a cysteine or a lysine in the antigen-binding domain via a linker.

In some embodiments of any of the single-chain polypeptides or multi-chain polypeptides conjugated to an agent, a variety of bifunctional protein-coupling agents can be used to conjugate the agent to the single-chain polypeptides or multi-chain polypeptides including, without limitation, N-succinimidyl-3-(2-pyridyldithiol) propionate (SPDP), iminothiolane (IT), bifunctional derivatives of imidoesters (e.g., dimethyl adipimidate HCL), active esters (e.g., disuccinimidyl suberate), aldehydes (e.g., glutaraldehyde), bis-azido compounds (e.g., bis (p-azidobenzoyl) hexanediamine), bis-diazonium derivatives (e.g., bis-(p-diazoniumbenzoyl)-ethylenediamine), diisocyanates (e.g., toluene 2,6-diisocyanate), and bis-active fluorine compounds (e.g., 1,5-difluoro-2,4-dinitrobenzene). For example, a ricin immunotoxin can be prepared as described in Vitetta et al., Science 238: 1098 (1987). In some embodiments, a carbon-14-labeled 1-isothiocyanatobenzyl-3-methyldiethylene triaminepentaacetic acid (MX-DTPA) chelating agent can be used to conjugate a radionucleotide to the single-chain polypeptide or multi-chain polypeptide. (See, e.g., WO94/11026).

Non-limiting examples of pharmaceutical agents that may be conjugated to any of the single-chain polypeptides or multi-chain polypeptides described herein include, without limitation, the list of agents in Table 2.

TABLE 2

Exemplary Pharmaceutical Agents for Conjugation

CYTOTOXIC AGENTS

Auristatins
Auristatin E
Monomethyl auristatin D (MMAD)
Monomethyl auristatin E (MMAE)
Desmethyl auristatin E (DMAE)
Auristatin F
Monomethyl auristatin F (MMAF)
Desmethyl auristatin F (DMAF)
Auristatin derivatives, e.g., amides thereof
Auristatin tyramine
Auristatin quinoline
Dolastatins
Dolastatin derivatives
Dolastatin 16 DmJ
Dolastatin 16 Dpv
Maytansinoids, e.g. DM-1; DM-4
Maytansinoid derivatives
Duocarmycin
Duocarmycin derivatives
Alpha-amanitin
Anthracyclines
Doxorubicin
Daunorubicin
Bryostatins
Camptothecin
Camptothecin derivatives
7-substituted Camptothecin
10,11-Difluoromethylenedioxycamptothecin
Combretastatins
Debromoaplysiatoxin
Kahalalide-F
Discodermolide
Ecteinascidins

ANTIVIRALS

Acyclovir
Vira A
Symmetrel

ANTIFUNGALS

Nystatin

ADDITIONAL ANTI-NEOPLASTICS

Adriamycin
Cerubidine
Bleomycin
Alkeran
Velban
Oncovin
Fluorouracil
Methotrexate
Thiotepa
Bisantrene
Novantrone
Thioguanine
Procarabizine
Cytarabine

ANTI-BACTERIALS

Aminoglycosides
Streptomycin
Neomycin
Kanamycin
Amikacin
Gentamicin
Tobramycin
Streptomycin B
Spectinomycin
Ampicillin
Sulfanilamide
Polymyxin TABLE 2-continued Exemplary Pharmaceutical Agents for Conjugation Chloramphenicol
Turbostatin
Phenstatins
Hydroxyphenstatin
Spongistatin 5
Spongistatin 7
Halistatin 1
Halistatin 2
Halistatin 3
Modified Bryostatins
Halocomstatins
Pyrrolobenzimidazoles (PBI)
Cibrostatin6
Doxaliform
Anthracyclins analogues
Cemadotin analogue (CemCH2-SH)
Pseudomonas toxin A (PE38) variant
Pseudomonas toxin A (ZZ-PE38) variant
ZJ-101
OSW-1
4-Nitrobenzyloxycarbonyl Derivatives of
O6-Benzylguanine
Topoisomerase inhibitors
Hemiasterlin
Cephalotaxine
Homoharringtonine
Pyrrolobenzodiazepine dimers (PBDs)
Pyrrolobenzodiazepenes
Functionalized pyrrolobenzodiazepenes
Functionalized pyrrolobenzodiazepene dimers
Calicheamicins
Podophyllotoxins
Taxanes
Vinca alkaloids

CONJUGATABLE DETECTION REAGENTS

Fluorescein and derivatives thereof
Fluorescein isothiocyanate (FITC)

RADIOPHARMACEUTICALS 125I
131I
89Zr
111In
123I
131I
99mTc
201Tl
133Xe
11C
62Cu
18F
68Ga
13N
15O
38K
82Rb
99mTc (Technetium)

HEAVY METALS

Barium
Gold
Platinum

ANTI-MYCOPLASMALS

Tylosine
Spectinomycin

Those of ordinary skill in the art will recognize that a large variety of possible moieties can be coupled to the resultant single-chain polypeptides or multi-chain polypeptides of the disclosure. (See, for example, "Conjugate Vaccines", Contributions to Microbiology and Immunology, J. M. Cruse and R. E. Lewis, Jr (eds), Carger Press, New York, (1989), the entire contents of which are incorporated herein by reference).

An effective conjugation of an agent (e.g., cytotoxic agent) to a single-chain polypeptide or a multi-chain polypeptide can be accomplished by any chemical reaction that will bind the agent to the single-chain polypeptide or multi-chain polypeptide while also allowing the agent and the single-chain polypeptide or multi-chain polypeptide to retain functionality (e.g., a cytotoxic agent remains cytotoxic and the single-chain polypeptide or multi-chain polypeptide remains capable of binding to CD3ε).

In some embodiments of any of the single-chain polypeptides or multi-chain polypeptides, an agent can be conjugated to the single-chain polypeptide or multi-chain polypeptide using a modified amino acid sequence included in the amino acid sequence of the single-chain polypeptide or multi-chain polypeptide. Modification of a specific amino acid sequence that enables conjugation of the single-chain polypeptide or multi-chain polypeptide to an agent facilitates site-specific conjugation in the single-chain polypeptide or multi-chain polypeptide. By inserting conjugation-enabled amino acids at specific locations within the amino acid sequence of the single-chain polypeptide or multi-chain polypeptide, the single- or multi-chain polypeptide can be designed for controlled placement and/or dosage of the conjugated agent (e.g., cytotoxic agent). For example, the single-chain polypeptide or multi-chain polypeptide can be modified to include a cysteine amino acid residue at positions on the first polypeptide, second polypeptide, and/or any additional polypeptide that provide reactive thiol groups and does not negatively impact protein folding and/or assembly and does not alter antigen-binding properties. In some embodiments, the single-chain polypeptide or multi-chain polypeptide can be modified to include one or more non-natural amino acid residues within the amino acid sequence of the single-chain polypeptide or multi-chain polypeptide to provide suitable sites for conjugation. In some embodiments, the single-chain polypeptide or multi-chain polypeptide can be modified to include enzymatically activatable peptide sequences within the amino acid sequence of the single-chain polypeptide or multi-chain polypeptide.

Suitable linkers are described in the literature. (See, for example, Ramakrishnan, S. et al., Cancer Res. 44:201-208 (1984) describing use of MBS (M-maleimidobenzoyl-N-hydroxysuccinimide ester). See also, U.S. Pat. No. 5,030,719, describing use of halogenated acetyl hydrazide derivative coupled to a polypeptide by way of an oligopeptide linker. In some embodiments, suitable linkers include: (i) EDC (1-ethyl-3-(3-dimethylamino-propyl) carbodiimide hydrochloride; (ii) SMPT (4-succinimidyloxycarbonyl-alpha-methyl-alpha-(2-pridyl-dithio)-toluene (Pierce Chem. Co., Cat. (21558G); (iii) SPDP (succinimidyl-6 [3-(2-pyridyldithio) propionamido]hexanoate (Pierce Chem. Co., Cat #21651G); (iv) Sulfo-LC-SPDP (sulfosuccinimidyl 6 [3-(2-pyridyldithio)-propianamide]hexanoate (Pierce Chem. Co. Cat. #2165-G); and (v) sulfo-NHS (N-hydroxysulfo-succinimide: Pierce Chem. Co., Cat. #24510) conjugated to EDC. Additional linkers include, but are not limited to, SMCC, sulfo-SMCC, SPDB, or sulfo-SPDB.

The linkers described above contain components that have different attributes, thus leading to conjugates with differing physio-chemical properties. For example, sulfo-NHS esters of alkyl carboxylates are more stable than sulfo-NHS esters of aromatic carboxylates. NHS-ester containing linkers are less soluble than sulfo-NHS esters. Further, the linker SMPT contains a sterically-hindered disulfide bond, and can form conjugates with increased stability. Disulfide linkages, are in general, less stable than other linkages because the disulfide linkage is cleaved in vitro, resulting in less conjugate available. Sulfo-NHS, in particular, can enhance the stability of carbodimide couplings. Carbodimide couplings (such as EDC) when used in conjunction with sulfo-NHS, forms esters that are more resistant to hydrolysis than the carbodimide coupling reaction alone.

Nucleic Acids

Provided herein are nucleic acids that include a sequence that encodes any of the polypeptides described herein. Also provided herein are nucleic acids including a sequence that encodes a single-chain polypeptide (e.g., any of the single-chain polypeptides described herein). Also provided herein are nucleic acids including sequences that together encode the polypeptides that make up a multi-chain polypeptide (e.g., any of the multi-chain polypeptides described herein). Also provided herein is a set of nucleic acids that together encode the polypeptides that make up the multi-chain polypeptide (e.g., any of the multi-chain polypeptides described herein).

Vectors

Provided herein are vectors and sets of vectors including any of the nucleic acids described herein. One skilled in the art will be capable of selecting suitable vectors or sets of vectors (e.g., expression vectors) for making any of the single-chain polypeptides or multi-chain polypeptides described herein, and using the vectors or sets of vectors to express any of the single-chain polypeptides or multi-chain polypeptides described herein. For example, in selecting a vector or a set of vectors, the cell must be considered because the vector(s) may need to be able to integrate into a chromosome of the cell and/or replicate in it. Exemplary vectors that can be used to produce a single-chain polypeptide or a multi-chain polypeptide are also described below.

Also provided herein are cells (e.g., mammalian cells) that include any of the nucleic acids, sets of nucleic acid, expression vectors, or sets of expression vectors described herein.

Expression of a Multi-Chain Polypeptide or Single-Chain Polypeptide in a Cell

Also provided herein are methods of generating a recombinant cell that expresses any of the polypeptides described herein that include: introducing into a cell a nucleic acid encoding the polypeptide to produce a recombinant cell, and culturing the recombinant cell under conditions sufficient for the expression of the polypeptide.

Also provided herein are methods of generating a recombinant cell that expresses a multi-chain polypeptide (e.g., any of the exemplary multi-chain polypeptides described herein) that include: introducing into a cell nucleic acid encoding the polypeptides that make up the multi-chain polypeptide to produce a recombinant cell; and culturing the recombinant cell under conditions sufficient for the expression of the multi-chain polypeptide. In some embodiments, the introducing step includes introducing into a cell an expression vector or a set of expression vectors that include nucleic acid encoding the polypeptides that make up the multi-chain chimeric polypeptide to produce the recombinant cell.

Also provided herein are methods of generating a recombinant cell that expresses a single-chain polypeptide (e.g., any of the exemplary single-chain polypeptides described herein) that include: introducing into a cell a nucleic acid encoding the single-chain polypeptide to produce a recombinant cell; and culturing the recombinant cell under conditions sufficient for the expression of the single-chain polypeptide. In some embodiments, the introducing step includes introducing into a cell an expression vector including a nucleic acid encoding the single-chain chimeric polypeptide to produce a recombinant cell.

Any of the polypeptides, single-chain polypeptides, or multi-chain polypeptides described herein can be produced by any cell, e.g., a eukaryotic cell or a prokaryotic cell. As used herein, the term "eukaryotic cell" refers to a cell having a distinct, membrane-bound nucleus. Such cells may include, for example, mammalian (e.g., rodent, non-human primate, or human), insect, fungal, or plant cells. In some embodiments, the eukaryotic cell is a yeast cell, such as *Saccharomyces cerevisiae*. In some embodiments, the eukaryotic cell is a higher eukaryote, such as mammalian, avian, plant, or insect cells. As used herein, the term "prokaryotic cell" refers to a cell that does not have a distinct, membrane-bound nucleus. In some embodiments, the prokaryotic cell is a bacterial cell.

Methods of culturing cells are well known in the art. Cells can be maintained in vitro under conditions that favor proliferation, differentiation, and growth. Briefly, cells can be cultured by contacting a cell (e.g., any cell) with a cell culture medium that includes the necessary growth factors and supplements to support cell viability and growth.

Methods of introducing nucleic acids and expression vectors into a cell (e.g., a eukaryotic cell) are known in the art. Non-limiting examples of methods that can be used to introduce a nucleic acid into a cell include lipofection, transfection, electroporation, microinjection, calcium phosphate transfection, dendrimer-based transfection, cationic polymer transfection, cell squeezing, sonoporation, optical transfection, impalection, hydrodynamic delivery, magnetofection, viral transduction (e.g., adenoviral and lentiviral transduction), and nanoparticle transfection.

Provided herein are methods that further include isolation of the polypeptides, the single-chain polypeptides, and multi-chain polypeptides from a cell (e.g., a eukaryotic cell) using techniques well-known in the art (e.g., ammonium sulfate precipitation, polyethylene glycol precipitation, ion-exchange chromatography (anion or cation), chromatography based on hydrophobic interaction, metal-affinity chromatography, ligand-affinity chromatography, and size exclusion chromatography).

In some embodiments of any of the methods described herein, the method further includes formulating the isolated polypeptide, single-chain polypeptide, or multi-chain polypeptide into a pharmaceutical composition. Various formulations are known in the art and are described herein. Any of the isolated polypeptides, single-chain polypeptides, or multi-chain polypeptides described herein can be formulated for any route of administration (e.g., intravenous, intratumoral, subcutaneous, intradermal, oral (e.g., inhalation), transdermal (e.g., topical), transmucosal, or intramuscular).

Methods of Treatment

Provided herein are methods of treating a subject in need thereof that include administering a therapeutically effective amount of any of the polypeptides, single-chain polypeptides, or multi-chain polypeptides described herein to the subject.

The term "subject" refers to any mammal. In some embodiments, the subject or "subject suitable for treatment" may be a canine (e.g., a dog), feline (e.g., a cat), equine (e.g., a horse), ovine, bovine, porcine, caprine, primate, e.g., a simian (e.g., a monkey (e.g., marmoset, baboon), or an ape (e.g., a gorilla, chimpanzee, orangutan, or gibbon) or a human; or rodent (e.g., a mouse, a guinea pig, a hamster, or a rat). In some embodiments, the subject or "subject suitable for treatment" may be a non-human mammal, especially mammals that are conventionally used as models for demonstrating therapeutic efficacy in humans (e.g., murine, lapine, porcine, canine or primate animals) may be employed. In some embodiments, the subject has been previously identified or diagnosed as having the disease (e.g., diabetes, allograft rejection, or cancer (e.g., any of the cancers described herein)).

In some embodiments, the subject has been previously identified or diagnosed as being in need of treatment with any of the polypeptides, single-chain polypeptides, or multi-chain polypeptides described herein.

As used herein, the term "treat" includes reducing the severity, frequency or the number of one or more (e.g., 1, 2, 3, 4, or 5) symptoms or signs of a disease or a condition in the subject (e.g., any of the subjects described herein). In some embodiments where the disease is cancer, treating results in reducing cancer growth, inhibiting cancer progression, inhibiting cancer metastasis, or reducing the risk of cancer recurrence in a subject having cancer.

Also provided herein are methods of inducing cell death in a cancer cell in a subject that include: administering a therapeutically effective amount of any of the pharmaceutical compositions described herein or any of the polypeptides, single-chain polypeptides, or multi-chain polypeptides described herein to a subject identified as having a cancer. In some embodiments, the cell death that is induced is necrosis. In some embodiments, the cell death that is induced is apoptosis.

In some embodiments of any of the methods described herein, the cancer is a primary tumor. In some embodiments of any of the methods described herein, the cancer is a metastasis.

Provided herein are methods of decreasing the risk of developing a metastasis or decreasing the risk of developing an additional metastasis in a subject having a cancer that include: administering a therapeutically effective amount of any of the pharmaceutical compositions of described herein or any of the polypeptides, single-chain polypeptides, or multi-chain polypeptides described herein to a subject identified as having a cancer. In some embodiments, the risk of developing a metastasis or the risk of developing an additional metastasis is decreased (e.g., a detectable decrease) by at least 1%, by at least 2%, at least 3%, at least 4%, at least 5%, at least 6%, at least 8%, at least 10%, at least 12%, at least 14%, at least 16%, at least 18%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99% in the subject as compared to the risk of a subject having a similar cancer, but administered no treatment or a treatment that does not include the administration of any of the polypeptides, single-chain polypeptides, or multi-chain polypeptides described herein.

As used herein, treating includes reducing the number, frequency, or severity of one or more (e.g., two, three, four, or five) signs or symptoms of a disease (e.g., cancer) in a patient having a disease (e.g., cancer (e.g., any of the cancers described herein)). For example, treatment can reduce cancer progression, reduce the severity of a cancer, or reduce the risk of re-occurrence of a cancer in a subject having cancer.

Non-limiting examples of cancer include: acute lymphoblastic leukemia (ALL), acute myeloid leukemia (AML), adrenocortical carcinoma, anal cancer, appendix cancer, astrocytoma, basal cell carcinoma, brain tumor, bile duct cancer, bladder cancer, bone cancer, breast cancer, bronchial tumor, Burkitt Lymphoma, carcinoma of unknown primary origin, cardiac tumor, cervical cancer, chordoma, chronic lymphocytic leukemia (CLL), chronic myelogenous leukemia (CML), chronic myeloproliferative neoplasm, colon cancer, colorectal cancer, craniopharyngioma, cutaneous T-cell lymphoma, ductal carcinoma, embryonal tumor, endometrial cancer, ependymoma, esophageal cancer, esthesioneuroblastoma, fibrous histiocytoma, Ewing sarcoma, eye cancer, germ cell tumor, gallbladder cancer, gastric cancer, gastrointestinal carcinoid tumor, gastrointestinal stromal tumor, gestational trophoblastic disease, glioma, head and neck cancer, hairy cell leukemia, hepatocellular cancer, histiocytosis, Hodgkin lymphoma, hypopharyngeal cancer, intraocular melanoma, islet cell tumor, Kaposi sarcoma, kidney cancer, Langerhans cell histiocytosis, laryngeal cancer, leukemia, lip and oral cavity cancer, liver cancer, lobular carcinoma in situ, lung cancer, lymphoma, macroglobulinemia, malignant fibrous histiocytoma, melanoma, Merkel cell carcinoma, mesothelioma, metastatic squamous neck cancer with occult primary, midline tract carcinoma involving NUT gene, mouth cancer, multiple endocrine neoplasia syndrome, multiple myeloma, mycosis fungoides, myelodysplastic syndrome, myelodysplastic/myeloproliferative neoplasm, nasal cavity and para-nasal sinus cancer, nasopharyngeal cancer, neuroblastoma, non-Hodgkin lymphoma, non-small cell lung cancer, oropharyngeal cancer, osteosarcoma, ovarian cancer, pancreatic cancer, papillomatosis, paraganglioma, parathyroid cancer, penile cancer, pharyngeal cancer, pheochromocytomas, pituitary tumor, pleuropulmonary blastoma, primary central nervous system lymphoma, prostate cancer, rectal cancer, renal cell cancer, renal pelvis and ureter cancer, retinoblastoma, rhabdoid tumor, salivary gland cancer, Sezary syndrome, skin cancer, small cell lung cancer, small intestine cancer, soft tissue sarcoma, spinal cord tumor, stomach cancer, T-cell lymphoma, teratoid tumor, testicular cancer, throat cancer, thymoma and thymic carcinoma, thyroid cancer, urethral cancer, uterine cancer, vaginal cancer, vulvar cancer, and Wilms' tumor. Additional examples of cancer are known in the art.

In some embodiments, the patient is further administered one or more additional therapeutic agents (e.g., one or more of a chemotherapeutic agent, a recombinant cytokine or interleukin protein, a kinase inhibitor, and a checkpoint inhibitor). In some embodiments, the one or more additional therapeutic agents is administered to the patient at approximately the same time as any of the polypeptides, single-chain polypeptides, or multi-chain polypeptides described herein are administered to the patient. In some embodiments, the one or more additional therapeutic agents are administered to the patient after the administration of any of the polypeptides, single-chain polypeptides, or multi-chain polypeptides described herein to the patient. In some embodiments, the one or more additional therapeutic agents are administered to the patient before the administration of any of the single-chain polypeptides or multi-chain polypeptides described herein to the patient.

In some embodiments of any of the methods described herein, the cancer is a solid cancer (e.g., breast cancer, prostate cancer, or non-small cell lung cancer).

Compositions

Also provided herein are compositions (e.g., pharmaceutical compositions) including any of the polypeptides, single-chain polypeptides, or multi-chain polypeptides described herein and one or more (e.g., 1, 2, 3, 4, or 5) pharmaceutically acceptable carrier(s) (e.g., any of the pharmaceutically acceptable carriers described herein or known in the art), diluent(s), or excipient(s).

As used herein, the phrase "pharmaceutically acceptable carrier" refers to any and all solvents, dispersion media, coatings, antibacterial agents, antimicrobial agents, isotonic and absorption delaying agents, and the like, compatible with pharmaceutical administration. Suitable carriers include, but are not limited to: water, saline, ringer's solutions, dextrose solution, and about 5% human serum albumin.

In some embodiments, any of the pharmaceutical compositions described herein can include one or more buffers (e.g., a neutral-buffered saline, a phosphate-buffered saline (PBS)), one or more proteins, polypeptides, or amino acids (e.g., glycine), one or more carbohydrates (e.g., glucose, mannose, sucrose, dextran, or mannitol), one or more antioxidants, one or more chelating agents (e.g., EDTA or glutathione), one or more preservatives, and/or a pharmaceutically acceptable carrier (e.g., bacteriostatic water, PBS, or saline).

In some embodiments, the compositions (e.g., pharmaceutical compositions) can be disposed in a sterile vial or a pre-loaded syringe.

In some embodiments, the compositions (e.g., pharmaceutical compositions) are formulated for different routes of administration (e.g., intravenous, subcutaneous, intramuscular, or intratumoral). Single or multiple administrations of any of the pharmaceutical compositions described herein can be given to a subject depending on, for example: the dosage and frequency as required and tolerated by the patient. A dosage of the pharmaceutical composition should provide a sufficient quantity of the polypeptides, single-chain polypeptides, or multi-chain polypeptides to effectively treat or ameliorate conditions, diseases, or symptoms.

Some embodiments of any of the pharmaceutical compositions described herein are prepared with carriers that protect against rapid elimination from the body, e.g., sustained- and controlled-release formulations, including implants and microencapsulated delivery systems. Biodegradable, biocompatible polymers can be used, e.g., ethylene vinyl acetate, polyanhydrides, polyglycolic acid, collage, polyorthoesters, and polylactic acid. Methods for preparation of such pharmaceutical compositions and formulations are apparent to those skilled in the art.

Also provided herein are methods of treating a subject in need thereof that include administering a therapeutically effective amount of at least one of any of the compositions or pharmaceutical compositions provided herein.

Kits

Also provided herein are kits that include any of the polypeptides, single-chain polypeptides, multi-chain polypeptides, or anti-idiotypic antibodies described herein, any of the compositions described herein, or any of the pharmaceutical compositions described herein. In some embodiments, the kits can include instructions for performing any of the methods described herein. In some embodiments, the kits can include at least one dose of any of the compositions (e.g., pharmaceutical compositions) described herein. In some embodiments, the kits can provide a syringe for administering any of the pharmaceutical compositions described herein.

Methods of Making or Screening for an Anti-CD3ε Antibody

Also provided are methods for making an anti-CD3ε antibody that include administering to a mammal (e.g., a non-human mammal) a protein comprising an antigenic portion of CD3ε consisting essentially of or consisting of a sequence of any one of SEQ ID NOs: 86-113 or QDGNEE (SEQ ID NO: 114), and harvesting B-cells (e.g., memory B-cells) from the mammal, and optionally, generating a hybridoma from a B-cell harvested from the mammal. In some embodiments, the methods can further include screening for antibodies produced by the harvested B-cell or hybridoma for a specific binding affinity for human CD3ε or one or more other activities.

Also provided herein are methods for screening for an anti-CD3ε antibody that include contacting an antibody with a protein comprising a portion of CD3ε consisting essentially of or consisting of a sequence of any one of SEQ ID NOs: 86-114.

Illustrative Embodiments

The invention may be defined by reference to the following illustrative embodiments:

Embodiment 1. A multi-chain polypeptide comprising:
(a) a first polypeptide comprising a light chain variable domain comprising an amino acid sequence at least 95% identical to SEQ ID NO: 1, and a second polypeptide comprising a heavy chain variable domain comprising an amino acid sequence at least 92% identical to SEQ ID NO: 3;
(b) a first polypeptide comprising a light chain variable domain comprising an amino acid sequence at least 96% identical to SEQ ID NO: 8, and a second polypeptide comprising a heavy chain variable domain comprising an amino acid sequence at least 92% identical to SEQ ID NO: 10;
(c) a first polypeptide comprising a light chain variable domain comprising an amino acid sequence at least 96% identical to SEQ ID NO: 12, and a second polypeptide comprising a heavy chain variable domain comprising an amino acid sequence at least 90% identical to SEQ ID NO: 14;
(d) a first polypeptide comprising a light chain variable domain comprising an amino acid sequence at least 95% identical to SEQ ID NO: 26, and a second polypeptide comprising a heavy chain variable domain comprising an amino acid sequence at least 95% identical to SEQ ID NO: 115;
(e) a first polypeptide comprising a light chain variable domain comprising at least 95% identical to SEQ ID NO: 1, and a second polypeptide comprising a heavy chain variable domain comprising at least 95% identical to SEQ ID NO: 5;
(f) a first polypeptide comprising a light chain variable domain comprising at least 95% identical to SEQ ID NO: 1, and a second polypeptide comprising a heavy chain variable domain comprising at least 95% identical to SEQ ID NO: 6;
(g) a first polypeptide comprising a light chain variable domain comprising at least 95% identical to SEQ ID NO: 1, and a second polypeptide comprising a heavy chain variable domain comprising at least 95% identical to SEQ ID NO: 7; or
(h) a first polypeptide comprising a light chain variable domain comprising at least 92% identical to SEQ ID NO: 16, and a second polypeptide comprising a heavy chain variable domain comprising at least 90% identical to SEQ ID NO: 18;
wherein the light chain variable domain and the heavy chain variable domain form an antigen-binding domain that binds specifically to CD3 epsilon.

Embodiment 2. A multi-chain polypeptide comprising:
(a) a first polypeptide comprising a light chain variable domain comprising a sequence of SEQ ID NO: 1, and a second polypeptide comprising a heavy chain variable domain comprising a sequence of SEQ ID NO: 3;
(b) a first polypeptide comprising a light chain variable domain comprising a sequence of SEQ ID NO: 8, and a second polypeptide comprising a heavy chain variable domain comprising a sequence of SEQ ID NO: 10;
(c) a first polypeptide comprising a light chain variable domain comprising a sequence of SEQ ID NO: 12, and a second polypeptide comprising a heavy chain variable domain comprising a sequence of SEQ ID NO: 14;
(d) a first polypeptide comprising a light chain variable domain comprising a sequence of SEQ ID NO: 26, and a second polypeptide comprising a heavy chain variable domain comprising a sequence of SEQ ID NO: 115;
(e) a first polypeptide comprising a light chain variable domain comprising a sequence of SEQ ID NO: 1, and a second polypeptide comprising a heavy chain variable domain comprising a sequence of SEQ ID NO: 5;
(f) a first polypeptide comprising a light chain variable domain comprising a sequence of SEQ ID NO: 1, and a second polypeptide comprising a heavy chain variable domain comprising a sequence of SEQ ID NO: 6;
(g) a first polypeptide comprising a light chain variable domain comprising a sequence of SEQ ID NO: 1, and a second polypeptide comprising a heavy chain variable domain comprising a sequence of SEQ ID NO: 7; or
(h) a first polypeptide comprising a light chain variable domain comprising a sequence of SEQ ID NO: 16, and a second polypeptide comprising a heavy chain variable domain comprising a sequence of SEQ ID NO: 18;
wherein the light chain variable domain and the heavy chain variable domain form an antigen-binding domain that binds specifically to CD3 epsilon.

Embodiment 3. The multi-chain polypeptide of embodiment 1 or 2, comprising (a) a first polypeptide comprising a light chain variable domain comprising a sequence of SEQ ID NO. 1, and a second polypeptide comprising a heavy chain variable domain comprising a sequence of SEQ ID NO: 3.

Embodiment 4. The multi-chain polypeptide of embodiment 1 or 2, comprising (b) a first polypeptide comprising a light chain variable domain comprising a sequence of SEQ ID NO: 8, and a second polypeptide comprising a heavy chain variable domain comprising a sequence of SEQ ID NO: 10.

Embodiment 5. The multi-chain polypeptide of embodiment 1 or 2, comprising (c) a first polypeptide comprising a light chain variable domain comprising a sequence of SEQ ID NO: 12, and a second polypeptide comprising a heavy chain variable domain comprising a sequence of SEQ ID NO: 14.

Embodiment 6. The multi-chain polypeptide of embodiment 1 or 2, comprising (c) a first polypeptide comprising a light chain variable domain comprising a sequence of SEQ ID NO: 26, and a second polypeptide comprising a heavy chain variable domain comprising a sequence of SEQ ID NO: 115.

Embodiment 7. The multi-chain polypeptide of embodiment 1 or 2, comprising (c) a first polypeptide comprising a light chain variable domain comprising a sequence of SEQ ID NO: 1, and a second polypeptide comprising a heavy chain variable domain comprising a sequence of SEQ ID NO:5.

Embodiment 8. The multi-chain polypeptide of embodiment 1 or 2, comprising (c) a first polypeptide comprising a light chain variable domain comprising a sequence of SEQ ID NO: 1, and a second polypeptide comprising a heavy chain variable domain comprising a sequence of SEQ ID NO: 6.

Embodiment 9. The multi-chain polypeptide of embodiment 1 or 2, comprising (c) a first polypeptide comprising a light chain variable domain comprising a sequence of SEQ ID NO: 1, and a second polypeptide comprising a heavy chain variable domain comprising a sequence of SEQ ID NO: 7.

Embodiment 10. The multi-chain polypeptide of embodiment 1 or 2, comprising (c) a first polypeptide comprising a light chain variable domain comprising a sequence of SEQ ID NO: 16, and a second polypeptide comprising a heavy chain variable domain comprising a sequence of SEQ ID NO: 18.

Embodiment 11. The multi-chain polypeptide of embodiment 1 or 2, wherein the complementarity determining regions (CDRs) are selected from the group consisting of;
  (a) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGTTDY (SEQ ID NO: 56);
  (b) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGSIDY (SEQ ID NO: 128);
  (c) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGDLDY (SEQ ID NO: 129);
  (d) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGAFDY (SEQ ID NO: 130);
  (e) a light chain variable domain comprising CDRs of amino acid sequence RSSQSLVNSDGKTHLN (SEQ ID NO: 117), KVSNRDS (SEQ ID NO: 118), and MQGTHWPLT (SEQ ID NO: 119) and comprises a heavy chain variable domain comprising CDRs of amino acid sequence SYGMH (SEQ ID NO: 54), IIWYDGSNKYYGDSVKG (SEQ ID NO: 131), and LSVNDYYVLDV (SEQ ID NO: 132);
  (f) a light chain variable domain comprising CDRs of amino acid sequence RASQSISNYLN (SEQ ID NO: 120), AASSLQS (SEQ ID NO: 121), and QQSFSTLYT (SEQ ID NO: 122) and comprises a heavy chain variable domain comprising CDRs of amino acid sequence SYSMN (SEQ ID NO: 133), YISRSSNYTYYADSVMG (SEQ ID NO: 134), and DRRGYSGYNHFDY (SEQ ID NO: 135);
  (g) a light chain variable domain comprising CDRs of amino acid sequence RSSQSLVNSDGKTHLN (SEQ ID NO: 117), KVSNRDS (SEQ ID NO: 118), and MQGTHWPLT (SEQ ID NO: 119) and comprises a heavy chain variable domain comprising CDRs of amino acid sequence SYGMH (SEQ ID NO: 54), IIWYDGSNKYYGDSVKG (SEQ ID NO: 131), and LSVNDYYVLDV (SEQ ID NO: 132);
  (h) a light chain variable domain comprising CDRs of amino acid sequence QASQDIRKYLN (SEQ ID NO: 123), DASNLET (SEQ ID NO: 124), and QHYANLPPLFT (SEQ ID NO: 125) and comprises a heavy chain variable domain comprising CDRs of amino acid sequence SYEMN (SEQ ID NO: 136), YISSSSTTIYYAGSVKG (SEQ ID NO: 137), and DRGALDY (SEQ ID NO: 138); and
  (i) a light chain variable domain comprising CDRs of amino acid sequence QASQDISNYLN (SEQ ID NO: 126), DASNLET (SEQ ID NO: 124), and QQYDNLPIT (SEQ ID NO: 127) and comprises a heavy chain variable domain comprising CDRs of amino acid sequence SYGMH (SEQ ID NO: 54), IIWYDGSKRYYADSVKG (SEQ ID NO: 55), and DLITGTTDY (SEQ ID NO: 56).

Embodiment 12. The multi-chain polypeptide of any one of embodiments 1-11, wherein the multi-chain polypeptide is selected from the group consisting of: a VHH-scAb, a VHH-Fab, a Dual scFab, a F(ab')2, a diabody, a crossMab, a DAF (two-in-one), a DAF (four-in-one), a DutaMab, a DT-IgG, a knobs-in-holes common light chain, a knobs-in-holes assembly, a charge pair, a Fab-arm exchange, a SEEDbody, a LUZ-Y, a FcAb, a xX-body, an orthogonal Fab, a DVD-IgG, a IgG(H)-scFv, a scFv-(H)IgG, IgG(L)-scFv, scFv-(L)IgG, IgG(L,H)-Fv, IgG(H)-V, V(H)—IgG, IgG(L)-V, V(L)-IgG, KIH IgG-scFab, 2scFv-IgG, IgG-2scFv, scFv4-Ig, Zybody, DVI-IgG, Diabody-CH3, a triple body, a miniantibody, a minibody, a TriBi minibody, scFv-CH3 KIH, Fab-scFv, a F(ab')2-scFv2, a scFv-KIH, a Fab-scFv-Fc, a tetravalent HCAb, a scDiabody-Fc, a Diabody-Fc, a tandem scFv-Fc, a VHH-Fc, a tandem VHH-Fc, a VHH-Fc KiH, a Fab-VHH-Fc, an Intrabody, a dock and lock, an ImmTAC, an IgG-IgG conjugate, a Cov-X-Body, a scFv1-PEG-scFv2, an Adnectin, a DARPin, a fibronectin, and a DEP conjugate.

Embodiment 13. The multi-chain polypeptide of any one of embodiments 1-11, wherein the multi-chain polypeptide is an antibody that binds specifically to CD3 epsilon or an antigen-binding fragment thereof.

Embodiment 14. The multi-chain polypeptide of any one of embodiments 1-11, wherein the multi-chain polypeptide is an IgG.

Embodiment 15. The multi-chain polypeptide of embodiment 14, wherein the IgG is an IgG1, IgG2, IgG3, or an IgG4.

Embodiment 16. The multi-chain polypeptide of embodiment 15, wherein the IgG is Ig2.

Embodiment 17. The multi-chain polypeptide of embodiment 13, wherein the antibody is an IgM, IgA, or IgE.

Embodiment 18. The multi-chain polypeptide of embodiment 14, wherein the antigen-binding fragment is a Fab, F(ab')2, Fab', or Fv.

Embodiment 19. The multi-chain polypeptide of any one of embodiments 1-18, wherein the multi-chain polypeptide comprises an additional light chain variable domain and an additional heavy chain variable domain.

Embodiment 20. The multi-chain polypeptide of any one of embodiments 1-19, wherein the multi-chain polypeptide is humanized.

Embodiment 21. The multi-chain polypeptide of any one of embodiments 1-20, wherein at least one polypeptide of the multi-chain polypeptide is conjugated to a toxin, a radioisotope, a drug, or a small molecule via a cleavable linker.

Embodiment 22. The multi-chain polypeptide of any one of embodiments 1-20, wherein at least one polypeptide of the multi-chain polypeptide is conjugated to a toxin, a radioisotope, a drug, or a small molecule via a non-cleavable linker.

Embodiment 23. A pharmaceutical composition including a multi-chain polypeptide of any one of embodiments 1-22.

Embodiment 24. A method of treating a subject in need thereof comprising administering to the subject a multi-chain polypeptide of any one of embodiments 1-22 or a pharmaceutical composition of embodiment 22.

Embodiment 25. A set of nucleic acids that together encode polypeptides that together make up the multi-chain polypeptide of any one of embodiments 1-22.

Embodiment 26. The set of nucleic acids of embodiment 25, wherein the set of nucleic acids is a pair of expression vectors.

Embodiment 27. The set of nucleic acids of embodiment 25, wherein the set of nucleic acids are present in a single expression vector.

Embodiment 28. A nucleic acid that encodes polypeptides that together make up the multi-chain polypeptide of any one of embodiments 1-22.

Embodiment 29. The nucleic acid of embodiment 28, wherein the nucleic acid is an expression vector.

Embodiment 30. A cell that comprises the set of nucleic acids of any one of embodiments 24-29.

Embodiment 31. A cell that comprises the nucleic acid of embodiments 28 or 29.

Embodiment 32. A method of producing a multi-chain polypeptide comprising:
(a) culturing the cell of embodiment 30 or 31 in a liquid culture medium under conditions that allow for the production of the multi-chain polypeptide; and
(b) recovering the multi-chain polypeptide from the cell or the liquid culture medium.

Embodiment 33. The method of embodiment 32, further comprising:
(c) purifying the multi-chain polypeptide.

Embodiment 34. The method of embodiment 33, further comprising:
(d) formulating the multi-chain polypeptide into a pharmaceutical composition.

Embodiment 35. A pharmaceutical composition produced by the method of embodiment 34.

Embodiment 36. A method of treating a subject in need thereof comprising administering to the subject a multi-chain polypeptide of any one of embodiments 32-34 or a pharmaceutical composition of embodiment 35.

Embodiment 37. A kit comprising a multi-chain polypeptide of any one of embodiment 1-22 or a pharmaceutical composition of embodiment 23 or 35.

Embodiment 38. A single-chain polypeptide comprising:
(a) a light chain variable domain comprising an amino acid sequence at least 95% identical to SEQ ID NO: 1, and a heavy chain variable domain comprising an amino acid sequence at least 92% identical to SEQ ID NO: 3;
(b) a light chain variable domain comprising an amino acid sequence at least 96% identical to SEQ ID NO. 8, and a heavy chain variable domain comprising an amino acid sequence at least 92% identical to SEQ ID NO: 10;
(c) a light chain variable domain comprising an amino acid sequence at least 96% identical to SEQ ID NO: 12, and a heavy chain variable domain comprising an amino acid sequence at least 90/o identical to SEQ ID NO: 14;
(d) a light chain variable domain comprising an amino acid sequence at least 95% identical to SEQ ID NO: 26, and an amino acid heavy chain variable domain comprising a sequence at least 95% identical to SEQ ID NO: 115,
(e) a light chain variable domain comprising an amino acid sequence at least 95% identical to SEQ ID NO: 1, and a heavy chain variable domain comprising an amino acid sequence at least 95% identical to SEQ ID NO: 5,
(f) a light chain variable domain comprising an amino acid sequence at least 95% identical to SEQ ID NO: 1, and a heavy chain variable domain comprising an amino acid sequence at least 95% identical to SEQ ID NO: 6,
(g) a light chain variable domain comprising an amino acid sequence at least 95% identical to SEQ ID NO: 1, and a heavy chain variable domain comprising an amino acid sequence at least 95% identical to SEQ ID NO: 7, or
(h) a light chain variable domain comprising an amino acid sequence at least 92% identical to SEQ ID NO: 16, and a heavy chain variable domain comprising an amino acid sequence at least 90% identical to SEQ ID NO: 18,
wherein the light chain variable domain and the heavy chain variable domain form an antigen-binding domain that binds specifically to CD3 epsilon.

Embodiment 39. A single-chain polypeptide comprising:
(a) a light chain variable domain comprising an amino acid sequence of SEQ ID NO: 1, and a heavy chain variable domain comprising an amino acid sequence of SEQ ID NO: 3;
(b) a light chain variable domain comprising an amino acid sequence of SEQ ID NO: 8, and a heavy chain variable domain comprising an amino acid sequence of SEQ ID NO: 10:
(c) a light chain variable domain comprising an amino acid sequence of SEQ ID NO: 12, and a heavy chain variable domain comprising an amino acid sequence of SEQ ID NO: 14;
(d) a light chain variable domain comprising an amino acid sequence of SEQ ID NO: 26, and a heavy chain variable domain comprising an amino acid sequence of SEQ ID NO: 115, (e) a light chain variable domain comprising an amino acid sequence of SEQ ID NO: 1, and a heavy chain variable domain comprising an amino acid sequence of SEQ ID NO: 5, (f) a light chain variable domain comprising an amino acid sequence of SEQ ID NO: 1, and a heavy chain variable domain comprising an amino acid sequence of SEQ ID NO: 6, (g) a light chain variable domain comprising an amino acid sequence of SEQ ID NO: 1, and a heavy chain variable domain comprising an amino acid sequence of SEQ ID NO: 7, or (h) a light chain variable domain comprising an amino acid sequence of SEQ ID NO: 16, and a heavy chain variable domain comprising an amino acid sequence of SEQ ID NO: 18, wherein the light chain variable domain and the heavy chain variable domain form an antigen-binding domain that binds specifically to CD3 epsilon.

Embodiment 40. The single-chain polypeptide of embodiment 38 or 39, comprising a light chain variable domain comprising a sequence of SEQ ID NO: 1, and a heavy chain variable domain comprising a sequence of SEQ ID NO: 3.

Embodiment 41. The single-chain polypeptide of embodiment 38 or 39, comprising a light chain variable domain comprising a sequence of SEQ ID NO: 8, and a heavy chain variable domain comprising a sequence of SEQ ID NO: 10.

Embodiment 42. The single-chain polypeptide of embodiment 38 or 39, comprising a light chain variable domain comprising a sequence of SEQ ID NO: 12, and a heavy chain variable domain comprising a sequence of SEQ ID NO: 14.

Embodiment 43. The single-chain polypeptide of embodiment 38 or 39, comprising a light chain variable domain comprising a sequence of SEQ ID NO: 26, and a heavy chain variable domain comprising a sequence of SEQ ID NO: 115.

Embodiment 44. The single-chain polypeptide of embodiment 38 or 39, comprising a light chain variable domain comprising a sequence of SEQ ID NO: 1, and a heavy chain variable domain comprising a sequence of SEQ ID NO: 5.

Embodiment 45. The single-chain polypeptide of embodiment 38 or 39, comprising a light chain variable domain comprising a sequence of SEQ ID NO: 1, and a heavy chain variable domain comprising a sequence of SEQ ID NO: 6.

Embodiment 46. The single-chain polypeptide of embodiment 38 or 39, comprising a light chain variable domain comprising a sequence of SEQ ID NO: 1, and a heavy chain variable domain comprising a sequence of SEQ ID NO: 7.

Embodiment 47. The single-chain polypeptide of embodiment 38 or 39, comprising a light chain variable domain comprising a sequence of SEQ ID NO: 16, and a heavy chain variable domain comprising a sequence of SEQ ID NO: 18.

Embodiment 48. The single-chain polypeptide of any one of embodiments 38-47, wherein the single-chain polypeptide is an antibody that binds specifically to CD3 epsilon or an antigen-binding fragment thereof.

Embodiment 49. The single-chain polypeptide of any one of embodiments 38-48, wherein the antigen-binding domain is a scFv.

Embodiment 50. The single-chain polypeptide of any one of embodiments 38-48, wherein the single-chain polypeptide is a BiTE, a (scFv)2, a nanobody, a nanobody-HSA, a DART, a TandAb, a scDiabody, a scDiabody-CH3, scFv-CH-CL-scFv, a HSAbody, scDiabody-HSA, or a tandem-scFv.

Embodiment 51. The single-chain polypeptide of any one of embodiments 38-50, wherein the single-chain polypeptide comprises an additional light chain variable domain and an additional heavy chain variable domain.

Embodiment 52. The single-chain polypeptide of any one of embodiments 38-49 and 51, wherein the single-chain polypeptide is a chimeric antigen receptor (CAR).

Embodiment 53. The single-chain polypeptide of any one of embodiments 38-52, wherein the single-chain polypeptide is humanized.

Embodiment 54. The single-chain polypeptide of any one of embodiments 38-53, wherein the single-chain polypeptide is conjugated to a toxin, a radioisotope, a drug, or a small molecule via a cleavable linker.

Embodiment 55. The single-chain polypeptide of any one of embodiments 38-53, wherein the single-chain polypeptide is conjugated to a toxin, a radioisotope, a drug, or a small molecule via a non-cleavable linker.

Embodiment 56. A pharmaceutical composition including a single-chain polypeptide of any one of embodiments 38-55.

Embodiment 57. A method of treating a subject in need thereof comprising administering to the subject a single-chain polypeptide of any one of embodiments 38-55 or a pharmaceutical composition of embodiment 56.

Embodiment 58. A nucleic acid that encodes a single-chain polypeptide of any one of embodiments 38-55.

Embodiment 59. The nucleic acid of embodiment 58, wherein the nucleic acid is an expression vector.

Embodiment 60. A cell that comprises the nucleic acid of embodiments 58 or 59.

Embodiment 61. A method of producing a single-chain polypeptide comprising:
(a) culturing the cell of embodiment 60 in a liquid culture medium under conditions that allow for the production of the single-chain polypeptide; and
(b) recovering the single-chain polypeptide from the cell or the liquid culture medium.

Embodiment 62. The method of embodiment 61, further comprising:
(c) purifying the single-chain polypeptide.

Embodiment 63. The method of embodiment 62, further comprising:
(d) formulating the single-chain polypeptide into a pharmaceutical composition.

Embodiment 64. A pharmaceutical composition produced by the method of embodiment 63.

Embodiment 65. A method of treating a subject in need thereof comprising administering to the subject a single-chain polypeptide of any one of embodiments 61-63 or a pharmaceutical composition of embodiment 64.

Embodiment 66. A kit comprising a single-chain polypeptide of any one of embodiments 38-55 or a pharmaceutical composition of embodiment 56 or 64.

Embodiment 67. An anti-idiotypic antibody comprising:
(a) a first polypeptide comprises a light chain variable domain comprising an amino acid sequence at least 96% identical to SEQ ID NO: 27, and a second polypeptide comprising a heavy chain variable domain comprising an amino acid sequence at least 90% identical to SEQ ID NO: 29;
(b) a first polypeptide comprises a light chain variable domain comprising an amino acid sequence at least 95% identical to SEQ ID NO: 38, and a second polypeptide comprising a heavy chain variable domain comprising an amino acid sequence at least 90% identical to SEQ ID NO: 40;
(c) a first polypeptide comprises a light chain variable domain comprising an amino acid sequence at least 95% identical to SEQ ID NO: 31, and a second polypeptide comprising a heavy chain variable domain comprising an amino acid sequence at least 90% identical to SEQ ID NO: 33;

(d) a first polypeptide comprises a light chain variable domain comprising an amino acid sequence at least 99% identical to SEQ ID NO: 42, and a second polypeptide comprising a heavy chain variable domain comprising an amino acid sequence at least 90% identical to SEQ ID NO: 44;

(e) a first polypeptide comprises a light chain variable domain comprising an amino acid sequence at least 99% identical to SEQ ID NO: 42, and a second polypeptide comprising a heavy chain variable domain comprising an amino acid sequence at least 90% identical to SEQ ID NO: 48;

(f) a first polypeptide comprises a light chain variable domain comprising an amino acid sequence at least 95% identical to SEQ ID NO: 31, and a second polypeptide comprising a heavy chain variable domain comprising an amino acid sequence at least 95% identical to SEQ ID NO: 36; or (g) a first polypeptide comprises a light chain variable domain comprising an amino acid sequence at least 99% identical to SEQ ID NO: 42, and a second polypeptide comprising a heavy chain variable domain comprising an amino acid sequence at least 90% identical to SEQ ID NO: 46;

wherein the light chain variable domain and the heavy chain variable domain form an antigen-binding domain that binds specifically to a CD3 epsilon antibody.

Embodiment 68. An anti-idiotypic antibody comprising:

(a) a first polypeptide comprising a light chain variable domain comprising a sequence of SEQ ID NO: 27, and a second polypeptide comprising a heavy chain variable domain comprising a sequence of SEQ ID NO: 29;

(b) a first polypeptide comprising a light chain variable domain comprising a sequence of SEQ ID NO: 38, and a second polypeptide comprising a heavy chain variable domain comprising a sequence of SEQ ID NO: 40;

(c) a first polypeptide comprising a light chain variable domain comprising a sequence of SEQ ID NO: 31, and a second polypeptide comprising a heavy chain variable domain comprising a sequence of SEQ ID NO: 33;

(d) a first polypeptide comprising a light chain variable domain comprising a sequence of SEQ ID NO: 42, and a second polypeptide comprising a heavy chain variable domain comprising a sequence of SEQ ID NO: 44;

(e) a first polypeptide comprising a light chain variable domain comprising a sequence of SEQ ID NO: 42, and a second polypeptide comprising a heavy chain variable domain comprising a sequence of SEQ ID NO: 48;

(f) a first polypeptide comprising a light chain variable domain comprising a sequence of SEQ ID NO: 31, and a second polypeptide comprising a heavy chain variable domain comprising a sequence of SEQ ID NO: 36; or (g) a first polypeptide comprising a light chain variable domain comprising a sequence of SEQ ID NO: 42, and a second polypeptide comprising a heavy chain variable domain comprising a sequence of SEQ ID NO: 46;

wherein the light chain variable domain and the heavy chain variable domain form an antigen-binding domain that binds specifically to a CD3 epsilon antibody.

Embodiment 69. The single-chain polypeptide of embodiment 67 or 68, comprising a light chain variable domain comprising a sequence of SEQ ID NO: 27, and a heavy chain variable domain comprising a sequence of SEQ ID NO: 29.

Embodiment 70. The single-chain polypeptide of embodiment 67 or 68, comprising a light chain variable domain comprising a sequence of SEQ ID NO: 38, and a heavy chain variable domain comprising a sequence of SEQ ID NO: 40.

Embodiment 71. The single-chain polypeptide of embodiment 67 or 68, comprising a light chain variable domain comprising a sequence of SEQ ID NO: 31, and a heavy chain variable domain comprising a sequence of SEQ ID NO: 33.

Embodiment 72. The single-chain polypeptide of embodiment 67 or 68, comprising a light chain variable domain comprising a sequence of SEQ ID NO: 42, and a heavy chain variable domain comprising a sequence of SEQ ID NO: 44.

Embodiment 73. The single-chain polypeptide of embodiment 67 or 68, comprising a light chain variable domain comprising a sequence of SEQ ID NO: 42, and a heavy chain variable domain comprising a sequence of SEQ ID NO: 48.

Embodiment 74. The single-chain polypeptide of embodiment 67 or 68, comprising a light chain variable domain comprising a sequence of SEQ ID NO: 31, and a heavy chain variable domain comprising a sequence of SEQ ID NO: 36.

Embodiment 75. The single-chain polypeptide of embodiment 67 or 68, comprising a light chain variable domain comprising a sequence of SEQ ID NO: 42, and a heavy chain variable domain comprising a sequence of SEQ ID NO: 46.

The invention is further described in the following examples, which do not limit the scope of the invention described in the claims.

EXAMPLES

Example 1. Generation of Antibodies

Antibodies were generated that include two antigen-binding domains that bind specifically to CD3&. The antibodies shown in Table 3 were constructed and tested.

TABLE 3

Antibodies Constructed and Tested

| Molecule name | Target | Light Chain Variable Domain Amino Acid Sequence (SEQ ID NO.) | Heavy Chain Variable Domain Amino Acid Sequence (SEQ ID NO.) |
| --- | --- | --- | --- |
| 6d59 | CD3 | 1 | 3 |
| 6d59_SI | CD3 | 1 | 5 |
| 6d59_DL | CD3 | 1 | 6 |
| 6d59_AF | CD3 | 1 | 7 |
| 6d23 | CD3 | 8 | 10 |
| 4b8 | CD3 | 12 | 14 |
| 4c83 | CD3 | 26 | 115 |
| 1c144 | CD3 | 16 | 18 |
| 6d58 (same as 6d59) | CD3 | 1 | 3 |
| 6d11-3 | CD3 | 20 | 22 |
| 6d11-5 | CD3 | 24 | 22 |
| 6d59.id.1b18.1 | Anti-CD3(6d59) | 27 | 29 |
| 6d59.id.1b54.1 | Anti-CD3(6d59) | 31 | 33 |
| 6d59.id.1b61.1 | Anti-CD3(6d59) | 31 | 36 |
| 6d59.id.1b67.1 | Anti-CD3(6d59) | 38 | 40 |
| 6d59.id.1b71.1 | Anti-CD3(6d59) | 42 | 44 |
| 6d59.id.1b73.1 | Anti-CD3(6d59) | 42 | 46 |
| 6d59.id.1b76.1 | Anti-CD3(6d59) | 42 | 48 |

TABLE 4

Table of light chain CDRs identified in accordance with the definitions of Kabat, Sequences of Proteins of Immunological Interest (National Institutes of Health, Bethesda, Md. (1987 and 1991).

| Antibody | CDR1 | CDR2 | CDR3 |
|---|---|---|---|
| 6d59 | RSSRSLVYSDGNTHLI (SEQ ID NO: 51) | RVSNRVS (SEQ ID NO: 52) | LQGAHWPYT (SEQ ID NO: 53) |
| 6d59_SI | RSSRSLVYSDGNTHLI (SEQ ID NO: 51) | RVSNRVS (SEQ ID NO: 52) | LQGAHWPYT (SEQ ID NO: 53) |
| 6d59_DL | RSSRSLVYSDGNTHLI (SEQ ID NO: 51) | RVSNRVS (SEQ ID NO: 52) | LQGAHWPYT (SEQ ID NO: 53) |
| 6d59_AF | RSSRSLVYSDGNTHLI (SEQ ID NO: 51) | RVSNRVS (SEQ ID NO: 52) | LQGAHWPYT (SEQ ID NO: 53) |
| 6d23 | RSSQSLVNSDGKTHLN (SEQ ID NO: 117) | KVSNRDS (SEQ ID NO: 118) | MQGTHWPLT (SEQ ID NO: 119) |
| 4b8 | RASQSISNYLN (SEQ ID NO: 120) | AASSLQS (SEQ ID NO: 121) | QQSFSTLYT (SEQ ID NO: 122) |
| 4c83 | RSSQSLVNSDGKTHLN (SEQ ID NO: 117) | KVSNRDS (SEQ ID NO: 118) | MQGTHWPLT (SEQ ID NO: 119) |
| 1c144 | QASQDIRKYLN (SEQ ID NO: 123) | DASNLET (SEQ ID NO: 124) | QHYANLPPLFT (SEQ ID NO: 125) |
| 6d11-3 | RSSRSLVYSDGNTHLI (SEQ ID NO: 51) | RVSNRVS (SEQ ID NO: 52) | LQGAHWPYT (SEQ ID NO: 53) |
| 6d11-5 | QASQDISNYLN (SEQ ID NO: 126) | DASNLET (SEQ ID NO. 124) | QQYDNLPIT (SEQ ID NO: 127) |

TABLE 5

Table of heavy chain CDRs identified in accordance with the definitions of Kabat, Sequences of Proteins of Immunological Interest (National Institutes of Health, Bethesda, Md. (1987 and 1991).

| Antibody | CDR1 | CDR2 | CDR3 |
|---|---|---|---|
| 6d59 | SYGMH (SEQ ID NO: 54) | IIWYDGSKRYYADSVKG (SEQ ID NO: 55) | DLITGTTDY (SEQ ID NO: 56) |
| 6d59_SI | SYGMH (SEQ ID NO: 54) | IIWYDGSKRYYADSVKG (SEQ ID NO: 55) | DLITGSIDY (SEQ ID NO: 128) |
| 6d59 DL | SYGMH (SEQ ID NO: 54) | IIWYDGSKRYYADSVKG (SEQ ID NO: 55) | DLITGDLDY (SEQ ID NO: 129) |
| 6d59_AF | SYGMH (SEQ ID NO: 54) | IIWYDGSKRYYADSVKG (SEQ ID NO: 55) | DLITGAFDY (SEQ ID NO: 130) |
| 6d23 | SYGMH (SEQ ID NO: 54) | IIWYDGSNKYYGDSVKG (SEQ ID NO: 131) | LSVNDYYVLDV (SEQ ID NO: 132) |
| 4b8 | SYSMN (SEQ ID NO: 133) | YISRSSNYTYYADSVMG (SEQ ID NO: 134) | DRRGYSGYNHFDY (SEQ ID NO: 135) |
| 4c83 | SYGMH (SEQ ID NO: 54) | IIWYDGSNKYYGDSVKG (SEQ ID NO: 131) | LSVNDYYVLDV (SEQ ID NO: 132) |
| 1c144 | SYEMN (SEQ ID NO: 136) | YISSSSTTIYYAGSVKG (SEQ ID NO: 137) | DRGALDY (SEQ ID NO: 138) |
| 6d11-3 | SYGMH (SEQ ID NO: 54) | IIWYDGSKRYYADSVKG (SEQ ID NO: 55) | DLITGTTDY (SEQ ID NO: 56) |
| 6d11-5 | SYGMH (SEQ ID NO: 54) | IIWYDGSKRYYADSVKG (SEQ ID NO: 55) | DLITGTTDY (SEQ ID NO: 56) |

6d59

Variable Light Chain Amino Acid Sequence (SEQ ID NO: 1)
DVVMTQSPLSLPVTLGQPASISCRSSRSLVYSDGNTHLIWFQQRPGQSPRRLIYRVSNRVSGVPDRFSGSGSGT
DFTLKISRVEAEDVGVYYCLQGAHWPYTFGQGTKLEIKR Variable Light Chain Nucleotide Sequence (SEQ ID NO: 2)
GATGTTGTGATGACTCAGTCTCCACTCTCCCTGCCCGTCACCCTTGGACAGCCGGCCTCCATCTCCTGCAGGTC
TAGTCGAAGCCTCGTATACAGTGATGGAAACACCCACTTGATTTGGTTTCAGCAGAGGCCTGGCCAATCTCCAA
GGCGCCTAATTTATAGGGTTTCTAACCGGGTCTCTGGGGTCCCAGACAGATTCAGCGGCAGTGGGTCAGGCACT
GATTTCACACTGAAAATCAGCAGGGTGGAGGCTGAGGATGTTGGGGTTTATTACTGCTTGCAAGGTGCACACTG
GCCATACACTTTTGGCCAGGGGACCAAGCTGGAGATCAAACGG TABLE 5-continued Table of heavy chain CDRs identified in accordance with the
definitions of Kabat, Sequences of Proteins of Immunological Interest
(National Institutes of Health, Bethesda, Md. (1987 and 1991).

| Antibody | CDR1 | CDR2 | CDR3 |
|---|---|---|---|

Variable Heavy Chain Amino Acid Sequence (SEQ ID NO: 3)
QVHLVESGGGVVQPGRSLRLSCAASGFKFRSYGMHWVRQAPGKGLEWVAIIWYDGSKRYYADSVKGRFTISRDN
SKNTLYLQMSSLRAEDTAVYYCARDLITGTTDYWGQGTLVTVSS Variable Heavy Chain Nucleotide Sequence (SEQ ID NO: 4)
CAGGTGCACCTGGTGGAGTCTGGGGGAGGCGTGGTCCAGCCTGGGAGGTCCCTGAGACTCTCCTGCGCAGCGTC
TGGATTCAAATTCAGAAGCTATGGCATGCACTGGGTCCGCCAGGCTCCAGGCAAGGGGCTGGAGTGGGTGGCAA
TTATATGGTATGATGGAAGTAAGAGATACTATGCAGACTCCGTGAAGGGCCGATTCACCATCTCCAGAGACAAT
TCCAAGAACACGCTTTATCTGCAAATGAGCAGCCTGAGAGCCGAGGACACGGCTGTGTATTACTGTGCGAGAGA
TCTTATAACTGGAACTACGGACTACTGGGGCCAGGGAACCCTGGTCACCGTCTCCTCA 6d59 (SI)

Variable Light Chain Amino Acid Sequence (SEQ ID NO: 1) same as above
Variable Heavy Chain Amino Acid Sequence (SEQ ID NO: 5)

QVHLVESGGGVVQPGRSLRLSCAASGFKFRSYGMHWVRQAPGKGLEWVAIIWYDGSKRYYADSVKGRFTISRDN
SKNTLYLQMSSLRAEDTAVYYCARDLITGSIDYWGQGTLVTVSS

6d59 (DL)

Variable Light Chain Amino Acid Sequence (SEQ ID NO: 1) same as above
Variable Heavy Chain Amino Acid Sequence (SEQ ID NO: 6)

QVHLVESGGGVVQPGRSLRLSCAASGFKFRSYGMHWVRQAPGKGLEWVAIIWYDGSKRYYADSVKGRFTISRDN
SKNTLYLQMSSLRAEDTAVYYCARDLITGDLDYWGQGTLVTVSS

6d59 (AF)

Variable Light Chain Amino Acid Sequence (SEQ ID NO: 1) same as above
Variable Heavy Chain Amino Acid Sequence (SEQ ID NO: 7)

QVHLVESGGGVVQPGRSLRLSCAASGFKFRSYGMHWVRQAPGKGLEWVAIIWYDGSKRYYADSVKGRFTISRDN
SKNTLYLQMSSLRAEDTAVYYCARDLITGAFDYWGQGTLVTVSS

6d23

Variable Light Chain Amino Acid Sequence (SEQ ID NO: 8)
DVVMTQSPFSLPVTLGQPASMSCRSSQSLVNSDGKTHLNWFQQRPGQSPRRLIYKVSNRDSGVPDRFSGSGSGT
DFTLKISRVEAEDVGVYYCMQGTHWPLTFGGGTKVEIKR Variable Light Chain Nucleotide Sequence (SEQ ID NO: 9)
GATGTTGTGATGACTCAGTCTCCATTCTCCCTGCCCGTCACCCTTGGACAGCCGGCCTCCATGTCCTGCAGGTC
TAGTCAAAGTCTCGTAAACAGTGATGGAAAAACCCACTTGAATTGGTTTCAGCAGAGGCCAGGCCAATCTCCAA
GGCGCCTAATTTATAAGGTTTCTAACCGGGACTCTGGGGTCCCGGACAGATTCAGCGGCAGTGGGTCAGGCACT
ACACTGAAAATCAGCAGGGTGGAGGCTGAGGATGTTGGGGTTTATTACTGCATGCAAGGTACACACTGGCCTCT
CACTTTCGGCGGAGGGACCAAGGTGGAGATCAAACGG Variable Heavy Chain Amino Acid Sequence (SEQ ID NO: 10)
QVQLVESGGGVVQPGRSLRLSCEASGFTFRSYGMHWVRQAPGKGLEWVAIIWYDGSNKYYGDSVKGRFTISRDN
SKNTLSLQMNSLRAEDTAVYYCASLSVNDYYVLDVWGQGTTVTVSS Variable Heavy Chain Nucleotide Sequence (SEQ ID NO: 11)
CAGGTGCAACTGGTGGAGTCTGGGGGAGGCGTGGTCCAGCCTGGGAGGTCCCTGAGACTCTCCTGTGAAGCGTC
TGGATTCACCTTCAGAAGCTATGGCATGCACTGGGTCCGCCAGGCTCCAGGCAAGGGGCTGGAGTGGGTGGCAA
TTATATGGTATGATGGAAGTAATAAATACTATGGAGACTCCGTGAAGGGCCGATTCACCATCTCCAGAGACAAT
TCCAAGAACACGCTGTCTCTGCAAATGAACAGCCTGAGAGCCGAGGACACGGCTGTGTATTACTGTGCGAGCCT
CAGCGTAAATGACTACTACGTTTTGGACGTCTGGGGCCAAGGGACCACGGTCACCGTCTCCTCA 4b8

Variable Light Chain Amino Acid Sequence (SEQ ID NO: 12)
DIQMTQSPSSLSASVGDRVTITCRASQSISNYLNWYQQKPGKAPKLLIYAASSLQSGVPSRFSGSRSGTDFTLT
ISSLQPEDFASYYCQQSFSTLYTFGQETKLEIKR Variable Light Chain Nucleotide Sequence (SEQ ID NO: 13)
GACATCCAGATGACCCAGTCTCCATCCTCCCTGTCTGCATCTGTAGGAGACAGAGTCACCATCACTTGCCGGGC
AAGTCAGAGTATTAGTAATTATTTAAATTGGTATCAGCAGAAACCAGGGAAAGCCCCTAAGCTCCTGATCTATG
CTGCATCCAGTTTGCAAAGTGGGGTCCCTTCAAGGTTCAGTGGCAGTAGATCTGGGACAGATTTCACACTCACC
ATCAGCAGTCTGCAACCTGAAGATTTTGCAAGTTACTACTGTCAACAGAGTTTCAGTACCCTGTACACTTTTGG
CCAGGAGACCAAGCTGGAGATCAAACGG

TABLE 5-continued

Table of heavy chain CDRs identified in accordance with the
definitions of Kabat, Sequences of Proteins of Immunological Interest
(National Institutes of Health, Bethesda, Md. (1987 and 1991).

| Antibody | CDR1 | CDR2 | CDR3 |
|---|---|---|---|

Variable Heavy Chain Amino Acid Sequence (SEQ ID NO: 14)
EVQLVESGGGLVKPGGSLRLSCAASGFTFSSYSMNWVRQAPGKGLDWVSYISRSSNYTYYADSVMGRFTISRDN
AKNSLYLQMNSLRAEDTAVYYCARDRRGYSGYNHFDYWGQGTLVTVSS Variable Heavy Chain Nucleotide Sequence (SEQ ID NO: 15)
GAGGTGCAGTTGGTGGAATCTGGGGGAGGCCTGGTCAAGCCTGGGGGGTCCCTGAGACTCTCCTGTGCTGCCTC
TGGATTCACCTTCAGTAGTTATAGTATGAACTGGGTCCGCCAGGCTCCAGGGAAGGGCCTGGACTGGGTCTCAT
ACATTAGTAGAAGTAGTAATTACACATATTACGCAGACTCAGTGATGGGCCGATTCACCATCTCCAGAGACAAC
GCCAAGAACTCACTGTATCTGCAAATGAACAGCCTGAGAGCCGAGGACACGGCTGTATATTACTGTGCGAGAGA
TCGACGTGGATATAGTGGCTACAATCATTTTGACTACTGGGGCCAGGGAACCCTGGTCACCGTCTCCTCA 4c83

Variable Light Chain Amino Acid Sequence (SEQ ID NO: 26)
DVVMTQTPLSSPVTLGQPASISCRSSQSLVHSDGNTYLSWLQQRPGQPPRLLIYKISNRFSGVPDRFSGSGAAT
DFTLKISRVEAEDVGVYYCMQATQLYSFGQGTKLEIKR Variable Light Chain Nucleotide Sequence (SEQ ID NO: 35)
GATGTTGTGATGACCCAGACTCCACTCTCCTCACCTGTCACCCTTGGACAGCCGGCCTCCATCTCCTGCAGGTC
TAGTCAAAGCCTCGTACACAGTGATGGAAACACCTACTTGAGTTGGCTTCAGCAGAGGCCAGGCCAGCCTCCAA
GACTCCTAATTTATAAGATTTCTAACCGGTTCTCTGGGGTCCCAGACAGATTCAGTGGCAGTGGGGCAGCGACA
GATTTCACACTGAAAATCAGCAGGGTGGAAGCTGAGGATGTCGGGGTTTATTACTGCATGCAAGCTACACAATT
GTACTCTTTTGGCCAGGGGACCAAGCTGGAGATCAAACGG Variable Heavy Chain Amino Acid Sequence (SEQ ID NO: 115)
EVQLVESGGGLVQPGGSLRLSCAASGFTVSNNYMSWVRQAPGKGLEWVSVIYTGGTTTYADSVKGRFTISRHN
SKNTLYLQMNSLRAEDTAVYYCARDWNYDAFDIWGQGTMVTVSS Variable Heavy Chain Nucleotide Sequence (SEQ ID NO: 116)
GAGGTGCAGCTGGTGGAGTCTGGAGGAGGCTTGGTCCAGCCTGGGGGGTCCCTGAGACTCTCCTGTGCAGCCTC
TGGGTTCACCGTCAGTAACAACTACATGAGCTGGGTCCGCCAGGCTCCAGGGAAGGGACTGGAGTGGGTCTCAG
TTATTTATACCGGTGGTACCACAACCTACGCAGACTCCGTGAAGGGCCGATTCACCATCTCCAGACACAATTCC
AAGAATACGCTGTATCTTCAAATGAACAGCCTGAGAGCTGAGGACACGGCCGTGTATTACTGTGCGAGAGACTG
GAACTACGATGCTTTTGATATCTGGGGCCAAGGGACAATGGTCACCGTCTCTTCA 1c144

Variable Light Chain Amino Acid Sequence (SEQ ID NO: 16)
DIQMTQSPSSLSASVGDRVTITCQASQDIRKYLNWYQQKPGKAPKLLIYDASNLETGVPSRFSGSGSGTDFSFT
ISSLQPEDLATYYCQHYANLPPLFTFGPGTKVDIKR Variable Light Chain Nucleotide Sequence (SEQ ID NO: 17)
GACATCCAGATGACCCAGTCTCCATCCTCCCTGTCTGCATCTGTGGGAGACAGAGTCACCATCACTTGCCAGGC
GAGTCAGGACATTAGGAAATATTTAAATTGGTATCAACAGAAACCAGGGAAAGCCCCTAAACTCCTGATCTACG
ATGCATCCAATTTGGAAACAGGTGTCCCATCAAGGTTCAGTGGAAGTGGATCTGGGACAGATTTTTCTTTCACC
ATCAGCAGCCTGCAGCCTGAAGATCTTGCAACATATTACTGTCAACATTATGCTAATCTCCCTCCCTTATTCAC
TTTCGGCCCTGGGACCAAAGTGGATATCAAACGG Variable Heavy Chain Amino Acid Sequence (SEQ ID NO: 18)
ELQLVESGGGLVQPGGSLRLSCAASGFNFRSYEMNWVRQAPGKGLEWVSYISSSSTTIYYAGSVKGRFTISRDN
AKHSLYLQMNSLRAEDTAVYYCARDRGALDYWGQGTLVTVSS Variable Heavy Chain Nucleotide Sequence (SEQ ID NO: 19)
GAGTTGCAGTTGGTGGAGTCTGGGGGAGGCTTGGTACAGCCTGGAGGGTCCCTGAGACTCTCCTGTGCAGCCTC
TGGATTCAACTTCAGGAGTTATGAAATGAACTGGGTCCGCCAGGCTCCAGGGAAGGGGCTGGAGTGGGTTTCCT
ATATTAGTAGTAGTAGTACTACCATATACTACGCAGGCTCTGTGAAGGGCCGATTCACCATCTCCAGAGACAAC
GCCAAGCACTCACTGTATCTGCAAATGAACAGCCTGAGAGCCGAGGACACGGCTGTTTATTACTGTGCGAGAGA
TAGGGGCGCCCTTGACTACTGGGGCCAGGGAACCTTGGTCACCGTCTCCTCA 6d11-3

Variable Light Chain Amino Acid Sequence (SEQ ID NO: 20)
DVVMTQSPLSLPVTLGQPASISCRSSRSLVYSDGNTHLIWFQQRPGQSPRRLIYRVSNRVSGVPDRFSGSGSGT
DFTLKISRVEAEDVGVYYCLQGAHWPYTFGQGTKLEIKR Variable Light Chain Nucleotide Sequence (SEQ ID NO: 21)
GATGTTGTGATGACTCAGTCTCCACTCTCCCTGCCCGTCACCCTTGGACAGCCGGCCTCCATCTCCTGCAGGTC
TAGTCGAAGCCTCGTATACAGTGATGGAAACACCCACTTGATTTGGTTTCAGCAGAGGCCTGGCCAATCTCCAA
GGCGCCTAATTTATAGGGTTTCTAACCGGGTCTCTGGGGTCCCAGACAGATTCAGCGGCAGTGGGTCAGGCACT
GATTTCACACTGAAAATCAGCAGGGTGGAGGCTGAGGATGTTGGGGTTTATTACTGCTTGCAAGGTGCACACTG
GCCATACACTTTTGGCCAGGGGACCAAGCTGGAGATCAAACGG TABLE 5-continued Table of heavy chain CDRs identified in accordance with the
definitions of Kabat, Sequences of Proteins of Immunological Interest
(National Institutes of Health, Bethesda, Md. (1987 and 1991).

| Antibody | CDR1 | CDR2 | CDR3 |
|---|---|---|---|

Variable Heavy Chain Amino Acid Sequence (SEQ ID NO: 22)
QVHLVESGGGVVQPGRSLRLSCAASGFKFRSYGMHWVRQAPGKGLEWVAIIWYDGSKRYYADSVKGRFTISRDN
SKNTLYLQMSSLRAEDTAVYYCARDLITGTTDYWGQGTLVTVSS Variable Heavy Chain Nucleotide Sequence (SEQ ID NO: 23)
CAGGTGCACCTGGTGGAGTCTGGGGGAGGCGTGGTCCAGCCTGGGAGGTCCCTGAGACTCTCCTGCGCAGCGTC
TGGATTCAAATTCAGAAGCTATGGCATGCACTGGGTCCGCCAGGCTCCAGGCAAGGGGCTGGAGTGGGTGGCAA
TTATATGGTATGATGGAAGTAAGAGATACTATGCAGACTCCGTGAAGGGCCGATTCACCATCTCCAGAGACAAT
TCCAAGAACACGCTTTATCTGCAAATGAGCAGCCTGAGAGCCGAGGACACGGCTGTGTATTACTGTGCGAGAGA
TCTTATAACTGGAACTACGGACTACTGGGGCCAGGGAACCCTGGTCACCGTCTCCTCA 6d11-5

Variable Light Chain Amino Acid Sequence (SEQ ID NO: 24)
DIQMTQSPSSLSASVGDRVTITCQASQDISNYLNWYQQKPGKAPKLLIYDASNLETGVPSRFSGSGSGTDFTFT
ISSLQPEDIATYYCQQYDNLPITFGQGTRLEIKR Variable Light Chain Nucleotide Sequence (SEQ ID NO: 25)
GACATCCAGATGACCCAGTCTCCATCCTCCCTGTCTGCATCTGTAGGAGACAGAGTCACCATCACTTGCCAGGC
GAGTCAGGACATTAGCAACTATTTAAATTGGTATCAGCAGAAACCAGGGAAAGCCCCTAAGCTCCTGATCTACG
ATGCATCCAATTTGGAAACAGGGGTCCCATCAAGGTTCAGTGGAAGTGGATCTGGGACAGATTTTACTTTCACC
ATCAGCAGCCTGCAGCCTGAAGATATTGCAACATATTACTGTCAACAGTATGATAATCTCCCGATCACCTTCGG
CCAAGGGACACGACTGGAGATTAAACGG Variable Heavy Chain Amino Acid Sequence (SEQ ID NO: 22) same as above
Variable Heavy Chain Nucleotide Sequence (SEQ ID NO: 23) same as above 6d59.id.1b18.1

Variable Light Chain Amino Acid Sequence (SEQ ID NO: 27)
DIVLTQSPASLAVSLGQRATISCKASQSVDYDGDNYIHWYQQKPGQPPKLLIYAASNLESGIPARFTGSGSGTD
FTLNIHPVEEEDAATYYCQQSDEDPWTFGGGTKLEIKR Variable Light Chain Nucleotide Sequence (SEQ ID NO: 28)
GACATTGTGCTGACCCAATCTCCAGCTTCTTTGGCTGTGTCTCTAGGGCAGAGGGCCACCATCTCCTGCAAGGC
CAGCCAAAGTGTTGATTATGATGGTGATAATTATATACACTGGTACCAACAGAAACCAGGACAGCCACCCAAAC
TCCTCATCTATGCTGCATCCAATCTAGAATCTGGGATCCCCGCCAGGTTTACTGGCAGTGGGTCTGGGACAGAC
TTCACCCTCAACATCCATCCTGTGGAGGAGGAGGATGCTGCAACCTATTACTGTCAGCAAAGTGATGAGGATCC
GTGGACGTTCGGTGGAGGCACCAAGCTGGAAATCAAACGG Variable Heavy Chain Amino Acid Sequence (SEQ ID NO: 29)
DVLLQESGPGLVKPSQSLSLTCSVTGYSITSGHYWIWIRQFPGNKLEWMGYITYDGSNNYNPSLKKRISITRDT
SENQFFLKLNPVTTEDTATYYCARDVADSYGNGYDAMDYWGQGTSVTVSS Variable Heavy Chain Nucleotide Sequence (SEQ ID NO: 30)
GATGTACTACTTCAGGAGTCAGGACCTGGCCTCGTGAAACCTTCTCAGTCTCTGTCTCTCACCTGCTCTGTCAC
TGGCTACTCCATCACCAGTGGTCATTACTGGATCTGGATCCGCCAGTTTCCAGGAAACAAACTGGAATGGATGG
GCTACATAACCTACGACGGTAGCAATAATTACAACCCATCTCTCAAAAAACGAATCTCCATCACTCGTGACACA
TCTGAGAACCAGTTTTTTCCTGAAGTTGAATCCTGTGACTACTGAAGACACAGCCACATATTACTGTGCAAGAGA
TGTGGCCGATTCCTACGGTAATGGTTACGATGCTATGGACTATTGGGGTCAAGGAACCTCAGTCACCGTCTCCT
CA 6d59.id.1b54.1

Variable Light Chain Amino Acid Sequence (SEQ ID NO: 31)
DILLTQSPGSLAVSLGQRATISCKASQSADYGGDSYMSWYQQKPGQPPKLLIYAASNLESGTPARFSGSGSGTD
FTLNIHPVEEEDAATYYCQQGNEDPWTFGGGTKLEIKR Variable Light Chain Nucleotide Sequence (SEQ ID NO: 32)
GACATTCTACTGACCCAATCTCCAGGTTCTTTGGCTGTGTCTCTAGGGCAGAGGGCCACCATCTCCTGCAAGGC
CAGCCAAAGTGCTGATTATGGTGGTGATAGTTATATGAGCTGGTACCAACAGAAACCAGGACAGCCACCCAAAC
TCCTCATCTATGCTGCATCCAATTTAGAATCTGGGACCCCAGCCAGGTTTAGTGGCAGTGGGTCTGGGACAGAC
TTCACCCTCAACATCCATCCTGTGGAGGAGGAGGATGCTGCAACCTATTACTGTCAGCAAGGTAATGAGGATCC
GTGGACGTTCGGTGGAGGCACCAAGCTGGAAATCAAACGG Variable Heavy Chain Amino Acid Sequence (SEQ ID NO: 33)
DVQLQESGPGLVKPSQSLSLTCSVTGYSITSSYYWNWIRQFPGNKLEWMGSIMYDGNNNYNPSLKNRISITRDT
SKNQFFLKLNSVTTEDTATYYCARNMADYFGNTYDALDYWGQGTSVTVSS Variable Heavy Chain Nucleotide Sequence (SEQ ID NO: 34)
GATGTACAGCTTCAGGAGTCAGGACCTGGCCTCGTGAAACCTTCTCAGTCTCTGTCTCTCACCTGCTCTGTCAC
TGGCTACTCCATCACCAGTAGTTATTACTGGAACTGGATCCGGCAGTTTCCAGGAAACAAACTGGAATGGATGG
GCTCCATAATGTACGACGGTAACAATAACTACAACCCATCTCTCAAAAATCGAATCTCCATCACTCGTGACACA

TABLE 5-continued

Table of heavy chain CDRs identified in accordance with the
definitions of Kabat, Sequences of Proteins of Immunological Interest
(National Institutes of Health, Bethesda, Md. (1987 and 1991).

| Antibody | CDR1 | CDR2 | CDR3 |
|---|---|---|---|

```
TCTAAGAACCAGTTTTTCCTGAAGTTGAATTCTGTGACTACTGAGGACACAGCTACATATTACTGTGCAAGAAA
TATGGCCGATTACTTCGGTAATACCTACGATGCTTTGGACTATTGGGGTCAAGGAACCTCAGTCACCGTCTCCT
CA
```

6d59.id.1b61.1

Variable Light Chain Amino Acid Sequence (SEQ ID NO: 31) same as above
Variable Light Chain Nucleotide Sequence (SEQ ID NO: 32) same as above Variable Heavy Chain Amino Acid Sequence (SEQ ID NO: 36)
DVQLQESGPGLVKPSQSLSLTCSVTGYSITSSYYWNWIRQFPGNKLEWMGYIMYDGNNNYNPSLKNRISITRDT
SKNQFFLKLNSVTTEDTATYYCARNMADYFGNTYDALDYWGQGTSVTVSS Variable Heavy Chain Nucleotide Sequence (SEQ ID NO: 37)
```
GATGTCCAGCTTCAGGAGTCAGGACCTGGCCTCGTGAAACCTTCTCAGTCTCTGTCTCTCACCTGCTCTGTCAC
TGGCTACTCCATCACCAGTAGTTATTACTGGAACTGGATCCGGCAGTTTCCAGGAAACAAACTGGAATGGATGG
GCTACATAATGTACGACGGTAACAATAACTACAACCCATCTCTCAAAAATCGAATCTCCATCACTCGTGACACA
TCTAAGAACCAGTTTTTCCTGAAGTTGAATTCTGTGACTACTGAGGACACAGCTACATATTACTGTGCAAGAAA
TATGGCCGATTACTTCGGTAATACCTACGATGCTTTGGACTATTGGGGTCAAGGAACCTCAGTCACCGTCTCCT
CA
```

6d59.id.1b67.1
Variable Light Chain Amino Acid Sequence (SEQ ID NO: 38)
DIMLTQSPASLAVSLGQRATISCKASQSVDYDGNGYLNWYQQKPGQPPKLLIYAASNLESGIPARFSGSGSGTD
FTLNIHPVEEEDVATYYCQQSSEDPFTIGSGTKLEIKR Variable Light Chain Nucleotide Sequence (SEQ ID NO: 39)
```
GACATTATGCTGACCCAATCTCCAGCTTCTTTGGCTGTGTCTCTAGGGCAGAGGGCCACCATCTCCTGCAAGGC
CAGCCAAAGTGTTGATTATGATGGTAATGGGTATTTGAACTGGTACCAACAGAAACCAGGACAGCCACCCAAAC
TCCTCATCTATGCTGCATCCAATCTAGAATCTGGGATCCCAGCCAGGTTTAGTGGCAGTGGGTCTGGGACAGAC
TTCACCCTCAACATCCATCCTGTGGAGGAGGAGGATGTTGCAACCTATTACTGTCAGCAAAGTAGTGAGGATCC
ATTCACGTTCGGCTCGGGGACAAAGTTGGAAATAAAACGG
```

Variable Heavy Chain Amino Acid Sequence (SEQ ID NO: 40)
QVTLKESGPGILKPSQTLSLTCSFSGFSLSTSGMGVGWIRQPSGKGLEWLAHIWWDDDKFYKPSLKNRLTISKD
TSRNQVFLKITSVDTADAATYFCVRRSAYEAFTLDYWGQGTSVTVSS Variable Heavy Chain Nucleotide Sequence (SEQ ID NO: 41)
```
CAAGTTACTCTAAAAGAGTCTGGCCCTGGGATATTGAAGCCCTCACAGACCCTCAGTCTGACTTGTTCTTTCTC
TGGGTTTTCACTGAGCACTTCTGGTATGGGTGTTGGCTGGATTCGTCAGCCTTCAGGGAAGGGTCTGGAGTGGC
TGGCACACATTTGGTGGGATGATGATAAGTTCTATAAGCCATCCCTGAAGAACCGGCTCACAATCTCCAAGGAT
ACCTCCAGAAATCAGGTATTCCTCAAGATCACCAGTGTGGACACTGCAGATGCTGCCACCTACTTCTGTGTTCG
AAGAAGTGCCTACGAGGCCTTTACTCTGGACTACTGGGGTCAAGGCACCTCAGTCACCGTCTCCTCA
```

6d59.id.1b71.1

Variable Light Chain Amino Acid Sequence (SEQ ID NO: 42)
DIVLTQSPASLAVSLGQRATISCKASQSVDYDGNGYMNWYQQKPGQPPKLLIYAASNLESGIPARFSGSGSGTD
FTLNIHPVEEEDAATYYCQQSNEDPYTFGGGTKLEIKR Variable Light Chain Nucleotide Sequence (SEQ ID NO: 43)
```
GACATTGTGCTGACCCAATCTCCAGCTTCTTTGGCTGTGTCTCTAGGGCAGAGGGCCACCATCTCCTGCAAGGC
CAGCCAAAGTGTTGATTATGATGGTAATGGTTATATGAACTGGTACCAACAGAAACCAGGACAGCCACCCAAAC
TCCTCATCTATGCTGCATCCAATCTAGAATCTGGGATCCCAGCCAGGTTTAGTGGCAGTGGGTCTGGGACAGAC
TTCACTCTCAACATCCATCCTGTGGAGGAGGAGGATGCTGCAACCTATTACTGTCAGCAAAGTAATGAGGATCC
GTACACGTTCGGAGGGGGGACCAAGCTGGAAATAAAACGG
```

Variable Heavy Chain Amino Acid Sequence (SEQ ID NO: 44)
EVQLQQSGSELASPGTSVKLSCKASGYTFTSYWVQWIKQRPGQGLEWIGAIYPGDGDLRSTQKFKGKATLTAD
KSSDTAYMQLSSLASEDSAVYYCARLDDFDLDYWGQGTTLIVSS Variable Heavy Chain Nucleotide Sequence (SEQ ID NO: 45)
```
GAGGTTCAGCTCCAGCAGTCTGGGTCTGAGCTGGCAAGCCCTGGGACTTCAGTGAAGTTGTCCTGTAAGGCTTC
TGGCTACACCTTTACTAGCTACTGGGTGCAGTGGATAAAACAGAGGCCTGGACAGGGTCTGGAATGGATTGGGG
CTATTTATCCTGGAGATGGTGATCTTAGGTCCACTCAGAAGTTCAAGGGCAAGGCCACATTGACTGCAGATAAA
TCCTCCGACACAGCCTACATGCAACTCAGCAGCTTGGCATCTGAGGACTCTGCGGTCTATTACTGTGCAAGATT
GGATGATTTCGACCTTGACTACTGGGGCCAAGGCACCACTCTCATAGTCTCCTCA
```

6d59.id.1b73.1

Variable Light Chain Amino Acid Sequence (SEQ ID NO: 42) same as above
Variable Light Chain Nucleotide Sequence (SEQ ID NO: 43) same as above Variable Heavy Chain Amino Acid Sequence (SEQ ID NO: 46)

TABLE 5-continued

Table of heavy chain CDRs identified in accordance with the
definitions of Kabat, Sequences of Proteins of Immunological Interest
(National Institutes of Health, Bethesda, Md. (1987 and 1991).

| Antibody | CDR1 | CDR2 | CDR3 |
|---|---|---|---|

QVQLQQSGPEVVKPGASVKMSCKASGYTFTDCVISWIKQRTGQGLEWIGEIHPGSGNTYNNEKFKGKATLTADK
SSNTAYIQLSSLTSEDSAVYFCARVGDWYDDAMDYWGQGTSVTVSS

Variable Heavy Chain Nucleotide Sequence (SEQ ID NO: 47)
CAGGTTCAGCTGCAGCAGTCTGGACCTGAGGTGGTGAAGCCTGGGGCTTCAGTGAAGATGTCCTGCAAGGCTTC
TGGATACACATTCACTGACTGTGTTATAAGTTGGATTAAGCAGAGAACTGGACAGGGCCTTGAGTGGATTGGAG
AGATTCATCCTGGAAGTGGTAACACTTACAACAATGAGAAGTTCAAGGGCAAGGCCACACTGACTGCAGACAAA
TCCTCCAACACAGCCTACATTCAACTCAGCAGCCTGACATCTGAGGACTCTGCGGTCTATTTCTGTGCAAGAGT
TGGGGATTGGTACGACGATGCTATGGACTACTGGGGTCAGGGAACCTCAGTCACCGTCTCCTCA 6d59.id.1b76.1

Variable Light Chain Amino Acid Sequence (SEQ ID NO: 42) same as above
Variable Light Chain Nucleotide Sequence (SEQ ID NO: 43) same as above Variable Heavy Chain Amino Acid Sequence (SEQ ID NO: 48)
DVKLVDSGGGLVKPGGSLKLSCAASGFTFSNYGMSWVRQTPEKRLEWVATISSGGYYTYYPDSVKGRFTISRDN
AKNTLYLQMGSLKSEDTAMYYCSRDREGFGNYLGAMDYWGQGTSVTVSS Variable Heavy Chain Nucleotide Sequence (SEQ ID NO: 49)
GACGTGAAGTTGGTGGACTCTGGGGGAGGCTTAGTGAAGCCTGGAGGGTCCCTAAAGCTCTCCTGTGCAGCCTC
TGGATTCACTTTTAGTAACTATGGCATGTCTTGGGTTCGTCAGACTCCGGAGAAGAGGCTGGAGTGGGTCGCAA
CCATTAGTAGTGGTGGTTATTACACCTACTATCCAGACAGTGTGAAGGGCCGATTCACCATCTCCAGAGACAAT
GCCAAGAACACCCTGTACCTGCAAATGGGCAGTCTGAAGTCTGAGGACACAGCCATGTATTACTGTTCAAGAGA
TAGGGAGGGCTTTGGTAACTATTTAGGGGCTATGGACTACTGGGGTCAAGGAACCTCAGTCACCGTCTCCTCA

Example 2. Human T Cell and Cynomolgus T Cell Binding Data

A set of experiments was performed to demonstrate the ability of the anti-CD3ε antibodies to bind human and cynomolgus (Cyno) T cells. In these experiments, human or cynomolgus T cells were incubated with an anti-CD3ε antibody and binding was assessed by flow cytometry.

Briefly, donor T cells from either human or cynomolgus donors were resuspended in FACS buffer containing 0.1% sodium azide and aliquoted in 100 μL volumes. For incubation, 100 μL aliquots of donor T cells were mixed with 50 μL of antibodies diluted in FACS buffer containing 0.1% sodium azide. The cells were then washed twice with FACS buffer containing sodium azide. The bound antibody was detected by incubating cells for 60 minutes with a 1:200 dilution of SAV-RPE (Invitrogen Cat No. SA10044, Lot. 1542820A) or 1:100 dilution of goat-anti-Mouse Fcγ-RPE (Jackson Cat. No. 115-116-071, Lot. 108668, diluted in 0.2% goat serum). The cells were washed, fixed, and analyzed with an Accuri Flow Cytometer.

Figure 2:
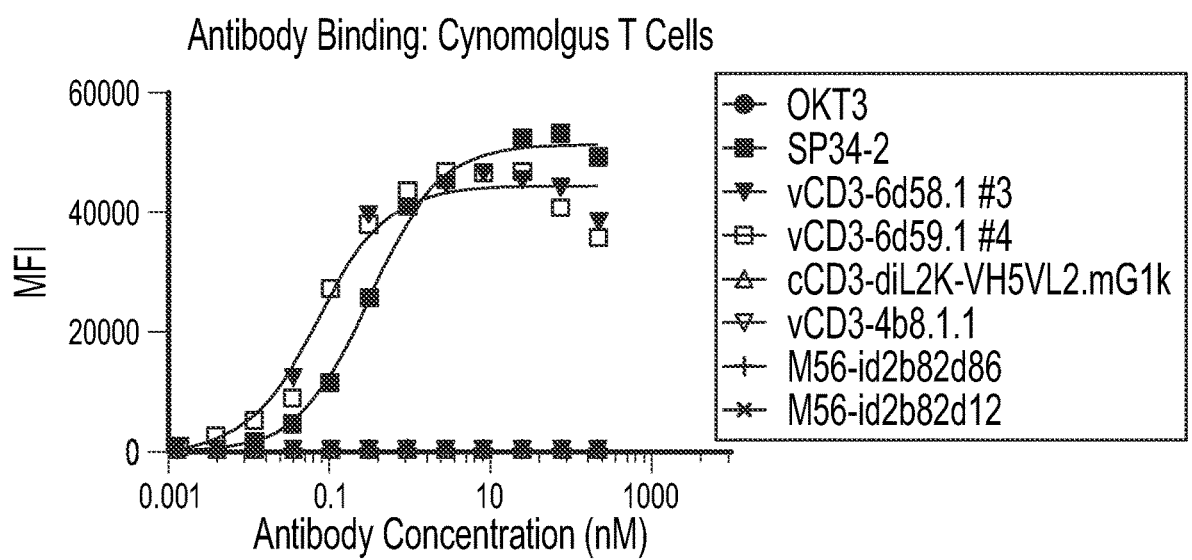
FIG. 2 is a graph showing the binding of different antibodies to cynomolgus T cells.

FIG. 1 shows that the anti-CD3ε antibodies, 6d58, 6d59, and 4b8, demonstrated concentration-dependent binding to human T cells with single digit pM EC50 values. Treatment with OKT3, SP34-2, and diL2K antibodies were used as positive controls for T cell binding. FIG. 2 demonstrates that the anti-CD3ε antibodies, 6d58 and 6d59, also bound to cynomolgus T cells. Treatment with OKT3, SP34-2, and diL2K antibodies were used as controls for T cell binding with only SP34-2 binding to cynomolgus T cells, as expected.

Example 3. T Cell and PBMC Proliferation Assays

This example demonstrates the ability of the anti-CD3ε antibodies to stimulate primary T cell proliferation. In these experiments, T-cells or PBMCs were incubated for 4 days in the presence of bound or soluble anti-CD3ε antibodies and assessed for proliferation.

Briefly, a 96-well flat-bottom plate was treated with anti-CD3ε antibodies and isotype controls over a range of 9 doses starting at 20 μg/mL and decreasing by a 1:4 dilution for each increment. Next, 50,000 T cells (from donor #W3137 13 034182) prepared in complete media supplemented with 40 U/mL rhIL-2 or 100,000 PBMCs (from donor #W3137 13 032586) prepared in complete media with no rhIL-2 were added per well. After four days, a CellTiter-Glo Assay (Promega Cat. No. G7573) was used to assess the number of viable cells.

Figure 3:
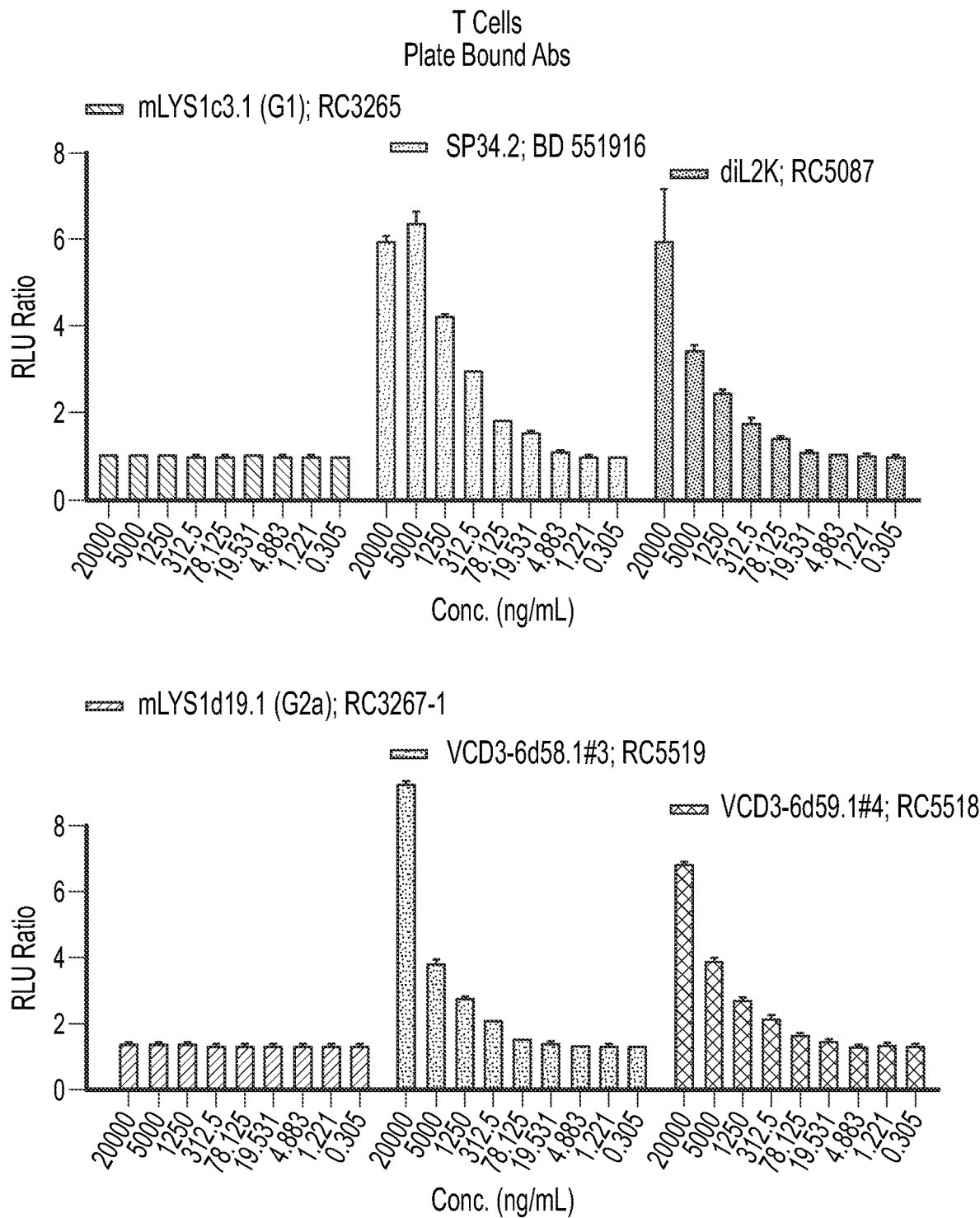
FIG. 3 is a graph the response of human T cells following treatment with various concentrations of different plate-bound antibodies in a 4-day proliferation assay.
Figure 4:
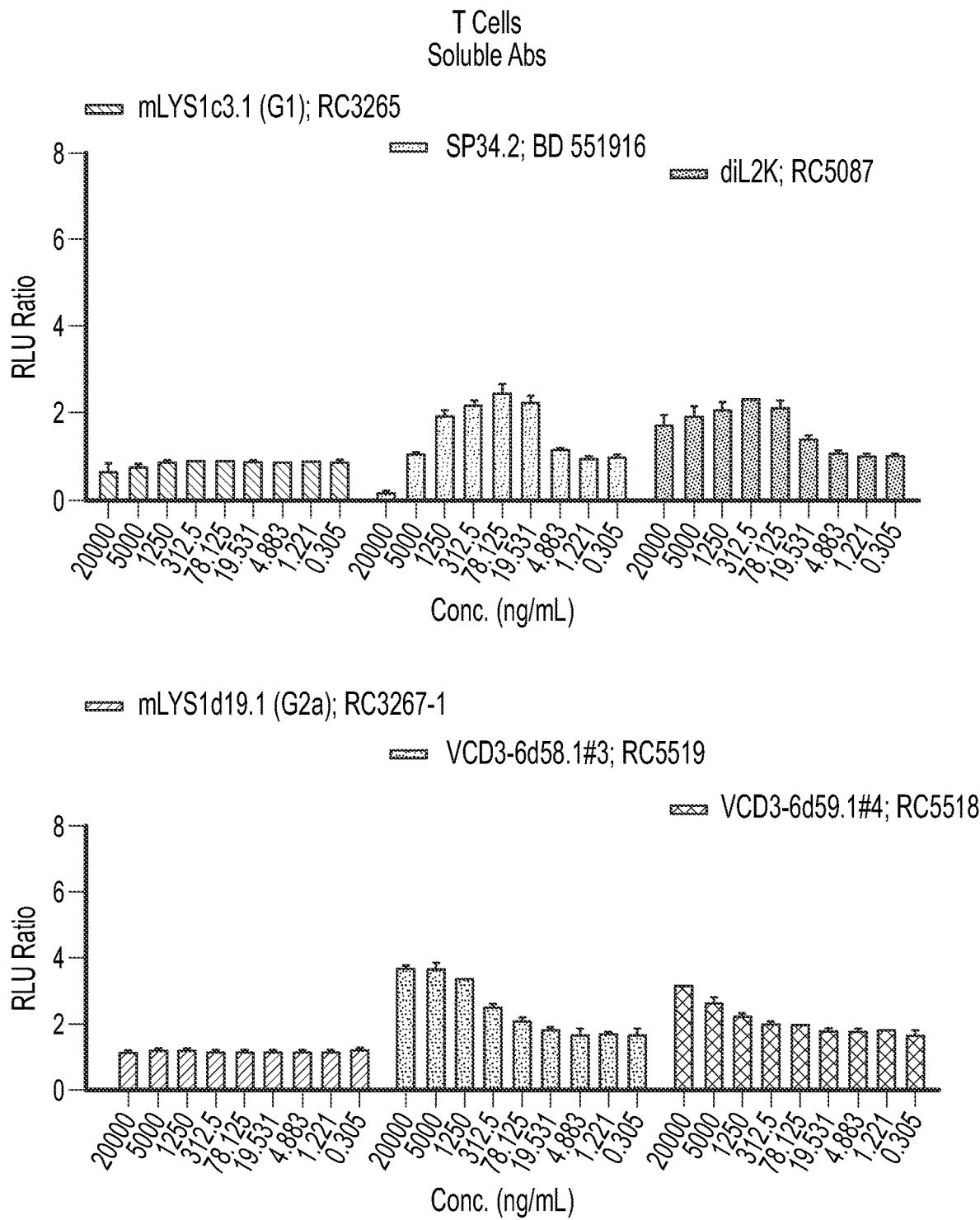
FIG. 4 is a graph depicting the response of human T cells following treatment with various concentrations of different soluble antibodies in a 4-day proliferation assay.
Figure 5:
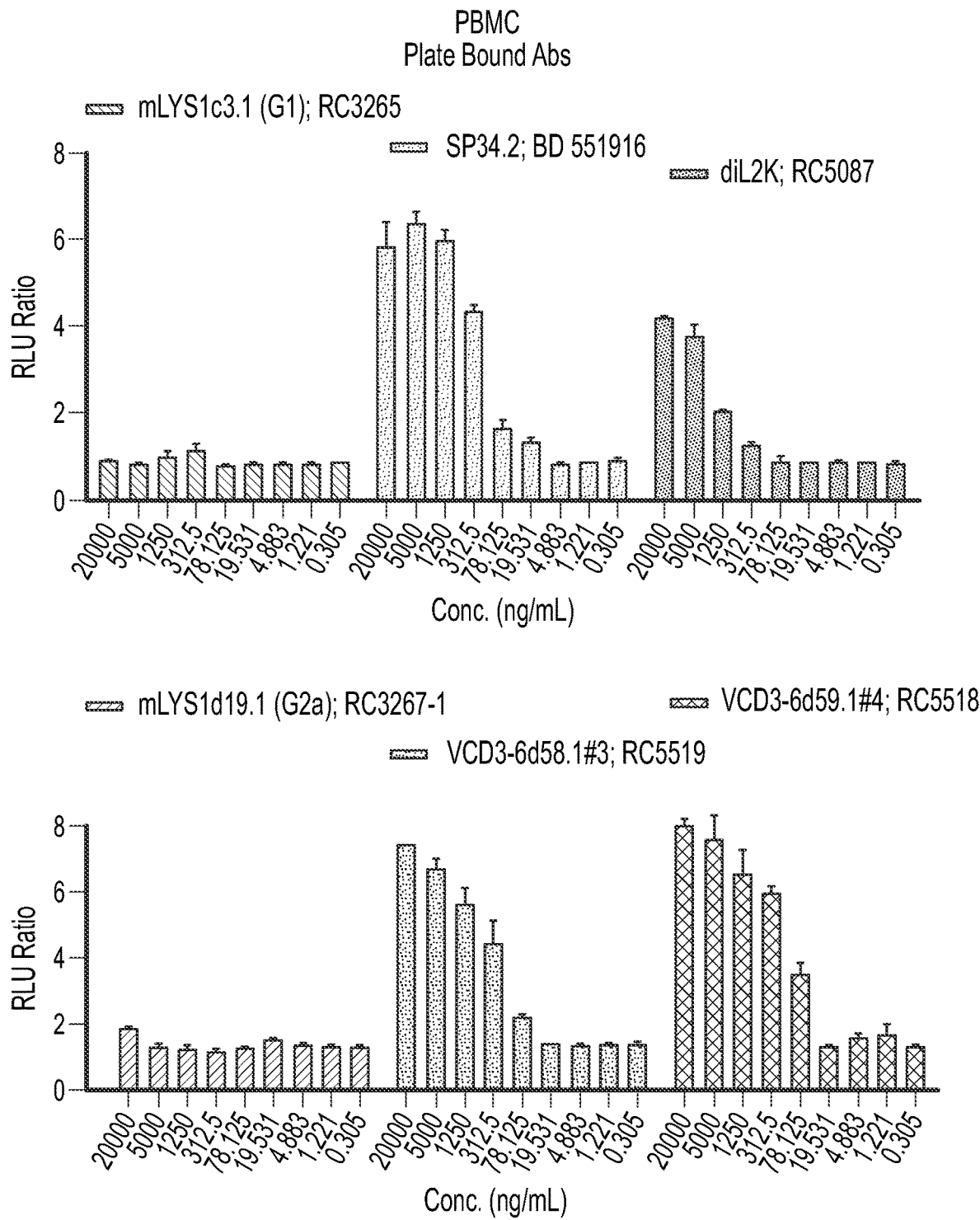
FIG. 5 is a graph the response of PBMC cells following treatment with various concentrations of different plate-bound antibodies in a 4-day proliferation assay.
Figure 6:
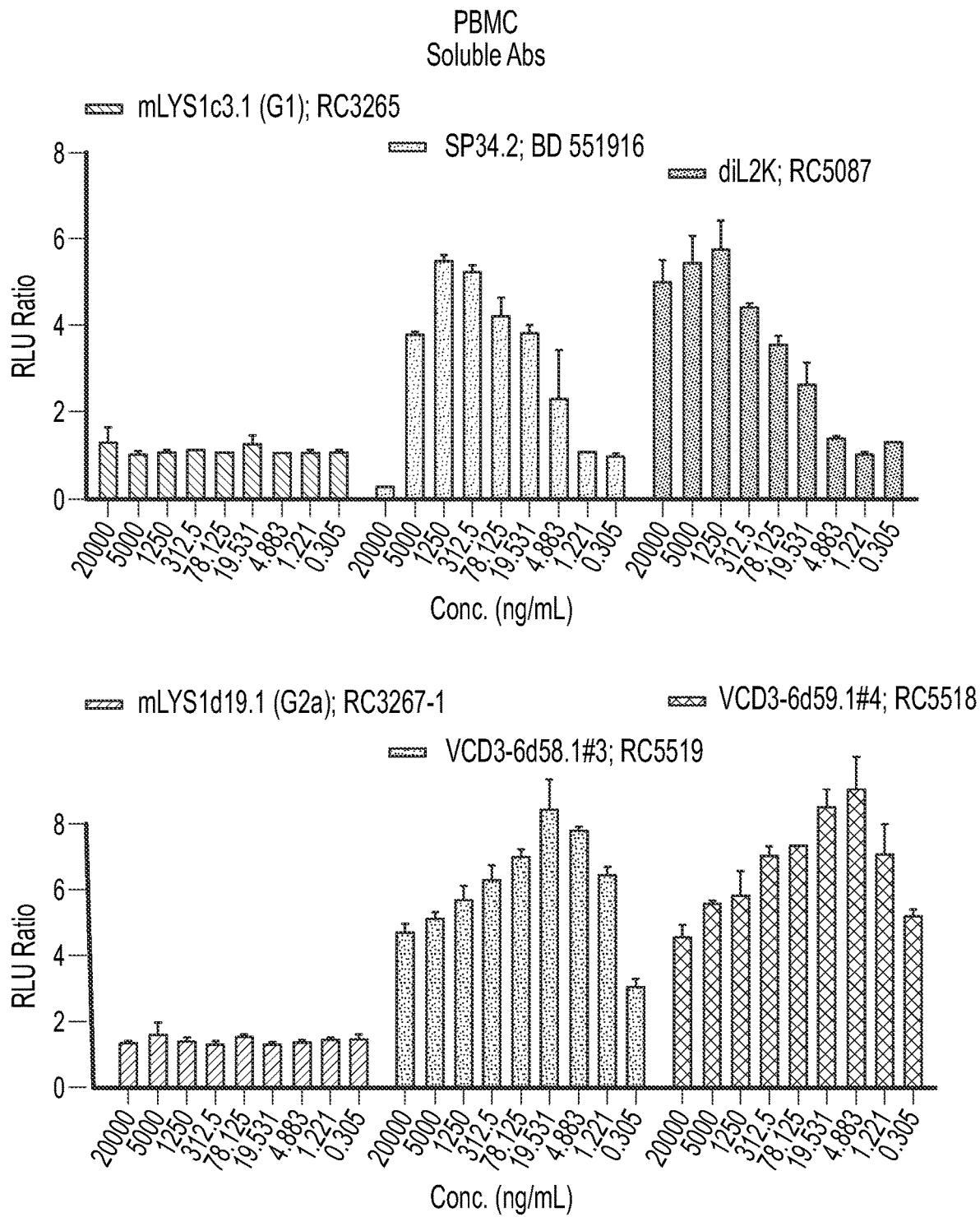
FIG. 6 is a graph depicting the response of PBMC cells following treatment with various concentrations of different soluble antibodies in a 4-day proliferation assay.

FIG. 3 and FIG. 5 show that the plate-bound anti-CD3ε antibodies, 6d58 and 6d59, induced proliferation in T cells and PMBC, respectively. Treatment with plate-bound anti-CD3ε antibodies, SP34-2 and diL2K, also induced proliferation, while plate-bound mLYS1d19.1 and mLYSIc3.1 failed to induce proliferation in both T cell and PBMCs. FIG. 4 and FIG. 6 show that soluble anti-CD3ε antibodies, 6d58 and 6d59, induced modest proliferation, as did soluble positive control anti-CD3ε antibodies, SP34-2 and diL2K. Soluble mLYS1d19.1 and mLYSIc3.1 anti-CD3ε antibodies failed to induce proliferation.

Figure 7:
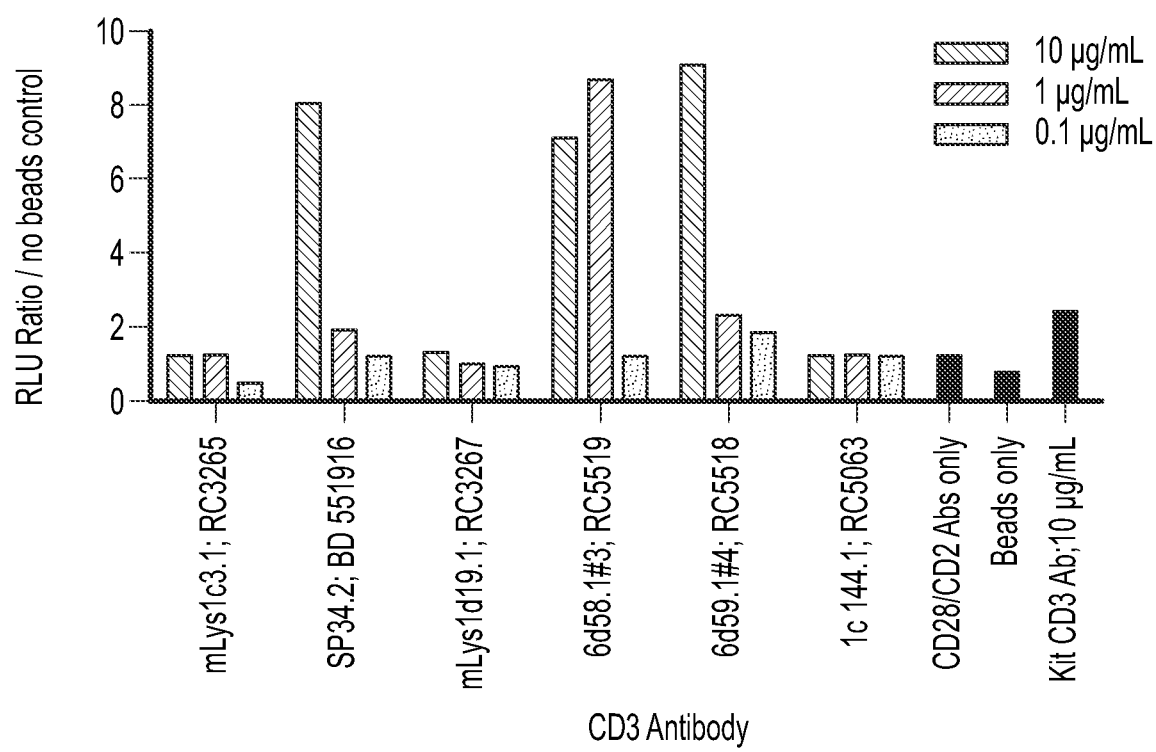
FIG. 7 is a graph depicting the response of cynomolgus PBMCs following treatment with different bead-bound antibodies in a 6-day proliferation assay.

Another set of experiments was performed to assess cynomolgus PBMC proliferation following treatment with the anti-CD3ε antibodies. In these experiments, PMBCs were cultured with beads coated with anti-CD3ε, anti-CD28, and anti-CD2. Briefly, 250,000 PBMCs (Donor CYN140007) were added per well to a 96-well flat-bottom plate. Next, beads coated with biotin-anti-CD3ε, biotin-anti-CD28, or biotin-anti-CD2 antibody were added to the well at a bead-to-cell ratio of 1:2. The cells were cultured for 3 days. After 3 days, the culture was supplemented with rhIL-2 at 100 U/mL and the culture continued for 3 days. The beads were coated with anti-CD3ε antibodies at concentrations of 10, 1, and 0.1 μg/mL. For anti-CD28 and anti-CD2 antibodies, the beads were coated at 10 μg/mL. FIG. 7 shows that bead-bound anti-CD3ε antibodies, 6d58 and 6d59, induced proliferation in PBMCs isolated from cynomolgus (donor CYN140007). Treatment with SP34-2 also induced proliferation, as expected.

Example 4. T Cell Staining Using Anti-CD3ε Antibodies

Cross-reactivity of anti-CD3ε antibodies to cynomolgus CD3-epsilon was assessed by three-color phenotyping (CD3/CD4/CD8) using PBMCs from three different cynomolgus donors.

Figure 8A:
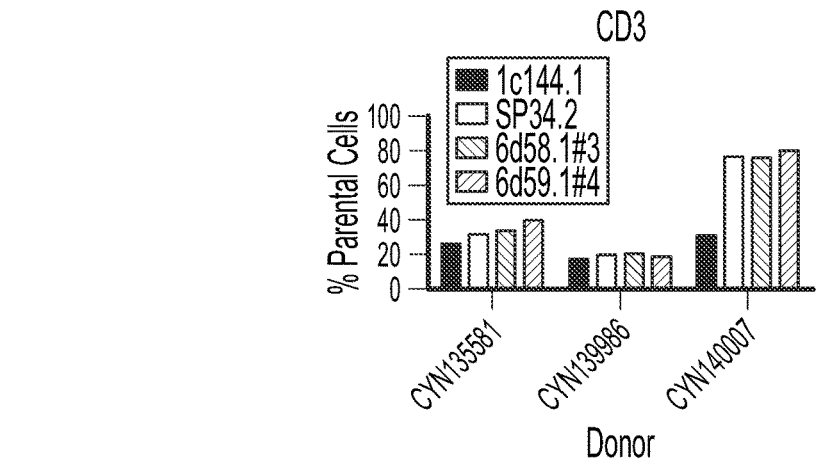
FIGS. 8A-8E are a series of graphs showing the relative staining of different cells isolated from cynomolgus PBMC from multiple donors: CD3+ cells (FIG. 8A), CD4−CD8+ cells (FIG. 8B), CD4+CD8− cells (FIG. 8C), CD4+CD8+ cells (FIG. 8D), and CD4−CD8− cells (FIG. 8E).
Figure 8B:
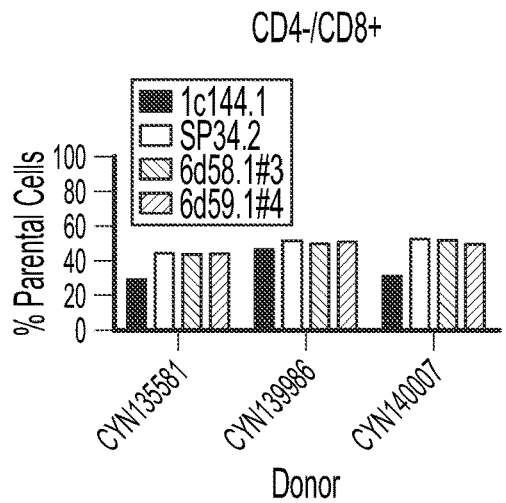
Figure 8C:
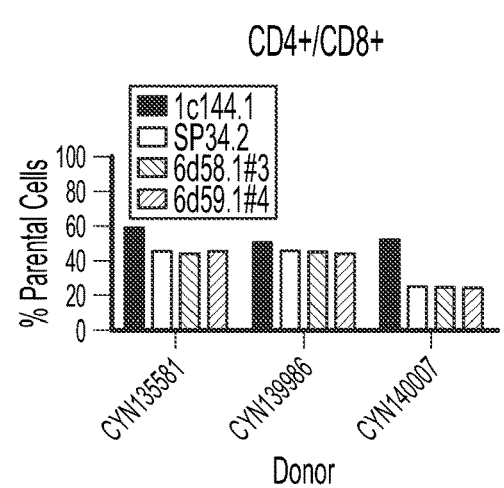
Figure 8D:
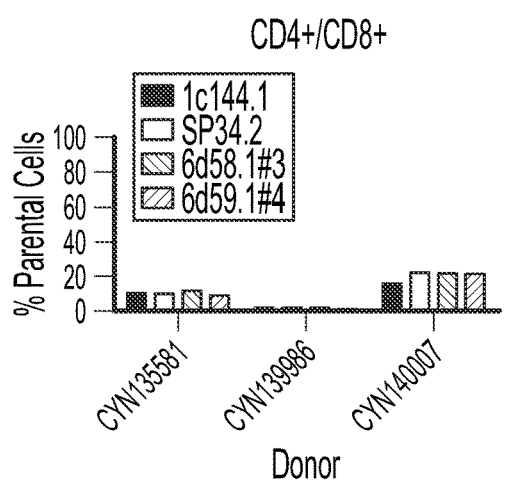
Figure 8E:
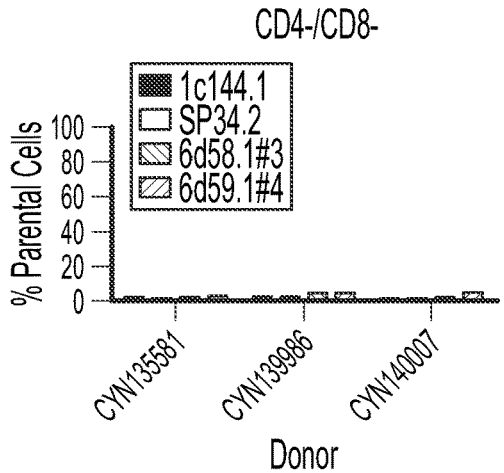

PBMCs from different cynomolgus donors were stained with anti-CD4, anti-CD8, and a panel of different anti-CD3 antibodies. For each anti-CD3 antibody, the CD3 positive cells were gated and assessed for their CD4/CD8 phenotype. FIG. 8A depicts the total CD3 positive cells in PBMCs from the three different donors. FIGS. 8B-8E show the percentage of CD3 positive cells displaying CD4−/CD8+, CD4+/CD8−, CD4+/CD8+, and CD4−/CD8− phenotypes, respectively. The anti-CD3ε antibodies 6d58 and 6d59 showed staining profiles similar to that of the positive control SP34-2 in all three cynomolgus donors demonstrating the cross-reactivity of the anti-CD3ε antibodies with cynomolgus CD3-epsilon.

Example 5. Epitope Mapping of 6d59 and 6d23

A set of experiments was performed to map the epitope recognized by the anti-CD3ε antibodies. In these experiments, the anti-CD3ε antibodies were assessed for binding to a collection of overlapping 15-mer peptides spanning amino acids 1-27 of human CD3ε protein using a Luminex bead assay. Control CD3 proteins, control peptides, or the test peptides were immobilized on Luminex beads and incubated with a panel of anti-CD3 antibodies. Binding of the anti-CD3 antibodies to the peptide/protein immobilized on the Luminex bead was detected by R-Phycoerythrin conjugated secondary antibody.

Recombinant CD3 proteins (human CD3d/e heterodimer and cynomolgus CD3-epsilon (Sinobiological)) and control peptides (#p1, #p2, and #p3) were conjugated to Luminex beads using standard EDC/Sulfo-NHS chemistry. The 15-mer test peptides were synthesized as biotinylated peptides at JPT Peptide Technologies Gmbh and were immobilized on streptavidin-conjugated Luminex beads that were made using standard EDC/Sulfo-NHS chemistry and streptavidin (Invitrogen Cat. No. 434301 lot 1626028A). The Luminex beads with immobilized peptides or reagents were incubated with 50 ul of a panel of anti-CD3 antibodies (1 ug/ml) for one hour at room temperature, washed two times, incubated with mixture of anti-human and anti-mouse IgG-RPE (Jackson Immunoresearch 109-116-097 and Southern Biotech 1030-09, respectively) for 30 mins at RT, washed three times, and analyzed in the Luminex instrument to assess the level of bound anti-CD3 antibodies.

FIG. 9 shows that anti-CD3ε antibodies, 6d23.1 and 6d59.1, bind different epitopes on CD3ε. Both antibodies bound to vCD3e #p1 peptide, which has a free N-terminal glutamine. VCD3-6d59.1 bound to biotinylated 15-mer peptides corresponding to CD3ε N-terminus, while VCD3-6d23.1 did not. The 15-mer peptides in the assay did not have a free N-terminal glutamine because the residue was bound to biotin through a linker. As the anti-CD3ε antibody VCD3-6d59.1 bound the N-terminal 15-mer, a series of alanine-scanning mutant versions of the biotinylated N-terminal 15-mer were used to fine-map the epitope for VCD36d59.1 antibody. Replacing the N-terminal glutamine with alanine enhanced the binding of VCD3-6d59.1 to the 15-mer peptides, while replacing CD3ε amino acids with alanine at positions 2, 3, 4, and 5 abrogated binding. Alanine substitution at position 6 resulted in half the binding as compared to the wild type sequence. Alanine substitution at positions 7 and beyond had no impact. These results strongly suggest that the epitope for VCD3-6d59.1 included amino acids 1-6.

Example 6. Anti-Idiotypic Antibodies

A set of experiments was performed to assess the ability of anti-ID 6d59 to block AGS73.15 binding to human T cells. In these experiments, binding was detected using an antibody designed to measure the Fc portion of human IgG heavy chain (Jackson Immunoresearch, gxhIgG-Fc-PE, Cat No. 109-116-098, Lot #120585). In this experiment, 96-well flat-bottom plates were coated with anti-ID 6d59 over a range of 10 doses starting at 30 μg/mL and decreasing by a 1:3 dilution for each increment at a volume of 50 μL/well. Prior to the addition of 50,000 human T cells per well, the wells were incubated with AGS73.15 (MS497) at 600 ng/mL at room temperature for 20 minutes, where AGS73.15 was added to the well in a 50 μL volume. The assay was then subjected to a primary incubation (4° C. for 2 hours in the dark), then washed twice with FACS buffer, and a secondary incubation (4° C. for 1 hour in the dark), and then washed twice with FACS buffer.

FIG. 10 demonstrates a dose-dependent inhibition of CD3ε binding on human T cells for all anti-ID 6d59 antibodies tested. FIG. 11 demonstrates that for all anti-ID 6d59 antibodies tested, the EC50 values ranged from 0.2434-0.4436 nM.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A multi-chain polypeptide comprising complementarity determining regions (CDRs) selected from the group consisting of:
   (a) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGTTDY (SEQ ID NO: 56);
   (b) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGSIDY (SEQ ID NO: 128);
   (c) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGDLDY (SEQ ID NO: 129);
   (d) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGAFDY (SEQ ID NO: 130);
   (e) a light chain variable domain comprising CDRs of amino acid sequence RSSQSLVNSDGKTHLN (SEQ ID NO: 117), KVSNRDS (SEQ ID NO: 118), and MQGTHWPLT (SEQ ID NO: 119) and comprises a heavy chain variable domain comprising CDRs of amino acid sequence SYGMH (SEQ ID NO: 54), IIWYDGSNKYYGDSVKG (SEQ ID NO: 131), and LSVNDYYVLDV (SEQ ID NO: 132);
   (f) a light chain variable domain comprising CDRs of amino acid sequence RASQSISNYLN (SEQ ID NO: 120), AASSLOS (SEQ ID NO: 121), and QQSFSTLYT (SEQ ID NO: 122) and comprises a heavy chain variable domain comprising CDRs of amino acid sequence SYSMN (SEQ ID NO: 133), YISRSSNYTYYADSVMG (SEQ ID NO: 134), and DRRGYSGYNHFDY (SEQ ID NO: 135);
   (g) a light chain variable domain comprising CDRs of amino acid sequence QASQDIRKYLN (SEQ ID NO: 123), DASNLET (SEQ ID NO: 124), and QHYANLPPLFT (SEQ ID NO: 125) and comprises a heavy chain variable domain comprising CDRs of amino acid sequence SYEMN (SEQ ID NO: 136), YISSSSTTIYYAGSVKG (SEQ ID NO: 137), and DRGALDY (SEQ ID NO: 138); and
   (h) a light chain variable domain comprising CDRs of amino acid sequence QASQDISNYLN (SEQ ID NO: 126), DASNLET (SEQ ID NO: 124), and QQYDNLPIT (SEQ ID NO: 127) and comprises a heavy chain variable domain comprising CDRs of amino acid sequence SYGMH (SEQ ID NO: 54), IIWYDGSKRYYADSVKG (SEQ ID NO: 55), and DLITGTTDY (SEQ ID NO: 56),
   wherein the light chain variable domain and the heavy chain variable domain form an antigen-binding domain that binds specifically to CD3 epsilon.

2. The multi-chain polypeptide of claim 1, wherein the multi-chain polypeptide comprises at least one of the following characteristics:
   (a) the multi-chain polypeptide is an IgG antibody, wherein the IgG is selected from the group consisting of:
      (i) IgG1;
      (ii) IgG2;
      (iii) IgG3; and
      (iv) IgG4;
   (b) the multi-chain polypeptide is an IgM, IgA, or IgE antibody: or
   (c) the multi-chain polypeptide is a Fab, F(ab')2, Fab', or Fv.

3. The multi-chain polypeptide of claim 1, wherein the multi-chain polypeptide comprises at least one of the following characteristics:
   (a) an additional light chain variable domain and an additional heavy chain variable domain;
   (b) is humanized;
   (c) at least one polypeptide of the multi-chain polypeptide is conjugated to a toxin, a radioisotope, a drug, or a small molecule via a cleavable linker; and
   (d) at least one polypeptide of the multi-chain polypeptide is conjugated to a toxin, a radioisotope, a drug, or a small molecule via a non-cleavable linker.

4. The multi-chain polypeptide of claim 1, wherein:
   (a) the light chain variable domain comprises an amino acid sequence at least 95% identical to SEQ ID NO: 1, and the heavy chain variable domain comprises an amino acid sequence at least 92% identical to SEQ ID NO: 3;
   (b) the light chain variable domain comprises an amino acid sequence at least 96% identical to SEQ ID NO: 8, and the heavy chain variable domain comprises an amino acid sequence at least 92% identical to SEQ ID NO: 10;
   (c) the light chain variable domain comprises an amino acid sequence at least 96% identical to SEQ ID NO: 12, and the heavy chain variable domain comprises an amino acid sequence at least 90% identical to SEQ ID NO: 14;
   (d) the light chain variable domain comprises an amino acid sequence at least 95% identical to SEQ ID NO: 26, and the heavy chain variable domain comprises an amino acid sequence at least 95% identical to SEQ ID NO: 115;
   (e) the light chain variable domain comprises an amino acid sequence at least 95% identical to SEQ ID NO: 1, and the heavy chain variable domain comprises an amino acid sequence at least 95% identical to SEQ ID NO: 5;
   (f) the light chain variable domain comprises an amino acid sequence at least 95% identical to SEQ ID NO: 1, and the heavy chain variable domain comprises an amino acid sequence at least 95% identical to SEQ ID NO: 6;
   (g) the light chain variable domain comprises an amino acid sequence at least 95% identical to SEQ ID NO: 1, and the heavy chain variable domain comprises an amino acid sequence at least 95% identical to SEQ ID NO: 7; or (h) the light chain variable domain comprises an amino acid sequence at least 92% identical to SEQ ID NO: 16, and the heavy chain variable domain comprises an amino acid sequence at least 90% identical to SEQ ID NO: 18.

5. The multi-chain polypeptide of claim 1, wherein:
(a) the light chain variable domain comprises an amino acid sequence of SEQ ID NO: 1, and the heavy chain variable domain comprises an amino acid sequence of SEQ ID NO: 3;
(b) the light chain variable domain comprises an amino acid sequence of SEQ ID NO: 8, and the heavy chain variable domain comprises an amino acid sequence of SEQ ID NO: 10;
(c) the light chain variable domain comprises an amino acid sequence of SEQ ID NO: 12, and the heavy chain variable domain comprises an amino acid sequence of SEQ ID NO: 14;
(d) the light chain variable domain comprises an amino acid sequence of SEQ ID NO: 26, and the heavy chain variable domain comprises an amino acid sequence of SEQ ID NO: 115;
(e) the light chain variable domain comprises an amino acid sequence of SEQ ID NO: 1, and the heavy chain variable domain comprises an amino acid sequence of SEQ ID NO: 5;
(f) the light chain variable domain comprises an amino acid sequence of SEQ ID NO: 1, and the heavy chain variable domain comprises an amino acid sequence of SEQ ID NO: 6;
(g) the light chain variable domain comprises an amino acid sequence of SEQ ID NO: 1, and the heavy chain variable domain comprises an amino acid sequence of SEQ ID NO: 7; or
(h) the light chain variable domain comprises an amino acid sequence of SEQ ID NO: 16, and the heavy chain variable domain comprises an amino acid sequence of SEQ ID NO: 18.

6. A pharmaceutical composition comprising the multi-chain polypeptide of claim 1.

7. A method of treating a subject in need thereof comprising administering to the subject the multi-chain polypeptide of claim 1.

8. A set of nucleic acids that together encode polypeptides that together make up the multi-chain polypeptide of claim 1.

9. The set of nucleic acids of claim 8, wherein the set of nucleic acids comprises a pair of expression vectors.

10. The set of nucleic acids of claim 8, wherein the set of nucleic acids are present in a single expression vector.

11. A cell that comprises the set of nucleic acids of claim 8.

12. A method of producing a multi-chain polypeptide comprising:
(a) culturing the cell of claim 11 in a liquid culture medium under conditions that allow for the production of the multi-chain polypeptide; and
(b) recovering the multi-chain polypeptide from the cell or the liquid culture medium.

13. The method of claim 12, further comprising:
(c) purifying the multi-chain polypeptide.

14. The method of claim 13, further comprising:
(d) formulating the multi-chain polypeptide into a pharmaceutical composition.

15. A single-chain polypeptide comprising:
(a) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGTTDY (SEQ ID NO: 56), wherein the light chain variable domain comprises an amino acid sequence at least 95% identical to SEQ ID NO: 1, and the heavy chain variable domain comprises an amino acid sequence at least 92% identical to SEQ ID NO: 3;
(b) a light chain variable domain comprising CDRs of amino acid sequence RSSQSLVNSDGKTHLN (SEQ ID NO: 117), KVSNRDS (SEQ ID NO: 118), and MQGTHWPLT (SEQ ID NO: 119) and comprises a heavy chain variable domain comprising CDRs of amino acid sequence SYGMH (SEQ ID NO: 54), IIWYDGSNKYYGDSVKG (SEQ ID NO: 131), and LSVNDYYVLDV (SEQ ID NO: 132), wherein the light chain variable domain comprises an amino acid sequence at least 96% identical to SEQ ID NO: 8, and the heavy chain variable domain comprises an amino acid sequence at least 92% identical to SEQ ID NO: 10;
(c) a light chain variable domain comprising CDRs of amino acid sequence RASQSISNYLN (SEQ ID NO: 120), AASSLOS (SEQ ID NO: 121), and QQSFSTLYT (SEQ ID NO: 122) and comprises a heavy chain variable domain comprising CDRs of amino acid sequence SYSMN (SEQ ID NO: 133), YISRSSNYTYYADSVMG (SEQ ID NO: 134), and DRRGYSGYNHFDY (SEQ ID NO: 135), wherein the light chain variable domain comprises an amino acid sequence at least 96% identical to SEQ ID NO: 12, and the heavy chain variable domain comprises an amino acid sequence at least 90% identical to SEQ ID NO: 14;
(d) a light chain variable domain comprising CDRs of amino acid sequence RSSQSLVNSDGKTHLN (SEQ ID NO: 117), KVSNRDS (SEQ ID NO: 118), and MQGTHWPLT (SEQ ID NO: 119) and comprises a heavy chain variable domain comprising CDRs of amino acid sequence SYGMH (SEQ ID NO: 54), IIWYDGSNKYYGDSVKG (SEQ ID NO: 131), and LSVNDYYVLDV (SEQ ID NO: 132), wherein the light chain variable domain comprises an amino acid sequence at least 95% identical to SEQ ID NO: 26, and the heavy chain variable domain comprises a sequence at least 95% identical to SEQ ID NO: 115;
(e) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGSIDY (SEQ ID NO: 128), wherein the light chain variable domain comprises an amino acid sequence at least 95% identical to SEQ ID NO: 1, and the heavy chain variable domain comprises an amino acid sequence at least 95% identical to SEQ ID NO: 5;
(f) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGDLDY (SEQ ID NO: 129), wherein the light chain variable domain comprises an amino acid sequence at least 95% identical to SEQ ID NO: 1, and the heavy chain variable domain comprises an amino acid sequence at least 95% identical to SEQ ID NO: 6;
(g) a light chain variable domain comprising CDRs of amino acid sequence RSSRSLVYSDGNTHLI (SEQ ID NO: 51), RVSNRVS (SEQ ID NO: 52), and LQGAHWPYT (SEQ ID NO: 53) and comprises a heavy chain variable domain comprising CDRs of amino acid sequence SYGMH (SEQ ID NO: 54), IIWYDGSKRYYADSVKG (SEQ ID NO: 55), and DLITGAFDY (SEQ ID NO: 130), wherein the light chain variable domain comprises an amino acid sequence at least 95% identical to SEQ ID NO: 1, and the heavy chain variable domain comprises an amino acid sequence at least 95% identical to SEQ ID NO: 7;
(h) a light chain variable domain comprising CDRs of amino acid sequence QASQDIRKYLN (SEQ ID NO: 123), DASNLET (SEQ ID NO: 124), and QHYANLP-PLFT (SEQ ID NO: 125) and comprises a heavy chain variable domain comprising CDRs of amino acid sequence SYEMN (SEQ ID NO: 136), YISSSSTTIYY-AGSVKG (SEQ ID NO: 137), and DRGALDY (SEQ ID NO: 138), wherein the light chain variable domain comprises an amino acid sequence at least 92% identical to SEQ ID NO: 16, and the heavy chain variable domain comprises an amino acid sequence at least 90% identical to SEQ ID NO: 18;
wherein the light chain variable domain and the heavy chain variable domain form an antigen-binding domain that binds specifically to CD3 epsilon.

16. The single-chain polypeptide of claim 15, wherein the single-chain polypeptide comprises at least one of the following characteristics: (a) the antigen-binding domain is a scFv; (b) the single-chain polypeptide is selected from the group consisting of a BiTE, a (scFv)2, a DART, a scDiabody, a scDiabody-CH3, scFv-CH-CL-scFv, a HSAbody, scDiabody-HSA, and a tandem-scFv; (c) the single-chain polypeptide comprises an additional light chain variable domain and an additional heavy chain variable domain; (d) the single-chain polypeptide is a chimeric antigen receptor (CAR); (e) the single-chain polypeptide is humanized; and (f) the single-chain polypeptide is conjugated to a toxin, a radioisotope, a drug, or a small molecule via a cleavable linker or is conjugated to a toxin, a radioisotope, a drug, or a small molecule via a non-cleavable linker.

17. The single-chain polypeptide of claim 15, wherein:
(a) the light chain variable domain comprises an amino acid sequence of SEQ ID NO: 1, and the heavy chain variable domain comprises an amino acid sequence of SEQ ID NO: 3;
(b) the light chain variable domain comprises an amino acid sequence of SEQ ID NO: 8, and the heavy chain variable domain comprises an amino acid sequence of SEQ ID NO: 10;
(c) the light chain variable domain comprises an amino acid sequence of SEQ ID NO: 12, and the heavy chain variable domain comprises an amino acid sequence of SEQ ID NO: 14;
(d) the light chain variable domain comprises an amino acid sequence of SEQ ID NO: 26, and the heavy chain variable domain comprises an amino acid sequence of SEQ ID NO: 115;
(e) the light chain variable domain comprises an amino acid sequence of SEQ ID NO: 1, and the heavy chain variable domain comprises an amino acid sequence of SEQ ID NO: 5;
(f) the light chain variable domain comprises an amino acid sequence of SEQ ID NO: 1, and the heavy chain variable domain comprises an amino acid sequence of SEQ ID NO: 6;
(g) the light chain variable domain comprises an amino acid sequence of SEQ ID NO: 1, and the heavy chain variable domain comprises an amino acid sequence of SEQ ID NO: 7; or
(h) the light chain variable domain comprises an amino acid sequence of SEQ ID NO: 16, and the heavy chain variable domain comprises an amino acid sequence of SEQ ID NO: 18.

18. A pharmaceutical composition including the single-chain polypeptide of claim 15.

19. A method of treating a subject in need thereof comprising administering to the subject the pharmaceutical composition of claim 18.

20. A nucleic acid that encodes the single-chain polypeptide of claim 15.

21. The nucleic acid of claim 20, wherein the nucleic acid comprises an expression vector.

22. A cell that comprises the nucleic acid of claim 20.

23. A method of producing a single-chain polypeptide comprising:
(a) culturing the cell of claim 22 in a liquid culture medium under conditions that allow for the production of the single-chain polypeptide; and
(b) recovering the single-chain polypeptide from the cell or the liquid culture medium.

24. The method of claim 23, further comprising:
(c) purifying the single-chain polypeptide.

25. The method of claim 24, further comprising:
(d) formulating the single-chain polypeptide into a pharmaceutical composition.

26. An anti-idiotypic antibody comprising:
(a) a first polypeptide comprising a light chain variable domain comprising a sequence of SEQ ID NO: 27, and a second polypeptide comprising a heavy chain variable domain comprising a sequence of SEQ ID NO: 29;
(b) a first polypeptide comprising a light chain variable domain comprising a sequence of SEQ ID NO: 38, and a second polypeptide comprising a heavy chain variable domain comprising a sequence of SEQ ID NO: 40;
(c) a first polypeptide comprising a light chain variable domain comprising a sequence of SEQ ID NO: 31, and a second polypeptide comprising a heavy chain variable domain comprising a sequence of SEQ ID NO: 33;
(d) a first polypeptide comprising a light chain variable domain comprising a sequence of SEQ ID NO: 42, and a second polypeptide comprising a heavy chain variable domain comprising a sequence of SEQ ID NO: 44;
(e) a first polypeptide comprising a light chain variable domain comprising a sequence of SEQ ID NO: 42, and a second polypeptide comprising a heavy chain variable domain comprising a sequence of SEQ ID NO: 48;
(f) a first polypeptide comprising a light chain variable domain comprising a sequence of SEQ ID NO: 31, and a second polypeptide comprising a heavy chain variable domain comprising a sequence of SEQ ID NO: 36; or
(g) a first polypeptide comprising a light chain variable domain comprising a sequence of SEQ ID NO: 42, and a second polypeptide comprising a heavy chain variable domain comprising a sequence of SEQ ID NO: 46;

wherein the light chain variable domain and the heavy chain variable domain form an antigen-binding domain that binds specifically to a CD3 epsilon antibody.

* * * *

SEQUENCE LISTING

<160> NUMBER OF SEQ ID NOS: 138

<210> SEQ ID NO 1
<211> LENGTH: 113
<212> TYPE: PRT
<213> ORGANISM: Artificial Sequence
<220> FEATURE:
<223> OTHER INFORMATION: Synthetic

<400> SEQUENCE: 1

-continued

Asp Val Val Met Thr Gln Ser Pro Leu Ser Leu Pro Val Thr Leu Gly
1               5                   10                  15

Gln Pro Ala Ser Ile Ser Cys Arg Ser Ser Arg Ser Leu Val Tyr Ser
            20                  25                  30

Asp Gly Asn Thr His Leu Ile Trp Phe Gln Gln Arg Pro Gly Gln Ser
            35                  40                  45

Pro Arg Arg Leu Ile Tyr Arg Val Ser Asn Arg Val Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Leu Gln Gly
                85                  90                  95

Ala His Trp Pro Tyr Thr Phe Gly Gln Gly Thr Lys Leu Glu Ile Lys
            100                 105                 110

Arg

<210> SEQ ID NO 2
<211> LENGTH: 339
<212> TYPE: DNA
<213> ORGANISM: Artificial Sequence
<220> FEATURE:
<223> OTHER INFORMATION: Synthetic

<400> SEQUENCE: 2
gatgttgtga tgactcagtc tccactctcc ctgcccgtca cccttggaca gccggcctcc    60
atctcctgca ggtctagtcg aagcctcgta tacagtgatg aaacacccca cttgatttgg   120
tttcagcaga ggcctggcca atctccaagg cgcctaattt atagggtttc taaccgggtc   180
tctggggtcc cagacagatt cagcggcagt gggtcaggca ctgatttcac actgaaaatc   240
agcagggtgg aggctgagga tgttggggtt tattactgct tgcaaggtgc acactggcca   300 tacactttg gccaggggac caagctggag atcaaacgg                           339

<210> SEQ ID NO 3
<211> LENGTH: 118
<212> TYPE: PRT
<213> ORGANISM: Artificial Sequence
<220> FEATURE:
<223> OTHER INFORMATION: Synthetic

<400> SEQUENCE: 3

Gln Val His Leu Val Glu Ser Gly Gly Gly Val Val Gln Pro Gly Arg
1               5                   10                  15

Ser Leu Arg Leu Ser Cys Ala Ala Ser Gly Phe Lys Phe Arg Ser Tyr
            20                  25                  30

Gly Met His Trp Val Arg Gln Ala Pro Gly Lys Gly Leu Glu Trp Val
            35                  40                  45

Ala Ile Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Ser Ser Leu Arg Ala Glu Asp Thr Ala Val Tyr Tyr Cys
                85                  90                  95

Ala Arg Asp Leu Ile Thr Gly Thr Thr Asp Tyr Trp Gly Gln Gly Thr
            100                 105                 110

Leu Val Thr Val Ser Ser
            115

<210> SEQ ID NO 4
<211> LENGTH: 354
<212> TYPE: DNA
<213> ORGANISM: Artificial Sequence
<220> FEATURE:
<223> OTHER INFORMATION: Synthetic

<400> SEQUENCE: 4

```
caggtgcacc tggtggagtc tgggggaggc gtggtccagc ctggagggtc cctgagactc      60
tcctgcgcag cgtctggatt caaattcaga agctatggca tgcactgggt ccgccaggct     120
ccaggcaagg ggctggagtg ggtggcaatt atatggtatg atggaagtaa gagatactat     180
gcagactccg tgaagggccg attcaccatc tccagagaca attccaagaa cacgctttat     240
ctgcaaatga gcagcctgag agccgaggac acggctgtgt attactgtgc gagagatctt     300
ataactggaa ctacggacta ctggggccag ggaaccctgg tcaccgtctc ctca           354
```

<210> SEQ ID NO 5
<211> LENGTH: 118
<212> TYPE: PRT
<213> ORGANISM: Artificial Sequence
<220> FEATURE:
<223> OTHER INFORMATION: Synthetic

<400> SEQUENCE: 5

```
Gln Val His Leu Val Glu Ser Gly Gly Gly Val Val Gln Pro Gly Arg
1               5                   10                  15

Ser Leu Arg Leu Ser Cys Ala Ala Ser Gly Phe Lys Phe Arg Ser Tyr
            20                  25                  30

Gly Met His Trp Val Arg Gln Ala Pro Gly Lys Gly Leu Glu Trp Val
        35                  40                  45

Ala Ile Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Ser Ser Leu Arg Ala Glu Asp Thr Ala Val Tyr Tyr Cys
                85                  90                  95

Ala Arg Asp Leu Ile Thr Gly Ser Ile Asp Tyr Trp Gly Gln Gly Thr
            100                 105                 110

Leu Val Thr Val Ser Ser
        115
```

<210> SEQ ID NO 6
<211> LENGTH: 118
<212> TYPE: PRT
<213> ORGANISM: Artificial Sequence
<220> FEATURE:
<223> OTHER INFORMATION: Synthetic

<400> SEQUENCE: 6

```
Gln Val His Leu Val Glu Ser Gly Gly Gly Val Val Gln Pro Gly Arg
1               5                   10                  15

Ser Leu Arg Leu Ser Cys Ala Ala Ser Gly Phe Lys Phe Arg Ser Tyr
            20                  25                  30

Gly Met His Trp Val Arg Gln Ala Pro Gly Lys Gly Leu Glu Trp Val
        35                  40                  45

Ala Ile Ile Trp Tyr Asp Gly Ser Lys Arg Tyr Tyr Ala Asp Ser Val
    50                  55                  60
```

```
Lys Gly Arg Phe Thr Ile Ser Arg Asp Asn Ser Lys Asn Thr Leu Tyr
 65                  70                  75                  80

Leu Gln Met Ser Ser Leu Arg Ala Glu Asp Thr Ala Val Tyr Tyr Cys
                 85                  90                  95

Ala Arg Asp Leu Ile Thr Gly Asp Leu Asp Tyr Trp Gly Gln Gly Thr
            100                 105                 110

Leu Val Thr Val Ser Ser
            115

<210> SEQ ID NO 7
<211> LENGTH: 118
<212> TYPE: PRT
<213> ORGANISM: Artificial Sequence
<220> FEATURE:
<223> OTHER INFORMATION: Synthetic

<400> SEQUENCE: 7

Gln Val His Leu Val Glu Ser Gly Gly Gly Val Val Gln Pro Gly Arg
  1               5                  10                  15

Ser Leu Arg Leu Ser Cys Ala Ala Ser Gly Phe Lys Phe Arg Ser Tyr
             20                  25                  30

Gly Met His Trp Val Arg Gln Ala Pro Gly Lys Gly Leu Glu Trp Val
         35                  40                  45

Ala Ile Ile Trp Tyr Asp Gly Ser Lys Arg Tyr Tyr Ala Asp Ser Val
 50                  55                  60

Lys Gly Arg Phe Thr Ile Ser Arg Asp Asn Ser Lys Asn Thr Leu Tyr
 65                  70                  75                  80

Leu Gln Met Ser Ser Leu Arg Ala Glu Asp Thr Ala Val Tyr Tyr Cys
                 85                  90                  95

Ala Arg Asp Leu Ile Thr Gly Ala Phe Asp Tyr Trp Gly Gln Gly Thr
            100                 105                 110

Leu Val Thr Val Ser Ser
            115

<210> SEQ ID NO 8
<211> LENGTH: 113
<212> TYPE: PRT
<213> ORGANISM: Artificial Sequence
<220> FEATURE:
<223> OTHER INFORMATION: Synthetic

<400> SEQUENCE: 8

Asp Val Val Met Thr Gln Ser Pro Phe Ser Leu Pro Val Thr Leu Gly
  1               5                  10                  15

Gln Pro Ala Ser Met Ser Cys Arg Ser Ser Gln Ser Leu Val Asn Ser
             20                  25                  30

Asp Gly Lys Thr His Leu Asn Trp Phe Gln Gln Arg Pro Gly Gln Ser
         35                  40                  45

Pro Arg Arg Leu Ile Tyr Lys Val Ser Asn Arg Asp Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Val Gly Val Tyr Tyr Cys Met Gln Gly
                 85                  90                  95

Thr His Trp Pro Leu Thr Phe Gly Gly Gly Thr Lys Val Glu Ile Lys
            100                 105                 110

Arg
```

<210> SEQ ID NO 9
<211> LENGTH: 339
<212> TYPE: DNA
<213> ORGANISM: Artificial Sequence
<220> FEATURE:
<223> OTHER INFORMATION: Synthetic

<400> SEQUENCE: 9

```
gatgttgtga tgactcagtc tccattctcc ctgcccgtca cccttggaca gccggcctcc      60
atgtcctgca ggtctagtca agtctcgta aacagtgatg gaaaaaccca cttgaattgg     120
tttcagcaga ggccaggcca atctccaagg cgcctaattt ataaggtttc taaccgggac    180
tctggggtcc cggacagatt cagcggcagt gggtcaggca ctgatttcac actgaaaatc    240
agcagggtgg aggctgagga tgttggggtt tattactgca tgcaaggtac acactggcct    300
ctcactttcg gcggagggac caaggtggag atcaaacgg                           339
```

<210> SEQ ID NO 10
<211> LENGTH: 120
<212> TYPE: PRT
<213> ORGANISM: Artificial Sequence
<220> FEATURE:
<223> OTHER INFORMATION: Synthetic

<400> SEQUENCE: 10

```
Gln Val Gln Leu Val Glu Ser Gly Gly Val Val Gln Pro Gly Arg
1               5                   10                  15

Ser Leu Arg Leu Ser Cys Glu Ala Ser Gly Phe Thr Phe Arg Ser Tyr
            20                  25                  30

Gly Met His Trp Val Arg Gln Ala Pro Gly Lys Gly Leu Glu Trp Val
        35                  40                  45

Ala Ile Ile Trp Tyr Asp Gly Ser Asn Lys Tyr Tyr Gly Asp Ser Val
    50                  55                  60

Lys Gly Arg Phe Thr Ile Ser Arg Asp Asn Ser Lys Asn Thr Leu Ser
65                  70                  75                  80

Leu Gln Met Asn Ser Leu Arg Ala Glu Asp Thr Ala Val Tyr Tyr Cys
                85                  90                  95

Ala Ser Leu Ser Val Asn Asp Tyr Tyr Val Leu Asp Val Trp Gly Gln
            100                 105                 110

Gly Thr Thr Val Thr Val Ser Ser
        115                 120
```

<210> SEQ ID NO 11
<211> LENGTH: 360
<212> TYPE: DNA
<213> ORGANISM: Artificial Sequence
<220> FEATURE:
<223> OTHER INFORMATION: Synthetic

<400> SEQUENCE: 11

```
caggtgcaac tggtggagtc tgggggaggc gtggtccagc ctggaggtc cctgagactc       60 tcctgtgaag cgtctggatt caccttcaga agctatggca tgcactgggt ccgccaggct    120
ccaggcaagg gctggagtg gtggcaatt atatggtatg atggaagtaa taaatactat      180
ggagactccg tgaagggccg attcaccatc tccagagaca attccaagaa cacgctgtct    240
ctgcaaatga acagcctgag agccgaggac acggctgtgt attactgtgc gagcctcagc    300
gtaaatgact actacgtttt ggacgtctgg ggccaaggga ccacggtcac cgtctcctca    360
```

<210> SEQ ID NO 12
<211> LENGTH: 108
<212> TYPE: PRT
<213> ORGANISM: Artificial Sequence
<220> FEATURE:
<223> OTHER INFORMATION: Synthetic

<400> SEQUENCE: 12

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Asn Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
50                  55                  60

Ser Arg Ser Gly Thr Asp Phe Thr Leu Thr Ile Ser Ser Leu Gln Pro
65                  70                  75                  80

Glu Asp Phe Ala Ser Tyr Tyr Cys Gln Gln Ser Phe Ser Thr Leu Tyr
                85                  90                  95

Thr Phe Gly Gln Glu Thr Lys Leu Glu Ile Lys Arg
            100                 105
```

<210> SEQ ID NO 13
<211> LENGTH: 324
<212> TYPE: DNA
<213> ORGANISM: Artificial Sequence
<220> FEATURE:
<223> OTHER INFORMATION: Synthetic

<400> SEQUENCE: 13

```
gacatccaga tgacccagtc tccatcctcc ctgtctgcat ctgtaggaga cagagtcacc    60
atcacttgcc gggcaagtca gagtattagt aattatttaa attggtatca gcagaaacca   120
gggaaagccc ctaagctcct gatctatgct gcatccagtt tgcaaagtgg ggtcccttca   180
aggttcagtg gcagtagatc tgggacagat ttcacactca ccatcagcag tctgcaacct   240
gaagattttg caagttacta ctgtcaacag agtttcagta ccctgtacac ttttggccag   300
gagaccaagc tggagatcaa acgg                                          324
```

<210> SEQ ID NO 14
<211> LENGTH: 122
<212> TYPE: PRT
<213> ORGANISM: Artificial Sequence
<220> FEATURE:
<223> OTHER INFORMATION: Synthetic

<400> SEQUENCE: 14

```
Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Ser Tyr
            20                  25                  30

Ser Met Asn Trp Val Arg Gln Ala Pro Gly Lys Gly Leu Asp Trp Val
        35                  40                  45

Ser Tyr Ile Ser Arg Ser Ser Asn Tyr Thr Tyr Tyr Ala Asp Ser Val
50                  55                  60

Met Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95
```

Ala Arg Asp Arg Arg Gly Tyr Ser Gly Tyr Asn His Phe Asp Tyr Trp
            100                 105                 110

Gly Gln Gly Thr Leu Val Thr Val Ser Ser
        115                 120

<210> SEQ ID NO 15
<211> LENGTH: 366
<212> TYPE: DNA
<213> ORGANISM: Artificial Sequence
<220> FEATURE:
<223> OTHER INFORMATION: Synthetic

<400> SEQUENCE: 15
gaggtgcagt tggtggaatc tggggggaggc ctggtcaagc ctgggggtc cctgagactc      60 tcctgtgctg cctctggatt caccttcagt agttatagta tgaactgggt ccgccaggct    120
ccagggaagg gcctggactg gtctcatac attagtagaa gtagtaatta cacatattac     180
gcagactcag tgatgggccg attcaccatc tccagagaca cgccaagaa ctcactgtat     240 ctgcaaatga acagcctgag agccgaggac acggctgtat attactgtgc gagagatcga    300
cgtggatata gtggctacaa tcattttgac tactggggcc agggaaccct ggtcaccgtc    360
tcctca                                                               366

<210> SEQ ID NO 16
<211> LENGTH: 110
<212> TYPE: PRT
<213> ORGANISM: Artificial Sequence
<220> FEATURE:
<223> OTHER INFORMATION: Synthetic

<400> SEQUENCE: 16

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Arg Lys Tyr
            20                  25                  30

Leu Asn Trp Tyr Gln Gln Lys Pro Gly Lys Ala Pro Lys Leu Leu Ile
        35                  40                  45

Tyr Asp Ala Ser Asn Leu Glu Thr Gly Val Pro Ser Arg Phe Ser Gly
    50                  55                  60

Ser Gly Ser Gly Thr Asp Phe Ser Phe Thr Ile Ser Ser Leu Gln Pro
65                  70                  75                  80

Glu Asp Leu Ala Thr Tyr Tyr Cys Gln His Tyr Ala Asn Leu Pro Pro
                85                  90                  95

Leu Phe Thr Phe Gly Pro Gly Thr Lys Val Asp Ile Lys Arg
            100                 105                 110

<210> SEQ ID NO 17
<211> LENGTH: 330
<212> TYPE: DNA
<213> ORGANISM: Artificial Sequence
<220> FEATURE:
<223> OTHER INFORMATION: Synthetic

<400> SEQUENCE: 17
gacatccaga tgacccagtc tccatcctcc ctgtctgcat ctgtgggaga cagagtcacc      60
atcacttgcc aggcgagtca ggacattagg aaatatttaa attggtatca acagaaacca    120
gggaaagccc ctaaactcct gatctacgat gcatccaatt tggaaacagg gtcccatca     180 aggttcagtg gaagtggatc tgggacagat tttctcttca ccatcagcag cctgcagcct    240
gaagatcttg caacatatta ctgtcaacat tatgctaatc tccctccctt attcactttc    300
ggccctggga ccaaagtgga tatcaaacgg                                     330

<210> SEQ ID NO 18
<211> LENGTH: 116
<212> TYPE: PRT
<213> ORGANISM: Artificial Sequence
<220> FEATURE:
<223> OTHER INFORMATION: Synthetic

<400> SEQUENCE: 18

Glu Leu Gln Leu Val Glu Ser Gly Gly Gly Leu Val Gln Pro Gly Gly
1               5                   10                  15

Ser Leu Arg Leu Ser Cys Ala Ala Ser Gly Phe Asn Phe Arg Ser Tyr
            20                  25                  30

Glu Met Asn Trp Val Arg Gln Ala Pro Gly Lys Gly Leu Glu Trp Val
        35                  40                  45

Ser Tyr Ile Ser Ser Ser Thr Thr Ile Tyr Tyr Ala Gly Ser Val
    50                  55                  60

Lys Gly Arg Phe Thr Ile Ser Arg Asp Asn Ala Lys His Ser Leu Tyr
65                  70                  75                  80

Leu Gln Met Asn Ser Leu Arg Ala Glu Asp Thr Ala Val Tyr Tyr Cys
                85                  90                  95

Ala Arg Asp Arg Gly Ala Leu Asp Tyr Trp Gly Gln Gly Thr Leu Val
            100                 105                 110

Thr Val Ser Ser
        115

<210> SEQ ID NO 19
<211> LENGTH: 348
<212> TYPE: DNA
<213> ORGANISM: Artificial Sequence
<220> FEATURE:
<223> OTHER INFORMATION: Synthetic

<400> SEQUENCE: 19
gagttgcagt tggtggagtc tgggggaggc ttggtacagc ctggagggtc cctgagactc     60
tcctgtgcag cctctggatt caacttcagg agttatgaaa tgaactgggt ccgccaggct    120
ccagggaagg ggctggagtg ggtttcctat attagtagta gtagtactac catatactac    180
gcaggctctg tgaagggccg attcaccatc tccagagaca acgccaagca ctcactgtat    240
ctgcaaatga acagcctgag agccgaggac acggctgttt attactgtgc gagagatagg    300 ggcgccttg actactgggg ccagggaacc ttggtcaccg tctcctca                  348

<210> SEQ ID NO 20
<211> LENGTH: 113
<212> TYPE: PRT
<213> ORGANISM: Artificial Sequence
<220> FEATURE:
<223> OTHER INFORMATION: Synthetic

<400> SEQUENCE: 20

Asp Val Val Met Thr Gln Ser Pro Leu Ser Leu Pro Val Thr Leu Gly
1               5                   10                  15

Gln Pro Ala Ser Ile Ser Cys Arg Ser Ser Arg Ser Leu Val Tyr Ser
            20                  25                  30

Asp Gly Asn Thr His Leu Ile Trp Phe Gln Gln Arg Pro Gly Gln Ser
        35                  40                  45

Pro Arg Arg Leu Ile Tyr Arg Val Ser Asn Arg Val Ser Gly Val Pro
         50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Val Gly Val Tyr Tyr Cys Leu Gln Gly
                 85                  90                  95

Ala His Trp Pro Tyr Thr Phe Gly Gln Gly Thr Lys Leu Glu Ile Lys
            100                 105                 110

Arg

<210> SEQ ID NO 21
<211> LENGTH: 339
<212> TYPE: DNA
<213> ORGANISM: Artificial Sequence
<220> FEATURE:
<223> OTHER INFORMATION: Synthetic

<400> SEQUENCE: 21
gatgttgtga tgactcagtc tccactctcc ctgcccgtca cccttggaca gccggcctcc    60
atctcctgca ggtctagtcg aagcctcgta tacagtgatg aaacacccca cttgatttgg   120
tttcagcaga ggcctggcca atctccaagg cgcctaattt atagggtttc taaccgggtc   180
tctggggtcc cagacagatt cagcggcagt gggtcaggca ctgatttcac actgaaaatc   240
agcagggtgg aggctgagga tgttggggtt tattactgct tgcaaggtgc acactggcca   300 tacactttg gccaggggac caagctggag atcaaacgg                            339

<210> SEQ ID NO 22
<211> LENGTH: 118
<212> TYPE: PRT
<213> ORGANISM: Artificial Sequence
<220> FEATURE:
<223> OTHER INFORMATION: Synthetic

<400> SEQUENCE: 22

Gln Val His Leu Val Glu Ser Gly Gly Gly Val Val Gln Pro Gly Arg
 1               5                  10                  15

Ser Leu Arg Leu Ser Cys Ala Ala Ser Gly Phe Lys Phe Arg Ser Tyr
                20                  25                  30

Gly Met His Trp Val Arg Gln Ala Pro Gly Lys Gly Leu Glu Trp Val
            35                  40                  45

Ala Ile Ile Trp Tyr Asp Gly Ser Lys Arg Tyr Tyr Ala Asp Ser Val
         50                  55                  60

Lys Gly Arg Phe Thr Ile Ser Arg Asp Asn Ser Lys Asn Thr Leu Tyr
 65                  70                  75                  80

Leu Gln Met Ser Ser Leu Arg Ala Glu Asp Thr Ala Val Tyr Tyr Cys
                 85                  90                  95

Ala Arg Asp Leu Ile Thr Gly Thr Thr Asp Tyr Trp Gly Gln Gly Thr
            100                 105                 110

Leu Val Thr Val Ser Ser
        115

<210> SEQ ID NO 23
<211> LENGTH: 354
<212> TYPE: DNA
<213> ORGANISM: Artificial Sequence
<220> FEATURE:
<223> OTHER INFORMATION: Synthetic

<400> SEQUENCE: 23

```
caggtgcacc tggtggagtc tgggggaggc gtggtccagc ctggggaggtc cctgagactc    60
tcctgcgcag cgtctggatt caaattcaga agctatggca tgcactgggt ccgccaggct   120
ccaggcaagg ggctggagtg ggtggcaatt atatggtatg atggaagtaa agatactat    180
gcagactccg tgaagggccg attcaccatc tccagagaca attccaagaa cacgctttat   240
ctgcaaatga gcagcctgag agccgaggac acggctgtgt attactgtgc gagagatctt   300
ataactggaa ctacggacta ctggggccag ggaaccctgg tcaccgtctc ctca          354
```

<210> SEQ ID NO 24
<211> LENGTH: 108
<212> TYPE: PRT
<213> ORGANISM: Artificial Sequence
<220> FEATURE:
<223> OTHER INFORMATION: Synthetic

<400> SEQUENCE: 24

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ser Asn Tyr
            20                  25                  30

Leu Asn Trp Tyr Gln Gln Lys Pro Gly Lys Ala Pro Lys Leu Leu Ile
        35                  40                  45

Tyr Asp Ala Ser Asn Leu Glu Thr Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Tyr Asp Asn Leu Pro Ile
                85                  90                  95

Thr Phe Gly Gln Gly Thr Arg Leu Glu Ile Lys Arg
            100                 105
```

<210> SEQ ID NO 25
<211> LENGTH: 324
<212> TYPE: DNA
<213> ORGANISM: Artificial Sequence
<220> FEATURE:
<223> OTHER INFORMATION: Synthetic

<400> SEQUENCE: 25

```
gacatccaga tgacccagtc tccatcctcc ctgtctgcat ctgtaggaga cagagtcacc    60
atcacttgcc aggcgagtca ggacattagc aactatttaa attggtatca gcagaaacca   120
gggaaagccc ctaagctcct gatctacgat gcatccaatt tggaaacagg ggtcccatca   180
aggttcagtg aagtggatc tgggacagat tttactttca ccatcagcag cctgcagcct    240
gaagatattg caacatatta ctgtcaacag tatgataatc tcccgatcac cttcggccaa   300
gggacacgac tggagattaa acgg                                          324
```

<210> SEQ ID NO 26
<211> LENGTH: 112
<212> TYPE: PRT
<213> ORGANISM: Artificial Sequence
<220> FEATURE:
<223> OTHER INFORMATION: Synthetic

<400> SEQUENCE: 26

```
Asp Val Val Met Thr Gln Thr Pro Leu Ser Ser Pro Val Thr Leu Gly
1               5                   10                  15
```

Gln Pro Ala Ser Ile Ser Cys Arg Ser Gln Ser Leu Val His Ser
                20                  25                  30

Asp Gly Asn Thr Tyr Leu Ser Trp Leu Gln Gln Arg Pro Gly Gln Pro
            35                  40                  45

Pro Arg Leu Leu Ile Tyr Lys Ile Ser Asn Arg Phe Ser Gly Val Pro
 50                  55                  60

Asp Arg Phe Ser Gly Ser Gly Ala Ala Thr Asp Phe Thr Leu Lys Ile
 65                  70                  75                  80

Ser Arg Val Glu Ala Glu Asp Val Gly Val Tyr Tyr Cys Met Gln Ala
                 85                  90                  95

Thr Gln Leu Tyr Ser Phe Gly Gln Gly Thr Lys Leu Glu Ile Lys Arg
                100                 105                 110

<210> SEQ ID NO 27
<211> LENGTH: 112
<212> TYPE: PRT
<213> ORGANISM: Artificial Sequence
<220> FEATURE:
<223> OTHER INFORMATION: Synthetic

<400> SEQUENCE: 27

Asp Ile Val Leu Thr Gln Ser Pro Ala Ser Leu Ala Val Ser Leu Gly
 1               5                  10                  15

Gln Arg Ala Thr Ile Ser Cys Lys Ala Ser Gln Ser Val Asp Tyr Asp
                20                  25                  30

Gly Asp Asn Tyr Ile His Trp Tyr Gln Gln Lys Pro Gly Gln Pro Pro
            35                  40                  45

Lys Leu Leu Ile Tyr Ala Ala Ser Asn Leu Glu Ser Gly Ile Pro Ala
 50                  55                  60

Arg Phe Thr Gly Ser Gly Ser Gly Thr Asp Phe Thr Leu Asn Ile His
 65                  70                  75                  80

Pro Val Glu Glu Glu Asp Ala Ala Thr Tyr Tyr Cys Gln Gln Ser Asp
                 85                  90                  95

Glu Asp Pro Trp Thr Phe Gly Gly Gly Thr Lys Leu Glu Ile Lys Arg
                100                 105                 110

<210> SEQ ID NO 28
<211> LENGTH: 336
<212> TYPE: DNA
<213> ORGANISM: Artificial Sequence
<220> FEATURE:
<223> OTHER INFORMATION: Synthetic

<400> SEQUENCE: 28
gacattgtgc tgacccaatc tccagcttct ttggctgtgt ctctagggca gagggccacc      60
atctcctgca aggccagcca agtgttgat tatgatggtg ataattatat acactggtac     120
caacagaaac aggacagcc acccaaactc ctcatctatg ctgcatccaa tctagaatct     180
gggatccccg ccaggtttac tggcagtggg tctgggacag acttcaccct caacatccat     240
cctgtggagg aggaggatgc tgcaacctat tactgtcagc aaagtgatga ggatccgtgg     300
acgttcggtg gaggcaccaa gctggaaatc aaacgg                               336

<210> SEQ ID NO 29
<211> LENGTH: 124
<212> TYPE: PRT
<213> ORGANISM: Artificial Sequence
<220> FEATURE:
<223> OTHER INFORMATION: Synthetic

<400> SEQUENCE: 29

Asp Val Leu Leu Gln Glu Ser Gly Pro Gly Leu Val Lys Pro Ser Gln
1               5                   10                  15

Ser Leu Ser Leu Thr Cys Ser Val Thr Gly Tyr Ser Ile Thr Ser Gly
            20                  25                  30

His Tyr Trp Ile Trp Ile Arg Gln Phe Pro Gly Asn Lys Leu Glu Trp
        35                  40                  45

Met Gly Tyr Ile Thr Tyr Asp Gly Ser Asn Asn Tyr Asn Pro Ser Leu
    50                  55                  60

Lys Lys Arg Ile Ser Ile Thr Arg Asp Thr Ser Glu Asn Gln Phe Phe
65                  70                  75                  80

Leu Lys Leu Asn Pro Val Thr Thr Glu Asp Thr Ala Thr Tyr Tyr Cys
                85                  90                  95

Ala Arg Asp Val Ala Asp Ser Tyr Gly Asn Gly Tyr Asp Ala Met Asp
            100                 105                 110

Tyr Trp Gly Gln Gly Thr Ser Val Thr Val Ser Ser
        115                 120

<210> SEQ ID NO 30
<211> LENGTH: 372
<212> TYPE: DNA
<213> ORGANISM: Artificial Sequence
<220> FEATURE:
<223> OTHER INFORMATION: Synthetic

<400> SEQUENCE: 30
gatgtactac ttcaggagtc aggacctggc ctcgtgaaac cttctcagtc tctgtctctc    60
acctgctctg tcactggcta ctccatcacc agtggtcatt actggatctg gatccggcag   120
tttccaggaa acaaactgga atggatgggc tacataacct acgacggtag caataattac   180
aacccatctc tcaaaaaacg aatctccatc actcgtgaca catctgagaa ccagttttc    240
ctgaagttga atcctgtgac tactgaagac acagccacat attactgtgc aagagatgtg   300
gccgattcct acggtaatgg ttacgatgct atggactatt ggggtcaagg aacctcagtc   360
accgtctcct ca                                                      372

<210> SEQ ID NO 31
<211> LENGTH: 112
<212> TYPE: PRT
<213> ORGANISM: Artificial Sequence
<220> FEATURE:
<223> OTHER INFORMATION: Synthetic

<400> SEQUENCE: 31

Asp Ile Leu Leu Thr Gln Ser Pro Gly Ser Leu Ala Val Ser Leu Gly
1               5                   10                  15

Gln Arg Ala Thr Ile Ser Cys Lys Ala Ser Gln Ser Ala Asp Tyr Gly
            20                  25                  30

Gly Asp Ser Tyr Met Ser Trp Tyr Gln Gln Lys Pro Gly Gln Pro Pro
        35                  40                  45

Lys Leu Leu Ile Tyr Ala Ala Ser Asn Leu Glu Ser Gly Thr Pro Ala
    50                  55                  60

Arg Phe Ser Gly Ser Gly Ser Gly Thr Asp Phe Thr Leu Asn Ile His
65                  70                  75                  80

Pro Val Glu Glu Glu Asp Ala Ala Thr Tyr Tyr Cys Gln Gln Gly Asn
                85                  90                  95

```
Glu Asp Pro Trp Thr Phe Gly Gly Gly Thr Lys Leu Glu Ile Lys Arg
            100                 105                 110
```

<210> SEQ ID NO 32
<211> LENGTH: 336
<212> TYPE: DNA
<213> ORGANISM: Artificial Sequence
<220> FEATURE:
<223> OTHER INFORMATION: Synthetic

<400> SEQUENCE: 32

| | | | | | |
|---|---|---|---|---|---|
| gacattctac | tgacccaatc | tccaggttct | ttggctgtgt | ctctagggca | gagggccacc | 60 |
| atctcctgca | aggccagcca | aagtgctgat | tatggtggtg | atagttatat | gagctggtac | 120 |
| caacagaaac | caggacagcc | acccaaactc | ctcatctatg | ctgcatccaa | tttagaatct | 180 |
| gggacccag | ccaggtttag | tggcagtggg | tctgggacag | acttcaccct | caacatccat | 240 |
| cctgtggagg | aggaggatgc | tgcaacctat | tactgtcagc | aaggtaatga | ggatccgtgg | 300 |
| acgttcggtg | gaggcaccaa | gctggaaatc | aaacgg | | | 336 |

<210> SEQ ID NO 33
<211> LENGTH: 124
<212> TYPE: PRT
<213> ORGANISM: Artificial Sequence
<220> FEATURE:
<223> OTHER INFORMATION: Synthetic

<400> SEQUENCE: 33

```
Asp Val Gln Leu Gln Glu Ser Gly Pro Gly Leu Val Lys Pro Ser Gln
1               5                   10                  15

Ser Leu Ser Leu Thr Cys Ser Val Thr Gly Tyr Ser Ile Thr Ser Ser
            20                  25                  30

Tyr Tyr Trp Asn Trp Ile Arg Gln Phe Pro Gly Asn Lys Leu Glu Trp
        35                  40                  45

Met Gly Ser Ile Met Tyr Asp Gly Asn Asn Tyr Asn Pro Ser Leu
    50                  55                  60

Lys Asn Arg Ile Ser Ile Thr Arg Asp Thr Ser Lys Asn Gln Phe Phe
65                  70                  75                  80

Leu Lys Leu Asn Ser Val Thr Thr Glu Asp Thr Ala Thr Tyr Tyr Cys
                85                  90                  95

Ala Arg Asn Met Ala Asp Tyr Phe Gly Asn Thr Tyr Ala Leu Asp
            100                 105                 110

Tyr Trp Gly Gln Gly Thr Ser Val Thr Val Ser Ser
        115                 120
```

<210> SEQ ID NO 34
<211> LENGTH: 372
<212> TYPE: DNA
<213> ORGANISM: Artificial Sequence
<220> FEATURE:
<223> OTHER INFORMATION: Synthetic

<400> SEQUENCE: 34

| | | | | | |
|---|---|---|---|---|---|
| gatgtacagc | ttcaggagtc | aggacctggc | ctcgtgaaac | cttctcagtc | tctgtctctc | 60 |
| acctgctctg | tcactggcta | ctccatcacc | agtagttatt | actggaactg | gatccggcag | 120 |
| tttccaggaa | acaaactgga | atggatgggc | tccataatgt | acgacggtaa | caataactac | 180 |
| aacccatctc | tcaaaaatcg | aatctccatc | actcgtgaca | catctaagaa | ccagttttc | 240 |
| ctgaagttga | attctgtgac | tactgaggac | acagctacat | attactgtgc | aagaaatatg | 300 |

```
gccgattact tcggtaatac ctacgatgct ttggactatt ggggtcaagg aacctcagtc    360
accgtctcct ca                                                        372
```

<210> SEQ ID NO 35
<211> LENGTH: 336
<212> TYPE: DNA
<213> ORGANISM: Artificial Sequence
<220> FEATURE:
<223> OTHER INFORMATION: Synthetic

<400> SEQUENCE: 35

```
gatgttgtga tgacccagac tccactctcc tcacctgtca cccttggaca gccggcctcc    60
atctcctgca ggtctagtca agcctcgta cacagtgatg gaaacaccta cttgagttgg    120
cttcagcaga ggccaggcca gcctccaaga ctcctaattt ataagatttc taaccggttc    180
tctggggtcc cagacagatt cagtggcagt ggggcagcga cagatttcac actgaaaatc    240
agcagggtgg aagctgagga tgtcggggtt tattactgca tgcaagctac acaattgtac    300
tcttttggcc aggggaccaa gctggagatc aaacgg                             336
```

<210> SEQ ID NO 36
<211> LENGTH: 124
<212> TYPE: PRT
<213> ORGANISM: Artificial Sequence
<220> FEATURE:
<223> OTHER INFORMATION: Synthetic

<400> SEQUENCE: 36

```
Asp Val Gln Leu Gln Glu Ser Gly Pro Gly Leu Val Lys Pro Ser Gln
1               5                   10                  15

Ser Leu Ser Leu Thr Cys Ser Val Thr Gly Tyr Ser Ile Thr Ser Ser
            20                  25                  30

Tyr Tyr Trp Asn Trp Ile Arg Gln Phe Pro Gly Asn Lys Leu Glu Trp
        35                  40                  45

Met Gly Tyr Ile Met Tyr Asp Gly Asn Asn Tyr Asn Pro Ser Leu
    50                  55                  60

Lys Asn Arg Ile Ser Ile Thr Arg Asp Thr Ser Lys Asn Gln Phe Phe
65                  70                  75                  80

Leu Lys Leu Asn Ser Val Thr Thr Glu Asp Thr Ala Thr Tyr Tyr Cys
                85                  90                  95

Ala Arg Asn Met Ala Asp Tyr Phe Gly Asn Thr Tyr Asp Ala Leu Asp
            100                 105                 110

Tyr Trp Gly Gln Gly Thr Ser Val Thr Val Ser Ser
        115                 120
```

<210> SEQ ID NO 37
<211> LENGTH: 372
<212> TYPE: DNA
<213> ORGANISM: Artificial Sequence
<220> FEATURE:
<223> OTHER INFORMATION: Synthetic

<400> SEQUENCE: 37

```
gatgtacagc ttcaggagtc aggacctggc ctcgtgaaac cttctcagtc tctgtctctc    60
acctgctctg tcactggcta ctccatcacc agtagttatt actggaactg gatccggcag    120
tttccaggaa acaaactgga atggatgggc tacataatgt acgacggtaa caataactac    180
aacccatctc tcaaaaatcg aatctccatc actcgtgaca catctaagaa ccagtttttc    240
ctgaagttga attctgtgac tactgaggac acagctacat attactgtgc aagaaatatg    300
```

```
gccgattact tcggtaatac ctacgatgct ttggactatt ggggtcaagg aacctcagtc    360
accgtctcct ca                                                        372
```

<210> SEQ ID NO 38
<211> LENGTH: 112
<212> TYPE: PRT
<213> ORGANISM: Artificial Sequence
<220> FEATURE:
<223> OTHER INFORMATION: Synthetic

<400> SEQUENCE: 38

```
Asp Ile Met Leu Thr Gln Ser Pro Ala Ser Leu Ala Val Ser Leu Gly
1               5                   10                  15

Gln Arg Ala Thr Ile Ser Cys Lys Ala Ser Gln Ser Val Asp Tyr Asp
            20                  25                  30

Gly Asn Gly Tyr Leu Asn Trp Tyr Gln Gln Lys Pro Gly Gln Pro Pro
        35                  40                  45

Lys Leu Leu Ile Tyr Ala Ala Ser Asn Leu Glu Ser Gly Ile Pro Ala
    50                  55                  60

Arg Phe Ser Gly Ser Gly Ser Gly Thr Asp Phe Thr Leu Asn Ile His
65                  70                  75                  80

Pro Val Glu Glu Glu Asp Val Ala Thr Tyr Tyr Cys Gln Gln Ser Ser
                85                  90                  95

Glu Asp Pro Phe Thr Phe Gly Ser Gly Thr Lys Leu Glu Ile Lys Arg
            100                 105                 110
```

<210> SEQ ID NO 39
<211> LENGTH: 336
<212> TYPE: DNA
<213> ORGANISM: Artificial Sequence
<220> FEATURE:
<223> OTHER INFORMATION: Synthetic

<400> SEQUENCE: 39

```
gacattatgc tgacccaatc tccagcttct ttggctgtgt ctctagggca gagggccacc    60
atctcctgca aggccagcca aagtgttgat tatgatggta atgggtattt gaactggtac    120
caacagaaac caggacagcc acccaaactc ctcatctatg ctgcatccaa tctagaatct    180
gggatcccag ccaggtttag tggcagtggg tctgggacag acttcaccct caacatccat    240
cctgtggagg aggaggatgt tgcaacctat tactgtcagc aaagtagtga ggatccattc    300
acgttcggct cggggacaaa gttggaaata aaacgg                              336
```

<210> SEQ ID NO 40
<211> LENGTH: 121
<212> TYPE: PRT
<213> ORGANISM: Artificial Sequence
<220> FEATURE:
<223> OTHER INFORMATION: Synthetic

<400> SEQUENCE: 40

```
Gln Val Thr Leu Lys Glu Ser Gly Pro Gly Ile Leu Lys Pro Ser Gln
1               5                   10                  15

Thr Leu Ser Leu Thr Cys Ser Phe Ser Gly Phe Ser Leu Ser Thr Ser
            20                  25                  30

Gly Met Gly Val Gly Trp Ile Arg Gln Pro Ser Gly Lys Gly Leu Glu
        35                  40                  45

Trp Leu Ala His Ile Trp Trp Asp Asp Asp Lys Phe Tyr Lys Pro Ser
    50                  55                  60
```

```
Leu Lys Asn Arg Leu Thr Ile Ser Lys Asp Thr Ser Arg Asn Gln Val
 65                  70                  75                  80

Phe Leu Lys Ile Thr Ser Val Asp Thr Ala Asp Ala Ala Thr Tyr Phe
                 85                  90                  95

Cys Val Arg Arg Ser Ala Tyr Glu Ala Phe Thr Leu Asp Tyr Trp Gly
            100                 105                 110

Gln Gly Thr Ser Val Thr Val Ser Ser
            115                 120
```

<210> SEQ ID NO 41
<211> LENGTH: 363
<212> TYPE: DNA
<213> ORGANISM: Artificial Sequence
<220> FEATURE:
<223> OTHER INFORMATION: Synthetic

<400> SEQUENCE: 41

```
caagttactc taaaagagtc tggccctggg atattgaagc cctcacagac cctcagtctg    60
acttgttctt tctctgggtt ttcactgagc acttctggta tgggtgttgg ctggattcgt   120
cagccttcag ggaagggtct ggagtggctg gcacacattt ggtgggatga tgataagttc   180
tataagccat ccctgaagaa ccggctcaca atctccaagg atacctccag aaatcaggta   240
ttcctcaaga tcaccagtgt ggacactgca gatgctgcca cctacttctg tgttcgaaga   300
agtgcctacg aggcctttac tctggactac tggggtcaag caccctcagt caccgtctcc   360
tca                                                                363
```

<210> SEQ ID NO 42
<211> LENGTH: 112
<212> TYPE: PRT
<213> ORGANISM: Artificial Sequence
<220> FEATURE:
<223> OTHER INFORMATION: Synthetic

<400> SEQUENCE: 42

```
Asp Ile Val Leu Thr Gln Ser Pro Ala Ser Leu Ala Val Ser Leu Gly
  1               5                  10                  15

Gln Arg Ala Thr Ile Ser Cys Lys Ala Ser Gln Ser Val Asp Tyr Asp
             20                  25                  30

Gly Asn Gly Tyr Met Asn Trp Tyr Gln Gln Lys Pro Gly Gln Pro Pro
         35                  40                  45

Lys Leu Leu Ile Tyr Ala Ala Ser Asn Leu Glu Ser Gly Ile Pro Ala
     50                  55                  60

Arg Phe Ser Gly Ser Gly Ser Gly Thr Asp Phe Thr Leu Asn Ile His
 65                  70                  75                  80

Pro Val Glu Glu Glu Asp Ala Ala Thr Tyr Tyr Cys Gln Gln Ser Asn
                 85                  90                  95

Glu Asp Pro Tyr Thr Phe Gly Gly Gly Thr Lys Leu Glu Ile Lys Arg
            100                 105                 110
```

<210> SEQ ID NO 43
<211> LENGTH: 336
<212> TYPE: DNA
<213> ORGANISM: Artificial Sequence
<220> FEATURE:
<223> OTHER INFORMATION: Synthetic

<400> SEQUENCE: 43

```
gacattgtgc tgacccaatc tccagcttct ttggctgtgt ctctagggca gagggccacc    60
```

```
atctcctgca aggccagcca aagtgttgat tatgatggta atggttatat gaactggtac    120
caacagaaac caggacagcc acccaaactc ctcatctatg ctgcatccaa tctagaatct    180
gggatcccag ccaggtttag tggcagtggg tctgggacag acttcactct caacatccat    240
cctgtggagg aggaggatgc tgcaacctat tactgtcagc aaagtaatga ggatccgtac    300
acgttcggag gggggaccaa gctggaaata aaacgg                              336
```

<210> SEQ ID NO 44
<211> LENGTH: 117
<212> TYPE: PRT
<213> ORGANISM: Artificial Sequence
<220> FEATURE:
<223> OTHER INFORMATION: Synthetic

<400> SEQUENCE: 44

```
Glu Val Gln Leu Gln Gln Ser Gly Ser Glu Leu Ala Ser Pro Gly Thr
1               5                   10                  15

Ser Val Lys Leu Ser Cys Lys Ala Ser Gly Tyr Thr Phe Thr Ser Tyr
            20                  25                  30

Trp Val Gln Trp Ile Lys Gln Arg Pro Gly Gln Gly Leu Glu Trp Ile
        35                  40                  45

Gly Ala Ile Tyr Pro Gly Asp Gly Asp Leu Arg Ser Thr Gln Lys Phe
    50                  55                  60

Lys Gly Lys Ala Thr Leu Thr Ala Asp Lys Ser Ser Asp Thr Ala Tyr
65                  70                  75                  80

Met Gln Leu Ser Ser Leu Ala Ser Glu Asp Ser Ala Val Tyr Tyr Cys
                85                  90                  95

Ala Arg Leu Asp Asp Phe Asp Leu Asp Tyr Trp Gly Gln Gly Thr Thr
            100                 105                 110

Leu Ile Val Ser Ser
        115
```

<210> SEQ ID NO 45
<211> LENGTH: 351
<212> TYPE: DNA
<213> ORGANISM: Artificial Sequence
<220> FEATURE:
<223> OTHER INFORMATION: Synthetic

<400> SEQUENCE: 45

```
gaggttcagc tccagcagtc tgggtctgag ctggcaagcc ctgggacttc agtgaagttg     60
tcctgtaagg cttctggcta cacctttact agctactggg tgcagtggat aaaacagagg    120
cctggacagg gtctggaatg gattgggget atttatcctg gagatggtga tcttaggtcc    180
actcagaagt tcaagggcaa ggccacattg actgcagata atcctccgga cacagcctac    240
atgcaactca gcagcttggc atctgaggac tctgcggtct attactgtgc aagattggat    300
gatttcgacc ttgactactg gggccaaggc accactctca tagtctcctc a             351
```

<210> SEQ ID NO 46
<211> LENGTH: 120
<212> TYPE: PRT
<213> ORGANISM: Artificial Sequence
<220> FEATURE:
<223> OTHER INFORMATION: Synthetic

<400> SEQUENCE: 46

```
Gln Val Gln Leu Gln Gln Ser Gly Pro Glu Val Val Lys Pro Gly Ala
1               5                   10                  15
```

```
Ser Val Lys Met Ser Cys Lys Ala Ser Gly Tyr Thr Phe Thr Asp Cys
            20                  25                  30

Val Ile Ser Trp Ile Lys Gln Arg Thr Gly Gln Gly Leu Glu Trp Ile
        35                  40                  45

Gly Glu Ile His Pro Gly Ser Gly Asn Thr Tyr Asn Asn Glu Lys Phe
    50                  55                  60

Lys Gly Lys Ala Thr Leu Thr Ala Asp Lys Ser Ser Asn Thr Ala Tyr
65                  70                  75                  80

Ile Gln Leu Ser Ser Leu Thr Ser Glu Asp Ser Ala Val Tyr Phe Cys
                85                  90                  95

Ala Arg Val Gly Asp Trp Tyr Asp Asp Ala Met Asp Tyr Trp Gly Gln
            100                 105                 110

Gly Thr Ser Val Thr Val Ser Ser
            115                 120

<210> SEQ ID NO 47
<211> LENGTH: 360
<212> TYPE: DNA
<213> ORGANISM: Artificial Sequence
<220> FEATURE:
<223> OTHER INFORMATION: Synthetic

<400> SEQUENCE: 47
caggttcagc tgcagcagtc tggacctgag gtggtgaagc tggggcttc  agtgaagatg      60 tcctgcaagg cttctggata cacattcact gactgtgtta taagttggat taagcagaga    120
actggacagg gccttgagtg gattggagag attcatcctg gaagtggtaa cacttacaac    180
aatgagaagt tcaagggcaa ggccacactg actgcagaca atcctccaa  cacagcctac    240 attcaactca gcagcctgac atctgaggac tctgcggtct atttctgtgc aagagttggg    300
gattggtacg acgatgctat ggactactgg ggtcaggaa  cctcagtcac cgtctcctca    360

<210> SEQ ID NO 48
<211> LENGTH: 123
<212> TYPE: PRT
<213> ORGANISM: Artificial Sequence
<220> FEATURE:
<223> OTHER INFORMATION: Synthetic

<400> SEQUENCE: 48

Asp Val Lys Leu Val Asp Ser Gly Gly Gly Leu Val Lys Pro Gly Gly
1               5                   10                  15

Ser Leu Lys Leu Ser Cys Ala Ala Ser Gly Phe Thr Phe Ser Asn Tyr
            20                  25                  30

Gly Met Ser Trp Val Arg Gln Thr Pro Glu Lys Arg Leu Glu Trp Val
        35                  40                  45

Ala Thr Ile Ser Ser Gly Gly Tyr Tyr Thr Tyr Tyr Pro Asp Ser Val
    50                  55                  60

Lys Gly Arg Phe Thr Ile Ser Arg Asp Asn Ala Lys Asn Thr Leu Tyr
65                  70                  75                  80

Leu Gln Met Gly Ser Leu Lys Ser Glu Asp Thr Ala Met Tyr Tyr Cys
                85                  90                  95

Ser Arg Asp Arg Glu Gly Phe Gly Asn Tyr Leu Gly Ala Met Asp Tyr
            100                 105                 110

Trp Gly Gln Gly Thr Ser Val Thr Val Ser Ser
        115                 120
```

<210> SEQ ID NO 49
<211> LENGTH: 369
<212> TYPE: DNA
<213> ORGANISM: Artificial Sequence
<220> FEATURE:
<223> OTHER INFORMATION: Synthetic

<400> SEQUENCE: 49

```
gacgtgaagt tggtggactc tgggggaggc ttagtgaagc ctggagggtc cctaaagctc      60
tcctgtgcag cctctggatt cacttttagt aactatggca tgtcttgggt tcgtcagact     120
ccggagaaga ggctggagtg ggtcgcaacc attagtagtg gtggttatta cacctactat     180
ccagacagtg tgaagggccg attcaccatc tccagagaca tgccaagaa cacccctgtac    240
ctgcaaatgg gcagtctgaa gtctgaggac acagccatgt attactgttc aagagatagg     300
gagggctttg gtaactattt aggggctatg gactactggg gtcaaggaac ctcagtcacc     360
gtctcctca                                                             369
```

<210> SEQ ID NO 50
<211> LENGTH: 185
<212> TYPE: PRT
<213> ORGANISM: Artificial Sequence
<220> FEATURE:
<223> OTHER INFORMATION: Synthetic

<400> SEQUENCE: 50

```
Asp Gly Asn Glu Glu Met Gly Gly Ile Thr Gln Thr Pro Tyr Lys Val
 1               5                  10                  15
Ser Ile Ser Gly Thr Thr Val Ile Leu Thr Cys Pro Gln Tyr Pro Gly
             20                  25                  30
Ser Glu Ile Leu Trp Gln His Asn Asp Lys Asn Ile Gly Gly Asp Glu
         35                  40                  45
Asp Asp Lys Asn Ile Gly Ser Asp Glu Asp His Leu Ser Leu Lys Glu
     50                  55                  60
Phe Ser Glu Leu Glu Gln Ser Gly Tyr Tyr Val Cys Tyr Pro Arg Gly
 65                  70                  75                  80
Ser Lys Pro Glu Asp Ala Asn Phe Tyr Leu Tyr Leu Arg Ala Arg Val
                 85                  90                  95
Cys Glu Asn Cys Met Glu Met Asp Val Met Ser Val Ala Thr Ile Val
            100                 105                 110
Ile Val Asp Ile Cys Ile Thr Gly Leu Leu Leu Val Tyr Tyr
        115                 120                 125
Trp Ser Lys Asn Arg Lys Ala Lys Ala Lys Pro Val Thr Arg Gly Ala
    130                 135                 140
Gly Ala Gly Gly Arg Gln Arg Gly Gln Asn Lys Glu Arg Pro Pro Pro
145                 150                 155                 160
Val Pro Asn Pro Asp Tyr Glu Pro Ile Arg Lys Gly Gln Arg Asp Leu
                165                 170                 175
Tyr Ser Gly Leu Asn Gln Arg Arg Ile
            180                 185
```

<210> SEQ ID NO 51
<211> LENGTH: 16
<212> TYPE: PRT
<213> ORGANISM: Artificial Sequence
<220> FEATURE:
<223> OTHER INFORMATION: Synthetic

<400> SEQUENCE: 51

Arg Ser Ser Arg Ser Leu Val Tyr Ser Asp Gly Asn Thr His Leu Ile
1               5                   10                  15

<210> SEQ ID NO 52
<211> LENGTH: 7
<212> TYPE: PRT
<213> ORGANISM: Artificial Sequence
<220> FEATURE:
<223> OTHER INFORMATION: Synthetic

<400> SEQUENCE: 52

Arg Val Ser Asn Arg Val Ser
1               5

<210> SEQ ID NO 53
<211> LENGTH: 9
<212> TYPE: PRT
<213> ORGANISM: Artificial Sequence
<220> FEATURE:
<223> OTHER INFORMATION: Synthetic

<400> SEQUENCE: 53

Leu Gln Gly Ala His Trp Pro Tyr Thr
1               5

<210> SEQ ID NO 54
<211> LENGTH: 5
<212> TYPE: PRT
<213> ORGANISM: Artificial Sequence
<220> FEATURE:
<223> OTHER INFORMATION: Synthetic

<400> SEQUENCE: 54

Ser Tyr Gly Met His
1               5

<210> SEQ ID NO 55
<211> LENGTH: 17
<212> TYPE: PRT
<213> ORGANISM: Artificial Sequence
<220> FEATURE:
<223> OTHER INFORMATION: Synthetic

<400> SEQUENCE: 55

Ile Ile Trp Tyr Asp Gly Ser Lys Arg Tyr Tyr Ala Asp Ser Val Lys
1               5                   10                  15
Gly

<210> SEQ ID NO 56
<211> LENGTH: 9
<212> TYPE: PRT
<213> ORGANISM: Artificial Sequence
<220> FEATURE:
<223> OTHER INFORMATION: Synthetic

<400> SEQUENCE: 56

Asp Leu Ile Thr Gly Thr Thr Asp Tyr
1               5

<210> SEQ ID NO 57
<211> LENGTH: 8
<212> TYPE: PRT
<213> ORGANISM: Artificial Sequence
<220> FEATURE:
<223> OTHER INFORMATION: Synthetic

<400> SEQUENCE: 57

```
Pro Arg Phe Lys Ile Ile Gly Gly
1               5

<210> SEQ ID NO 58
<211> LENGTH: 8
<212> TYPE: PRT
<213> ORGANISM: Artificial Sequence
<220> FEATURE:
<223> OTHER INFORMATION: Synthetic

<400> SEQUENCE: 58

Pro Arg Phe Arg Ile Ile Gly Gly
1               5

<210> SEQ ID NO 59
<211> LENGTH: 9
<212> TYPE: PRT
<213> ORGANISM: Artificial Sequence
<220> FEATURE:
<223> OTHER INFORMATION: Synthetic

<400> SEQUENCE: 59

Ser Ser Arg His Arg Arg Ala Leu Asp
1               5

<210> SEQ ID NO 60
<211> LENGTH: 14
<212> TYPE: PRT
<213> ORGANISM: Artificial Sequence
<220> FEATURE:
<223> OTHER INFORMATION: Synthetic

<400> SEQUENCE: 60

Arg Lys Ser Ser Ile Ile Ile Arg Met Arg Asp Val Val Leu
1               5                   10

<210> SEQ ID NO 61
<211> LENGTH: 15
<212> TYPE: PRT
<213> ORGANISM: Artificial Sequence
<220> FEATURE:
<223> OTHER INFORMATION: Synthetic

<400> SEQUENCE: 61

Ser Ser Ser Phe Asp Lys Gly Lys Tyr Lys Lys Gly Asp Asp Ala
1               5                   10                  15

<210> SEQ ID NO 62
<211> LENGTH: 15
<212> TYPE: PRT
<213> ORGANISM: Artificial Sequence
<220> FEATURE:
<223> OTHER INFORMATION: Synthetic

<400> SEQUENCE: 62

Ser Ser Ser Phe Asp Lys Gly Lys Tyr Lys Arg Gly Asp Asp Ala
1               5                   10                  15

<210> SEQ ID NO 63
<211> LENGTH: 4
<212> TYPE: PRT
<213> ORGANISM: Artificial Sequence
<220> FEATURE:
<223> OTHER INFORMATION: Synthetic

<400> SEQUENCE: 63
```

Ile Glu Gly Arg
1

<210> SEQ ID NO 64
<211> LENGTH: 4
<212> TYPE: PRT
<213> ORGANISM: Artificial Sequence
<220> FEATURE:
<223> OTHER INFORMATION: Synthetic

<400> SEQUENCE: 64

Ile Asp Gly Arg
1

<210> SEQ ID NO 65
<211> LENGTH: 7
<212> TYPE: PRT
<213> ORGANISM: Artificial Sequence
<220> FEATURE:
<223> OTHER INFORMATION: Synthetic

<400> SEQUENCE: 65

Gly Gly Ser Ile Asp Gly Arg
1               5

<210> SEQ ID NO 66
<211> LENGTH: 6
<212> TYPE: PRT
<213> ORGANISM: Artificial Sequence
<220> FEATURE:
<223> OTHER INFORMATION: Synthetic

<400> SEQUENCE: 66

Pro Leu Gly Leu Trp Ala
1               5

<210> SEQ ID NO 67
<211> LENGTH: 8
<212> TYPE: PRT
<213> ORGANISM: Artificial Sequence
<220> FEATURE:
<223> OTHER INFORMATION: Synthetic

<400> SEQUENCE: 67

Gly Pro Gln Gly Ile Ala Gly Gln
1               5

<210> SEQ ID NO 68
<211> LENGTH: 8
<212> TYPE: PRT
<213> ORGANISM: Artificial Sequence
<220> FEATURE:
<223> OTHER INFORMATION: Synthetic

<400> SEQUENCE: 68

Gly Pro Gln Gly Leu Leu Gly Ala
1               5

<210> SEQ ID NO 69
<211> LENGTH: 5
<212> TYPE: PRT
<213> ORGANISM: Artificial Sequence
<220> FEATURE:
<223> OTHER INFORMATION: Synthetic

<400> SEQUENCE: 69

Gly Ile Ala Gly Gln

```
1               5

<210> SEQ ID NO 70
<211> LENGTH: 8
<212> TYPE: PRT
<213> ORGANISM: Artificial Sequence
<220> FEATURE:
<223> OTHER INFORMATION: Synthetic

<400> SEQUENCE: 70

Gly Pro Leu Gly Ile Ala Gly Ile
1               5

<210> SEQ ID NO 71
<211> LENGTH: 8
<212> TYPE: PRT
<213> ORGANISM: Artificial Sequence
<220> FEATURE:
<223> OTHER INFORMATION: Synthetic

<400> SEQUENCE: 71

Gly Pro Glu Gly Leu Arg Val Gly
1               5

<210> SEQ ID NO 72
<211> LENGTH: 8
<212> TYPE: PRT
<213> ORGANISM: Artificial Sequence
<220> FEATURE:
<223> OTHER INFORMATION: Synthetic

<400> SEQUENCE: 72

Tyr Gly Ala Gly Leu Gly Val Val
1               5

<210> SEQ ID NO 73
<211> LENGTH: 8
<212> TYPE: PRT
<213> ORGANISM: Artificial Sequence
<220> FEATURE:
<223> OTHER INFORMATION: Synthetic

<400> SEQUENCE: 73

Ala Gly Leu Gly Val Val Glu Arg
1               5

<210> SEQ ID NO 74
<211> LENGTH: 8
<212> TYPE: PRT
<213> ORGANISM: Artificial Sequence
<220> FEATURE:
<223> OTHER INFORMATION: Synthetic

<400> SEQUENCE: 74

Ala Gly Leu Gly Ile Ser Ser Thr
1               5

<210> SEQ ID NO 75
<211> LENGTH: 8
<212> TYPE: PRT
<213> ORGANISM: Artificial Sequence
<220> FEATURE:
<223> OTHER INFORMATION: Synthetic

<400> SEQUENCE: 75

Glu Pro Gln Ala Leu Ala Met Ser
1               5
```

```
<210> SEQ ID NO 76
<211> LENGTH: 8
<212> TYPE: PRT
<213> ORGANISM: Artificial Sequence
<220> FEATURE:
<223> OTHER INFORMATION: Synthetic

<400> SEQUENCE: 76

Gln Ala Leu Ala Met Ser Ala Ile
1               5

<210> SEQ ID NO 77
<211> LENGTH: 8
<212> TYPE: PRT
<213> ORGANISM: Artificial Sequence
<220> FEATURE:
<223> OTHER INFORMATION: Synthetic

<400> SEQUENCE: 77

Ala Ala Tyr His Leu Val Ser Gln
1               5

<210> SEQ ID NO 78
<211> LENGTH: 8
<212> TYPE: PRT
<213> ORGANISM: Artificial Sequence
<220> FEATURE:
<223> OTHER INFORMATION: Synthetic

<400> SEQUENCE: 78

Met Asp Ala Phe Leu Glu Ser Ser
1               5

<210> SEQ ID NO 79
<211> LENGTH: 8
<212> TYPE: PRT
<213> ORGANISM: Artificial Sequence
<220> FEATURE:
<223> OTHER INFORMATION: Synthetic

<400> SEQUENCE: 79

Glu Ser Leu Pro Val Val Ala Val
1               5

<210> SEQ ID NO 80
<211> LENGTH: 8
<212> TYPE: PRT
<213> ORGANISM: Artificial Sequence
<220> FEATURE:
<223> OTHER INFORMATION: Synthetic

<400> SEQUENCE: 80

Ser Ala Pro Ala Val Glu Ser Glu
1               5

<210> SEQ ID NO 81
<211> LENGTH: 8
<212> TYPE: PRT
<213> ORGANISM: Artificial Sequence
<220> FEATURE:
<223> OTHER INFORMATION: Synthetic

<400> SEQUENCE: 81

Asp Val Ala Gln Phe Val Leu Thr
1               5
```

<210> SEQ ID NO 82
<211> LENGTH: 7
<212> TYPE: PRT
<213> ORGANISM: Artificial Sequence
<220> FEATURE:
<223> OTHER INFORMATION: Synthetic

<400> SEQUENCE: 82

Val Ala Gln Phe Val Leu Thr
1               5

<210> SEQ ID NO 83
<211> LENGTH: 8
<212> TYPE: PRT
<213> ORGANISM: Artificial Sequence
<220> FEATURE:
<223> OTHER INFORMATION: Synthetic

<400> SEQUENCE: 83

Val Ala Gln Phe Val Leu Thr Glu
1               5

<210> SEQ ID NO 84
<211> LENGTH: 8
<212> TYPE: PRT
<213> ORGANISM: Artificial Sequence
<220> FEATURE:
<223> OTHER INFORMATION: Synthetic

<400> SEQUENCE: 84

Ala Gln Phe Val Leu Thr Glu Gly
1               5

<210> SEQ ID NO 85
<211> LENGTH: 8
<212> TYPE: PRT
<213> ORGANISM: Artificial Sequence
<220> FEATURE:
<223> OTHER INFORMATION: Synthetic

<400> SEQUENCE: 85

Pro Val Gln Pro Ile Gly Pro Gln
1               5

<210> SEQ ID NO 86
<211> LENGTH: 27
<212> TYPE: PRT
<213> ORGANISM: Artificial Sequence
<220> FEATURE:
<223> OTHER INFORMATION: Synthetic

<400> SEQUENCE: 86

Gln Asp Gly Asn Glu Glu Met Gly Gly Ile Thr Gln Thr Pro Tyr Lys
1               5                   10                  15

Val Ser Ile Ser Gly Thr Thr Val Ile Leu Thr
            20                  25

<210> SEQ ID NO 87
<211> LENGTH: 15
<212> TYPE: PRT
<213> ORGANISM: Artificial Sequence
<220> FEATURE:
<223> OTHER INFORMATION: Synthetic

<400> SEQUENCE: 87

Gln Asp Gly Asn Glu Glu Met Gly Gly Ile Thr Gln Thr Pro Tyr

```
<210> SEQ ID NO 88
<211> LENGTH: 15
<212> TYPE: PRT
<213> ORGANISM: Artificial Sequence
<220> FEATURE:
<223> OTHER INFORMATION: Synthetic

<400> SEQUENCE: 88

Asp Gly Asn Glu Glu Met Gly Gly Ile Thr Gln Thr Pro Tyr Lys
1               5                   10                  15

<210> SEQ ID NO 89
<211> LENGTH: 15
<212> TYPE: PRT
<213> ORGANISM: Artificial Sequence
<220> FEATURE:
<223> OTHER INFORMATION: Synthetic

<400> SEQUENCE: 89

Gly Asn Glu Glu Met Gly Gly Ile Thr Gln Thr Pro Tyr Lys Val
1               5                   10                  15

<210> SEQ ID NO 90
<211> LENGTH: 15
<212> TYPE: PRT
<213> ORGANISM: Artificial Sequence
<220> FEATURE:
<223> OTHER INFORMATION: Synthetic

<400> SEQUENCE: 90

Asn Glu Glu Met Gly Gly Ile Thr Gln Thr Pro Tyr Lys Val Ser
1               5                   10                  15

<210> SEQ ID NO 91
<211> LENGTH: 15
<212> TYPE: PRT
<213> ORGANISM: Artificial Sequence
<220> FEATURE:
<223> OTHER INFORMATION: Synthetic

<400> SEQUENCE: 91

Glu Glu Met Gly Gly Ile Thr Gln Thr Pro Tyr Lys Val Ser Ile
1               5                   10                  15

<210> SEQ ID NO 92
<211> LENGTH: 15
<212> TYPE: PRT
<213> ORGANISM: Artificial Sequence
<220> FEATURE:
<223> OTHER INFORMATION: Synthetic

<400> SEQUENCE: 92

Glu Met Gly Gly Ile Thr Gln Thr Pro Tyr Lys Val Ser Ile Ser
1               5                   10                  15

<210> SEQ ID NO 93
<211> LENGTH: 15
<212> TYPE: PRT
<213> ORGANISM: Artificial Sequence
<220> FEATURE:
<223> OTHER INFORMATION: Synthetic

<400> SEQUENCE: 93

Met Gly Gly Ile Thr Gln Thr Pro Tyr Lys Val Ser Ile Ser Gly
1               5                   10                  15
```

<210> SEQ ID NO 94
<211> LENGTH: 15
<212> TYPE: PRT
<213> ORGANISM: Artificial Sequence
<220> FEATURE:
<223> OTHER INFORMATION: Synthetic

<400> SEQUENCE: 94

Gly Gly Ile Thr Gln Thr Pro Tyr Lys Val Ser Ile Ser Gly Thr
1               5                   10                  15

<210> SEQ ID NO 95
<211> LENGTH: 15
<212> TYPE: PRT
<213> ORGANISM: Artificial Sequence
<220> FEATURE:
<223> OTHER INFORMATION: Synthetic

<400> SEQUENCE: 95

Gly Ile Thr Gln Thr Pro Tyr Lys Val Ser Ile Ser Gly Thr Thr
1               5                   10                  15

<210> SEQ ID NO 96
<211> LENGTH: 15
<212> TYPE: PRT
<213> ORGANISM: Artificial Sequence
<220> FEATURE:
<223> OTHER INFORMATION: Synthetic

<400> SEQUENCE: 96

Ile Thr Gln Thr Pro Tyr Lys Val Ser Ile Ser Gly Thr Thr Val
1               5                   10                  15

<210> SEQ ID NO 97
<211> LENGTH: 15
<212> TYPE: PRT
<213> ORGANISM: Artificial Sequence
<220> FEATURE:
<223> OTHER INFORMATION: Synthetic

<400> SEQUENCE: 97

Thr Gln Thr Pro Tyr Lys Val Ser Ile Ser Gly Thr Thr Val Ile
1               5                   10                  15

<210> SEQ ID NO 98
<211> LENGTH: 15
<212> TYPE: PRT
<213> ORGANISM: Artificial Sequence
<220> FEATURE:
<223> OTHER INFORMATION: Synthetic

<400> SEQUENCE: 98

Gln Thr Pro Tyr Lys Val Ser Ile Ser Gly Thr Thr Val Ile Leu
1               5                   10                  15

<210> SEQ ID NO 99
<211> LENGTH: 15
<212> TYPE: PRT
<213> ORGANISM: Artificial Sequence
<220> FEATURE:
<223> OTHER INFORMATION: Synthetic

<400> SEQUENCE: 99

Thr Pro Tyr Lys Val Ser Ile Ser Gly Thr Thr Val Ile Leu Thr
1               5                   10                  15

<210> SEQ ID NO 100
<211> LENGTH: 15
<212> TYPE: PRT
<213> ORGANISM: Artificial Sequence
<220> FEATURE:
<223> OTHER INFORMATION: Synthetic

<400> SEQUENCE: 100

Ala Asp Gly Asn Glu Glu Met Gly Gly Ile Thr Gln Thr Pro Tyr
1               5                   10                  15

<210> SEQ ID NO 101
<211> LENGTH: 14
<212> TYPE: PRT
<213> ORGANISM: Artificial Sequence
<220> FEATURE:
<223> OTHER INFORMATION: Synthetic

<400> SEQUENCE: 101

Gln Ala Gly Asn Glu Glu Met Gly Gly Ile Thr Gln Thr Pro
1               5                   10

<210> SEQ ID NO 102
<211> LENGTH: 14
<212> TYPE: PRT
<213> ORGANISM: Artificial Sequence
<220> FEATURE:
<223> OTHER INFORMATION: Synthetic

<400> SEQUENCE: 102

Gln Asp Ala Asn Glu Glu Met Gly Gly Ile Thr Gln Thr Pro
1               5                   10

<210> SEQ ID NO 103
<211> LENGTH: 14
<212> TYPE: PRT
<213> ORGANISM: Artificial Sequence
<220> FEATURE:
<223> OTHER INFORMATION: Synthetic

<400> SEQUENCE: 103

Gln Asp Gly Ala Glu Glu Met Gly Gly Ile Thr Gln Thr Pro
1               5                   10

<210> SEQ ID NO 104
<211> LENGTH: 14
<212> TYPE: PRT
<213> ORGANISM: Artificial Sequence
<220> FEATURE:
<223> OTHER INFORMATION: Synthetic

<400> SEQUENCE: 104

Gln Asp Gly Asn Ala Glu Met Gly Gly Ile Thr Gln Thr Pro
1               5                   10

<210> SEQ ID NO 105
<211> LENGTH: 14
<212> TYPE: PRT
<213> ORGANISM: Artificial Sequence
<220> FEATURE:
<223> OTHER INFORMATION: Synthetic

<400> SEQUENCE: 105

Gln Asp Gly Asn Glu Ala Met Gly Gly Ile Thr Gln Thr Pro
1               5                   10

```
<210> SEQ ID NO 106
<211> LENGTH: 14
<212> TYPE: PRT
<213> ORGANISM: Artificial Sequence
<220> FEATURE:
<223> OTHER INFORMATION: Synthetic

<400> SEQUENCE: 106

Gln Asp Gly Asn Glu Glu Ala Gly Gly Ile Thr Gln Thr Pro
1               5                   10

<210> SEQ ID NO 107
<211> LENGTH: 14
<212> TYPE: PRT
<213> ORGANISM: Artificial Sequence
<220> FEATURE:
<223> OTHER INFORMATION: Synthetic

<400> SEQUENCE: 107

Gln Asp Gly Asn Glu Glu Met Ala Gly Ile Thr Gln Thr Pro
1               5                   10

<210> SEQ ID NO 108
<211> LENGTH: 14
<212> TYPE: PRT
<213> ORGANISM: Artificial Sequence
<220> FEATURE:
<223> OTHER INFORMATION: Synthetic

<400> SEQUENCE: 108

Gln Asp Gly Asn Glu Glu Met Gly Ala Ile Thr Gln Thr Pro
1               5                   10

<210> SEQ ID NO 109
<211> LENGTH: 14
<212> TYPE: PRT
<213> ORGANISM: Artificial Sequence
<220> FEATURE:
<223> OTHER INFORMATION: Synthetic

<400> SEQUENCE: 109

Gln Asp Gly Asn Glu Glu Met Gly Gly Ala Thr Gln Thr Pro
1               5                   10

<210> SEQ ID NO 110
<211> LENGTH: 14
<212> TYPE: PRT
<213> ORGANISM: Artificial Sequence
<220> FEATURE:
<223> OTHER INFORMATION: Synthetic

<400> SEQUENCE: 110

Gln Asp Gly Asn Glu Glu Met Gly Gly Ile Ala Gln Thr Pro
1               5                   10

<210> SEQ ID NO 111
<211> LENGTH: 28
<212> TYPE: PRT
<213> ORGANISM: Artificial Sequence
<220> FEATURE:
<223> OTHER INFORMATION: Synthetic

<400> SEQUENCE: 111

Gln Asp Gly Asn Glu Glu Met Gly Gly Ile Thr Gln Thr Pro Tyr Lys
1               5                   10                  15

Val Ser Ile Ser Gly Thr Thr Val Ile Leu Thr Cys
            20                  25
```

<210> SEQ ID NO 112
<211> LENGTH: 16
<212> TYPE: PRT
<213> ORGANISM: Artificial Sequence
<220> FEATURE:
<223> OTHER INFORMATION: Synthetic

<400> SEQUENCE: 112

Cys Pro Gln Tyr Pro Gly Ser Glu Ile Leu Trp Gln His Asn Asp Lys
1               5                   10                  15

<210> SEQ ID NO 113
<211> LENGTH: 24
<212> TYPE: PRT
<213> ORGANISM: Artificial Sequence
<220> FEATURE:
<223> OTHER INFORMATION: Synthetic

<400> SEQUENCE: 113

Lys Glu Phe Ser Glu Leu Glu Gln Ser Gly Tyr Tyr Val Cys Tyr Pro
1               5                   10                  15

Arg Gly Ser Asn Pro Glu Asp Ala
            20

<210> SEQ ID NO 114
<211> LENGTH: 6
<212> TYPE: PRT
<213> ORGANISM: Artificial Sequence
<220> FEATURE:
<223> OTHER INFORMATION: Synthetic

<400> SEQUENCE: 114

Gln Asp Gly Asn Glu Glu
1               5

<210> SEQ ID NO 115
<211> LENGTH: 117
<212> TYPE: PRT
<213> ORGANISM: Artificial Sequence
<220> FEATURE:
<223> OTHER INFORMATION: Synthetic

<400> SEQUENCE: 115

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Val Ser Asn Asn
            20                  25                  30

Tyr Met Ser Trp Val Arg Gln Ala Pro Gly Lys Gly Leu Glu Trp Val
        35                  40                  45

Ser Val Ile Tyr Thr Gly Gly Thr Thr Tyr Ala Asp Ser Val Lys
    50                  55                  60

Gly Arg Phe Thr Ile Ser Arg His Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Arg Asp Trp Asn Tyr Asp Ala Phe Asp Ile Trp Gly Gln Gly Thr Met
            100                 105                 110

Val Thr Val Ser Ser
        115

<210> SEQ ID NO 116

<211> LENGTH: 351
<212> TYPE: DNA
<213> ORGANISM: Artificial Sequence
<220> FEATURE:
<223> OTHER INFORMATION: Synthetic

<400> SEQUENCE: 116

```
gaggtgcagc tggtggagtc tggaggaggc ttggtccagc ctggggggtc cctgagactc      60
tcctgtgcag cctctgggtt caccgtcagt aacaactaca tgagctgggt ccgccaggct     120
ccagggaagg gactggagtg ggtctcagtt atttataccg gtggtaccac aacctacgca     180
gactccgtga agggccgatt caccatctcc agacacaatt ccaagaatac gctgtatctt     240
caaatgaaca gcctgagagc tgaggacacg gccgtgtatt actgtgcgag agactggaac     300
tacgatgctt ttgatatctg gggccaaggg acaatggtca ccgtctcttc a             351
```

<210> SEQ ID NO 117
<211> LENGTH: 16
<212> TYPE: PRT
<213> ORGANISM: Artificial Sequence
<220> FEATURE:
<223> OTHER INFORMATION: Synthetic

<400> SEQUENCE: 117

Arg Ser Ser Gln Ser Leu Val Asn Ser Asp Gly Lys Thr His Leu Asn
1               5                   10                  15

<210> SEQ ID NO 118
<211> LENGTH: 7
<212> TYPE: PRT
<213> ORGANISM: Artificial Sequence
<220> FEATURE:
<223> OTHER INFORMATION: Synthetic

<400> SEQUENCE: 118

Lys Val Ser Asn Arg Asp Ser
1               5

<210> SEQ ID NO 119
<211> LENGTH: 9
<212> TYPE: PRT
<213> ORGANISM: Artificial Sequence
<220> FEATURE:
<223> OTHER INFORMATION: Synthetic

<400> SEQUENCE: 119

Met Gln Gly Thr His Trp Pro Leu Thr
1               5

<210> SEQ ID NO 120
<211> LENGTH: 11
<212> TYPE: PRT
<213> ORGANISM: Artificial Sequence
<220> FEATURE:
<223> OTHER INFORMATION: Synthetic

<400> SEQUENCE: 120

Arg Ala Ser Gln Ser Ile Ser Asn Tyr Leu Asn
1               5                   10

<210> SEQ ID NO 121
<211> LENGTH: 7
<212> TYPE: PRT
<213> ORGANISM: Artificial Sequence
<220> FEATURE:
<223> OTHER INFORMATION: Synthetic

<400> SEQUENCE: 121

Ala Ala Ser Ser Leu Gln Ser
1               5

<210> SEQ ID NO 122
<211> LENGTH: 9
<212> TYPE: PRT
<213> ORGANISM: Artificial Sequence
<220> FEATURE:
<223> OTHER INFORMATION: Synthetic

<400> SEQUENCE: 122

Gln Gln Ser Phe Ser Thr Leu Tyr Thr
1               5

<210> SEQ ID NO 123
<211> LENGTH: 11
<212> TYPE: PRT
<213> ORGANISM: Artificial Sequence
<220> FEATURE:
<223> OTHER INFORMATION: Synthetic

<400> SEQUENCE: 123

Gln Ala Ser Gln Asp Ile Arg Lys Tyr Leu Asn
1               5                   10

<210> SEQ ID NO 124
<211> LENGTH: 7
<212> TYPE: PRT
<213> ORGANISM: Artificial Sequence
<220> FEATURE:
<223> OTHER INFORMATION: Synthetic

<400> SEQUENCE: 124

Asp Ala Ser Asn Leu Glu Thr
1               5

<210> SEQ ID NO 125
<211> LENGTH: 11
<212> TYPE: PRT
<213> ORGANISM: Artificial Sequence
<220> FEATURE:
<223> OTHER INFORMATION: Synthetic

<400> SEQUENCE: 125

Gln His Tyr Ala Asn Leu Pro Pro Leu Phe Thr
1               5                   10

<210> SEQ ID NO 126
<211> LENGTH: 11
<212> TYPE: PRT
<213> ORGANISM: Artificial Sequence
<220> FEATURE:
<223> OTHER INFORMATION: Synthetic

<400> SEQUENCE: 126

Gln Ala Ser Gln Asp Ile Ser Asn Tyr Leu Asn
1               5                   10

<210> SEQ ID NO 127
<211> LENGTH: 9
<212> TYPE: PRT
<213> ORGANISM: Artificial Sequence
<220> FEATURE:
<223> OTHER INFORMATION: Synthetic

```
<400> SEQUENCE: 127

Gln Gln Tyr Asp Asn Leu Pro Ile Thr
1               5

<210> SEQ ID NO 128
<211> LENGTH: 9
<212> TYPE: PRT
<213> ORGANISM: Artificial Sequence
<220> FEATURE:
<223> OTHER INFORMATION: Synthetic

<400> SEQUENCE: 128

Asp Leu Ile Thr Gly Ser Ile Asp Tyr
1               5

<210> SEQ ID NO 129
<211> LENGTH: 9
<212> TYPE: PRT
<213> ORGANISM: Artificial Sequence
<220> FEATURE:
<223> OTHER INFORMATION: Synthetic

<400> SEQUENCE: 129

Asp Leu Ile Thr Gly Asp Leu Asp Tyr
1               5

<210> SEQ ID NO 130
<211> LENGTH: 9
<212> TYPE: PRT
<213> ORGANISM: Artificial Sequence
<220> FEATURE:
<223> OTHER INFORMATION: Synthetic

<400> SEQUENCE: 130

Asp Leu Ile Thr Gly Ala Phe Asp Tyr
1               5

<210> SEQ ID NO 131
<211> LENGTH: 17
<212> TYPE: PRT
<213> ORGANISM: Artificial Sequence
<220> FEATURE:
<223> OTHER INFORMATION: Synthetic

<400> SEQUENCE: 131

Ile Ile Trp Tyr Asp Gly Ser Asn Lys Tyr Tyr Gly Asp Ser Val Lys
1               5                   10                  15

Gly

<210> SEQ ID NO 132
<211> LENGTH: 11
<212> TYPE: PRT
<213> ORGANISM: Artificial Sequence
<220> FEATURE:
<223> OTHER INFORMATION: Synthetic

<400> SEQUENCE: 132

Leu Ser Val Asn Asp Tyr Tyr Val Leu Asp Val
1               5                   10

<210> SEQ ID NO 133
<211> LENGTH: 5
<212> TYPE: PRT
<213> ORGANISM: Artificial Sequence
<220> FEATURE:
<223> OTHER INFORMATION: Synthetic
```

```
<400> SEQUENCE: 133

Ser Tyr Ser Met Asn
1               5

<210> SEQ ID NO 134
<211> LENGTH: 17
<212> TYPE: PRT
<213> ORGANISM: Artificial Sequence
<220> FEATURE:
<223> OTHER INFORMATION: Synthetic

<400> SEQUENCE: 134

Tyr Ile Ser Arg Ser Ser Asn Tyr Thr Tyr Tyr Ala Asp Ser Val Met
1               5                   10                  15

Gly

<210> SEQ ID NO 135
<211> LENGTH: 13
<212> TYPE: PRT
<213> ORGANISM: Artificial Sequence
<220> FEATURE:
<223> OTHER INFORMATION: Synthetic

<400> SEQUENCE: 135

Asp Arg Arg Gly Tyr Ser Gly Tyr Asn His Phe Asp Tyr
1               5                   10

<210> SEQ ID NO 136
<211> LENGTH: 5
<212> TYPE: PRT
<213> ORGANISM: Artificial Sequence
<220> FEATURE:
<223> OTHER INFORMATION: Synthetic

<400> SEQUENCE: 136

Ser Tyr Glu Met Asn
1               5

<210> SEQ ID NO 137
<211> LENGTH: 17
<212> TYPE: PRT
<213> ORGANISM: Artificial Sequence
<220> FEATURE:
<223> OTHER INFORMATION: Synthetic

<400> SEQUENCE: 137

Tyr Ile Ser Ser Ser Ser Thr Thr Ile Tyr Tyr Ala Gly Ser Val Lys
1               5                   10                  15

Gly

<210> SEQ ID NO 138
<211> LENGTH: 7
<212> TYPE: PRT
<213> ORGANISM: Artificial Sequence
<220> FEATURE:
<223> OTHER INFORMATION: Synthetic

<400> SEQUENCE: 138

Asp Arg Gly Ala Leu Asp Tyr
1               5
```